US011975513B2

(12) United States Patent
Bandyopadhyay et al.

(10) Patent No.: US 11,975,513 B2
(45) Date of Patent: May 7, 2024

(54) MULTI-LAYERED FILMS FOR USE IN AIRBAGS AND FOOTWEAR

(71) Applicant: NIKE, Inc., Beaverton, OR (US)

(72) Inventors: Diya Bandyopadhyay, Portland, OR (US); Narayanan Ashwin Kumar Bharadwaj, Hillsboro, OR (US); Yihua Chang, Portland, OR (US); Christopher J. Dimitriou, Portland, OR (US); Nancy D. Eisenmenger, Portland, OR (US); Sharon Oba, Beaverton, OR (US); Richard L. Watkins, Portland, OR (US)

(73) Assignee: NIKE, INC., Beaverton, OR (US)

( * ) Notice: Subject to any disclaimer, the term of this patent is extended or adjusted under 35 U.S.C. 154(b) by 0 days.

(21) Appl. No.: 17/815,225

(22) Filed: Jul. 27, 2022

(65) Prior Publication Data
US 2023/0042037 A1 Feb. 9, 2023

Related U.S. Application Data

(60) Provisional application No. 63/203,609, filed on Jul. 27, 2021.

(51) Int. Cl.
*B32B 27/08* (2006.01)
*B29C 48/21* (2019.01)
(Continued)

(52) U.S. Cl.
CPC ............. *B32B 27/08* (2013.01); *B29C 48/21* (2019.02); *B32B 27/302* (2013.01);
(Continued)

(58) Field of Classification Search
CPC ...... B29C 33/405; B29C 44/065; B29C 44/06
See application file for complete search history.

(56) References Cited

U.S. PATENT DOCUMENTS

| 5,595,004 A | 1/1997 | Lyden et al. |
| 6,082,025 A * | 7/2000 | Bonk ............ A43B 13/20 |
| | | 428/424.4 |

(Continued)

FOREIGN PATENT DOCUMENTS

| EP | 1109468 A1 | 6/2001 |
| EP | 3191298 A1 | 7/2017 |

(Continued)

OTHER PUBLICATIONS

International Search Report and Written Opinion for PCT/US2022/074171, dated Nov. 15, 2022.

(Continued)

*Primary Examiner* — Stella K Yi
(74) *Attorney, Agent, or Firm* — THOMAS | HORSTEMEYER, LLP

(57) ABSTRACT

Airsoles or bladders for articles of footwear comprising multi-layered films are provided herein. In one aspect, the airsoles or bladders comprise a first sheet and a second sheet, wherein a first side of the first sheet faces a second side of the second sheet, wherein the first sheet and the second sheet are bonded together to form an internal cavity in a space between the first side of the first sheet and the second side of the second sheet, forming a bladder capable of retaining a gas in the internal cavity at a pressure above atmospheric pressure, at atmospheric pressure, or below atmospheric pressure; and wherein each of the first sheet and the second sheet comprise a multi-layered film comprising: a core region comprising at least 20 gas barrier layers and a plurality of elastomeric layers, wherein the gas-barrier layers alternate with the elastomeric layers.

19 Claims, 22 Drawing Sheets

(51) Int. Cl.
  *B29K 23/00* (2006.01)
  *B29K 75/00* (2006.01)
  *B32B 27/30* (2006.01)
  *B32B 27/32* (2006.01)
  *B32B 27/34* (2006.01)
  *B32B 27/38* (2006.01)
  *B32B 27/40* (2006.01)

(52) U.S. Cl.
  CPC .......... *B32B 27/304* (2013.01); *B32B 27/306* (2013.01); *B32B 27/308* (2013.01); *B32B 27/32* (2013.01); *B32B 27/34* (2013.01); *B32B 27/38* (2013.01); *B32B 27/40* (2013.01); *B29K 2023/086* (2013.01); *B29K 2075/00* (2013.01); *B29K 2995/0067* (2013.01); *B32B 2250/05* (2013.01); *B32B 2250/24* (2013.01); *B32B 2270/00* (2013.01); *B32B 2307/30* (2013.01); *B32B 2307/7242* (2013.01); *B32B 2325/00* (2013.01); *B32B 2327/06* (2013.01); *B32B 2329/04* (2013.01); *B32B 2333/08* (2013.01); *B32B 2363/00* (2013.01); *B32B 2375/00* (2013.01); *B32B 2377/00* (2013.01); *B32B 2437/02* (2013.01); *B32B 2605/00* (2013.01)

(56) References Cited

U.S. PATENT DOCUMENTS

| | | |
|---|---|---|
| 6,790,391 B2 | 9/2004 | Watkins |
| 2003/0235670 A1 | 12/2003 | Shepard et al. |
| 2004/0244223 A1 | 12/2004 | Watkins |
| 2005/0031816 A1 | 2/2005 | Chang et al. |
| 2014/0096882 A1 | 4/2014 | Kitano et al. |
| 2016/0075113 A1 | 3/2016 | Chang et al. |
| 2020/0087512 A1 | 3/2020 | Chang et al. |

FOREIGN PATENT DOCUMENTS

| | | |
|---|---|---|
| EP | 3740380 A1 | 11/2020 |
| WO | 2007078327 A1 | 7/2007 |
| WO | 2016040893 A1 | 3/2016 |
| WO | 2022250786 A1 | 12/2022 |

OTHER PUBLICATIONS

Written Opinion of the International Preliminary Examining Authority for PCT/US2022/074175, dated Feb. 10, 2023.
Written Opinion of the International Preliminary Examining Authority for PCT/US2022/074173, dated Feb. 14, 2023.
Written Opinion of the International Preliminary Examining Authority for PCT/US2022/074174, dated Feb. 24, 2023.
International Preliminary Report on Patentability for PCT/US2022/074172, dated Mar. 1, 2023.
International Search Report and Written Opinion for PCT/US2022/074174, dated Oct. 11, 2022.
International Search Report and Written Opinion for PCT/US2022/074175, dated Oct. 10, 2022.
International Search Report and Written Opinion for PCT/US2022/074173, dated Oct. 17, 2022.
International Search Report and Written Opinion for PCT/US2022/074172, dated Nov. 11, 2022.
International Preliminary Report on Patentability for PCT/US2022/074175, dated Apr. 28, 2023.
International Preliminary Report on Patentability for PCT/US2022/074171, dated May 9, 2023.
International Preliminary Report on Patentability for PCT/US2022/074173, mailed Nov. 7, 2023.
International Preliminary Report on Patentability for PCT/US2022/074174, mailed Nov. 7, 2023.

* cited by examiner

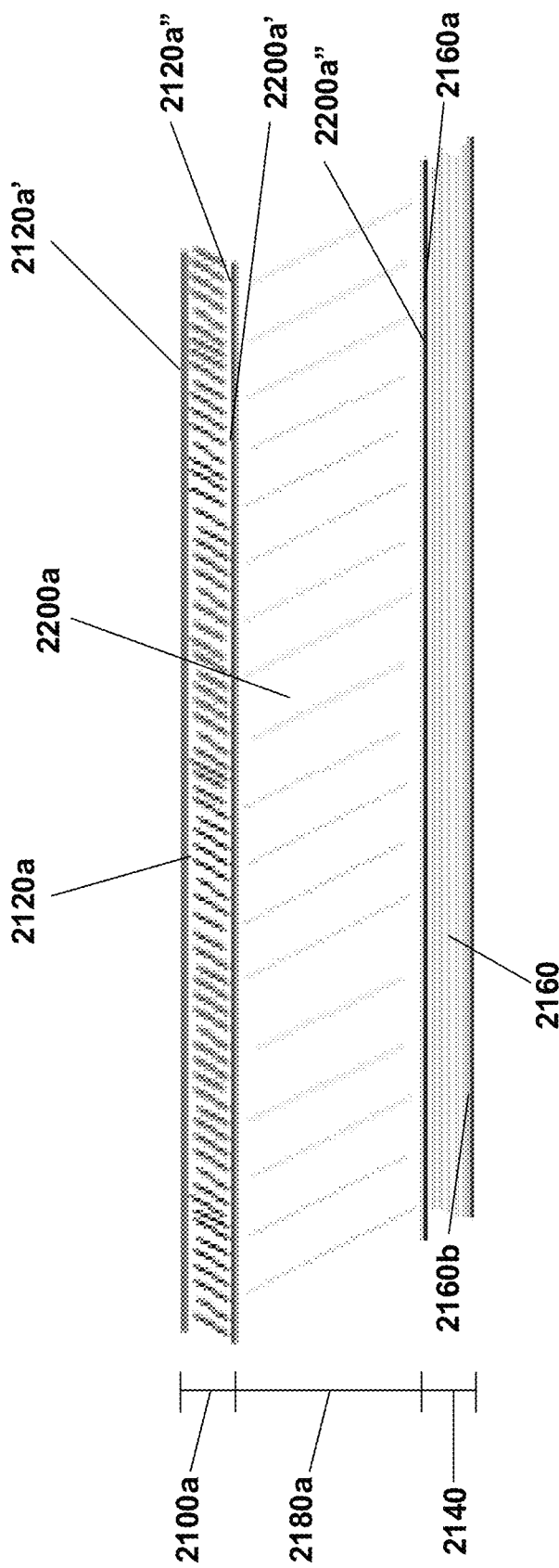

MULTI-LAYERED FILMS FOR USE IN AIRBAGS AND FOOTWEAR

CROSS REFERENCE TO RELATED APPLICATIONS

This application claims the benefit of U.S. Provisional Application No. 63/203,609 filed on Jul. 27, 2021, which is incorporated herein by reference in its entirety.

TECHNICAL FIELD

The present disclosure is directed to multi-layered films. More specifically, the present disclosure relates to multi-layered films having gas-barrier properties, methods of making such multi-layered films, articles incorporating the multi-layered films (e.g., airbags, fuel hose liners, and vehicle tires), and methods for manufacturing such articles. The present disclosure also relates to articles of footwear that incorporate the airbags.

BACKGROUND

This section provides background information related to the present disclosure which is not necessarily prior art.

The design of athletic equipment and apparel as well as footwear involves a variety of factors from the aesthetic aspects, to the comfort and feel, to the performance and durability. While design and fashion may be rapidly changing, the demand for increasing performance in the market is unchanging. To balance these demands, designers employ a variety of materials and designs for the various components that make up athletic equipment and apparel as well as footwear.

Articles of footwear conventionally include an upper and a sole structure. The upper may be formed from any suitable material(s) to receive, secure, and support a foot on the sole structure. The upper may cooperate with laces, straps, or other fasteners to adjust the fit of the upper around the foot. A bottom portion of the upper, proximate to a bottom surface of the foot, attaches to the sole structure.

Sole structures generally include a layered arrangement extending between a ground surface and the upper. One layer of the sole structure includes an outsole that provides abrasion-resistance and traction with the ground surface. The outsole may be formed from rubber or other materials that impart durability and wear-resistance, as well as enhance traction with the ground surface. Another layer of the sole structure includes a midsole disposed between the outsole and the upper. The midsole provides cushioning for the foot and may be partially formed from a polymer foam material that compresses resiliently under an applied load to cushion the foot by attenuating ground-reaction forces. Sole structures may also include a comfort-enhancing insole or a sockliner located within a void proximate to the bottom portion of the upper and a strobel attached to the upper and disposed between the midsole and the insole or sockliner.

BRIEF DESCRIPTION OF THE DRAWINGS

Further aspects of the present disclosure will be readily appreciated upon review of the detailed description, described below, when taken in conjunction with the accompanying drawings.

FIGS. 6A-6E are sectional views of alternative multi-layered films of the present disclosure.

Corresponding reference numerals indicate corresponding parts throughout the drawings.

DESCRIPTION

Figure 1:
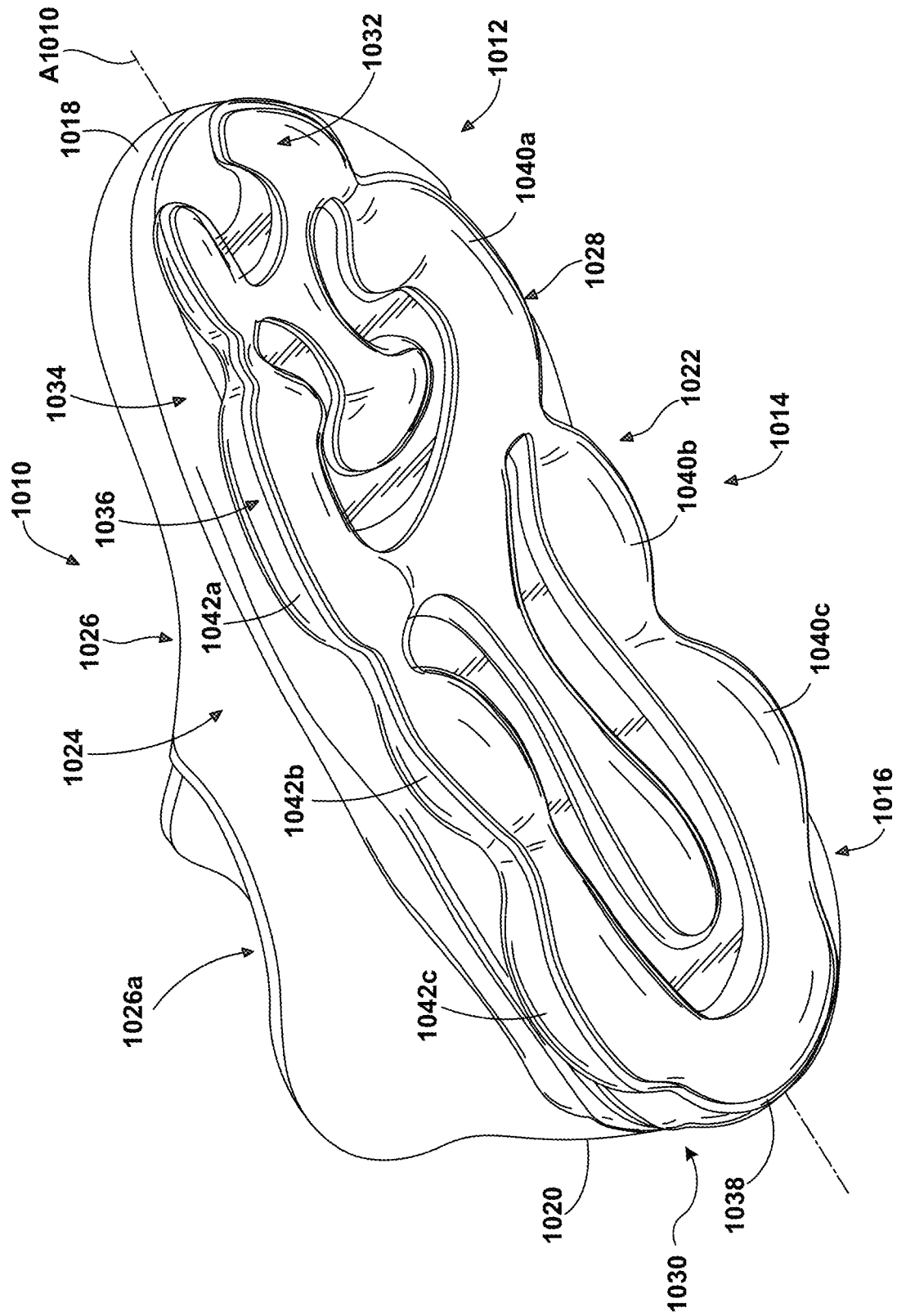
FIG. 1 is a bottom front perspective view of an article of footwear incorporating a multi-layered film of the present disclosure.

The present disclosure is directed to a multi-layered film (e.g., microlayer film) having thin gas-barrier layers, which have been found to increase film flexibility while also retaining good film durability and gas-barrier properties. As such, the multi-layered film of the present disclosure is suitable for use in a variety of articles requiring gas-barrier and/or gas-retention properties, e.g., airbags, fuel hose liners, vehicle tires, and the like. The multi-layered film is particularly suitable for use in articles that require gas-barrier and/or gas-retention properties while also being subjected to repeated flexing conditions, such as airbags for use in footwear cushioning (referred to as "airsoles," as defined below).

Fluid-filled bladders, including bladders configured for use as cushioning elements, may be formed from multi-layered films that include gas-barrier layers. The gas-barrier layers may be brittle enough to develop cracking (and/or crazing) over time. For example, this may occur after multiple cycles of flexing and release. Cracking (and/or crazing) may become visible to the naked eye. It may reduce the transparency of one or more areas of the cushioning element. It may increase the gas transmission rate of the cushioning element.

Bladders having bulbous protrusions and/or areas of relatively small radii of curvature may be more likely to crack. Therefore, these types of bladders are at particular risk of visible defects. They are also at risk of an unacceptable increase in gas transmission rate resulting from aligned cracks in many, even all, layers (catastrophic cracking). There has therefore been a general reluctance in the present field to produce these types of bladders commercially, particularly bladders which are used as cushioning elements, as they will be exposed to a very large number of flexing and release cycles during use.

Proposals to mitigate increased gas transmission rate due to cracking, and to reduce the visibility of cracks once they have formed, include increasing the thickness of individual gas-barrier layers present in the film; and increasing the number of gas-barrier layers present in the film. Either of these options may lead to an increase in the overall amount of gas-barrier material present in the multi-layered film.

In a multi-layered film having a core region including a gas-barrier material, the core region of the film presents the greatest barrier to rapid diffusion of gas molecules. When cracks are present in the gas-barrier material forming the gas-barrier layers of the core region, a gas molecule is able to bypass the gas-barrier material, and diffuse more rapidly through the more gas-permeable materials present in the film. When cracks are aligned throughout many or all layers of the core region of a gas-barrier film, a gas molecule can pass through large portions of the core region of the film or even through the entire core region of the film in a relatively short amount of time. Increasing the number of gas-barrier layers decreases the likelihood that cracks will occur in an aligned manner in a large number of layers or in all layers of the core. When cracks are not aligned, a gas molecule is forced to take a tortuous path in order to pass through the overall multi-layered film. A similar effect has been proposed upon increasing individual gas-barrier layer thicknesses. However, it has until now not been well understood how to prevent or diminish the formation of cracks in the gas-barrier layers in the first place.

Unexpectedly, it has now been found that decreasing the thickness of each individual gas-barrier layer may prevent or diminish the formation of cracks in the layers. Instead of using average individual gas-barrier layer thicknesses of several micrometers, individual average gas-barrier layer thicknesses of less than or equal to 0.75 micrometers, (optionally of less than or equal to 0.5 micrometers), including in a range of about 0.01 micrometers to about 0.75 micrometers (optionally, in a range of about 0.01 micrometers to about 0.5 micrometers), are proposed. Average individual gas-barrier layer thicknesses of below about 0.75 micrometers, and optionally of below about 0.5 micrometers, have been found to reduce cracking and may reduce catastrophic cracking of the type mentioned above. It has also been found that the use of these thinner layers in multi-layered films may result in films and bladders that have a gas transmission rate (that is, without taking into account any cracks, i.e., for films or bladders prior to exposure to flexing and release) which remains satisfactory compared to the gas transmission rate of thicker layers. In particular, the gas transmission rate for the films or bladders may be less than or equal to 4 cubic centimeters per square meter per day, or less than or equal to 3 cubic centimeters per square meter per day.

It has surprisingly been found that when these thinner layers are used, it is not necessary to compensate in other ways. For example, it is not necessary to increase the overall amount of gas-barrier material, or even to maintain the same overall amount of gas-barrier material by increasing the number of gas-barrier layers when their individual thicknesses are reduced. This is in contrast to the proposals to increase the number of gas-barrier layers or increase the thickness of each individual gas-barrier layer; both of which tend to lead to an increase in the overall amount of gas-barrier material.

It has been found that it is possible to use a relatively low number of gas-barrier layers, for example about 20 gas-barrier layers (for example, about 24 gas-barrier layers, thus fewer layers than the 32 gas-barrier layers of the control bladders of the Examples set out hereinbelow) although more gas-barrier layers may be used, for example at least 30 gas-barrier layers or at least 40 gas-barrier layers, in order to provide particularly low gas transmission rates. The number of gas-barrier layers may optionally be no more than 70. There may be no need for particularly large amounts of gas-barrier material to be present overall in the multi-layered films.

The more crack- and craze-resistant multi-layered films disclosed herein may be used to make bladders (for example, cushioning elements) with a wider variety of shapes and for a wider variety of uses, than has previously been possible. Cushioning elements having bulbous protrusions and/or areas of relatively small radii of curvature may be made, which maintain high clarity and low gas diffusion rates for long periods of use.

As used herein, the terms "airbag" and "bladder" are interchangeable and each refers to either a fluid-inflated and sealed component or a fluid-inflatable and sealable component, the latter of which can be inflated with one or more fluids and sealed. As can be appreciated, the sealed and sealable terms can refer to fixed seals (e.g., with welded seams) and/or to dynamic seals that can switch between open and closed states (e.g., with valves). Furthermore, the airbags discussed herein can each have a single interior cavity that can be inflated with a fluid, multiple interior cavities that are separate and can be independently inflated with one or more fluids, and/or multiple interior cavities that are fluidly connected (at least some of them) and that can be inflated with one or more fluids, and combinations thereof. As further used herein, the term "airsole" refers to an airbag used as cushioning element in a footwear midsole component to provide cushioning and/or support to an article of footwear.

The shape of a bladder typically includes an upper surface and a lower surface, with a sidewall positioned between the upper surface and the lower surface. While bladders may be shaped so that the sidewall includes either convex or concave curved regions, it is common for the sidewalls to include convex regions which curve away from and extend beyond the upper surface of the bladder or from the lower surface of the bladder or from both the upper surface and the lower surface of the bladder. When the bladder is a midsole component of an article of footwear, the upper surface of the bladder may be positioned so that it faces the insole of the article of footwear or the cavity within the upper of the article of footwear configured to contain the foot of a wearer during use, while the lower surface of the bladder may be positioned so that it faces the outsole of the article of footwear or the ground. It is common for a curved region of the sidewall to be visible from the outer surface of the article of footwear, or even to be exposed and form a portion of the outer surface of the article of footwear. As used herein, the term "bulbous protrusion" or "bulbous portion" may refer to a portion or region of a bladder having one or more of the following characteristics, such as at least two, at least three, or all four of the following characteristics. The bulbous protrusion or bulbous portion may be a curved sidewall of the bladder, including a convexly curved sidewall of the bladder. In particular, a bulbous protrusion or bulbous portion may be a part of a rearwardly and/or laterally extending bladder in an article of footwear, which projects more than 1 millimeter, optionally more than 2 millimeters, optionally more than 3 mm, optionally more than 4 millimeters, optionally more than 5 millimeters, beyond the upper or lower surface of the bladder (alternatively, beyond the rear of the article of footwear) and/or beyond one or more sides of the article of footwear. When flexed, the bulbous protrusion or portion of the bladder may extend even further, such as by more than an additional 1 millimeter, or more than an additional 2 millimeters, or more than an additional 3 millimeters. Additionally or alternatively, the bulbous protrusion or bulbous portion may be a concavely or convexly curved surface, particularly a convexly cured surface, having a curvature that is at least about twice, at least about three times, or even at least about five times, the minimum curvature found elsewhere in the bladder. Additionally or alternatively, the bulbous protrusion or bulbous portion may be a concavely or convexly curved surface (such as a convexly-curved sidewall of a bladder in an article of footwear), where the height of the curved surface (such as its height when disposed in an article of footwear) is at least about 50 percent higher, at least about 100 percent higher, or at least about 150 percent higher than the minimum height found elsewhere in the bladder. Additionally or alternatively, the bulbous protrusion or bulbous portion may include a concavely or convexly curved surface, particularly a convexly-curved sidewall, having a radius of curvature that is less than half, less than a third, or even less than a fifth, of the maximum radius of curvature found elsewhere in the bladder.

The multi-layered film or multiple sheets of the multi-layered film can be shaped into a variety of wall geometries for airbags (e.g., by thermoforming, blow molding, etc.) and the produced airbag can be inflated with one or more fluids (e.g., one or more gases) and sealed for use in a variety of applications, notably as footwear airsoles.

Aspects

The following list of exemplary aspects supports and is supported by the disclosure provided herein.

In accordance with aspect 1, the present disclosure is directed to a multi-layered film comprising:

one or more core regions, wherein each of the one or more core regions comprises a plurality of layers, the plurality of layers comprising gas-barrier layers comprising at least one gas-barrier material, the gas-barrier layers alternating with elastomeric layers comprising at least one elastomeric material, wherein an average thickness of each of the gas-barrier layers is in a range from about 0.5 micrometers to about 2 micrometers, optionally from about 0.5 micrometers to about 1 micrometer; or an average thickness of each of the gas-barrier layers is in a range of about 0.01 to about 0.75 micrometers, optionally in a range of about 0.01 to about 0.5 micrometers; and wherein an average thickness of each of the elastomeric layers is from about 2 micrometers to about 8 micrometers thick, optionally from about 2 micrometers to about 4 micrometers thick.

In accordance with aspect 2, the present disclosure is directed to the multi-layered film of aspect 1, wherein the number of gas-barrier layers in each of the one or more core regions is in a range of from about 20 to about 70; optionally, wherein each of the one or more core regions comprises at least about 40 layers, optionally from about 50 to about 100 layers, from about 50 to about 90 layers, from about 50 to about 80 layers, from about 50 to about 70 layers, from about 60 to about 100 layers, from about 60 to about 90 layers, or from about 60 to about 80 layers.

In accordance with aspect 3, the present disclosure is directed to the multi-layered film of aspect 1 or 2, wherein each of the one or more core regions has an average total thickness less than 200 micrometers.

In accordance with aspect 4, the present disclosure is directed to the multi-layered film of any one of the preceding aspects, wherein the gas-barrier material comprises a nitrogen gas-barrier material.

In accordance with aspect 5, the present disclosure is directed to the multi-layered film of any one of the preceding aspects, wherein the gas-barrier material comprises or consists essentially of one or more gas-barrier polymers, and wherein the gas-barrier material comprises a gas-barrier polymeric component consisting of all polymers present in the gas-barrier material.

In accordance with aspect 6, the present disclosure is directed to the multi-layered film of aspect 5, wherein the one or more gas-barrier polymers comprise or consist essentially of one or more thermoplastic vinylidene chloride polymers, one or more thermoplastic acrylonitrile polymers or copolymers, one or more thermoplastic polyamides, one or more thermoplastic epoxy resins, one or more thermoplastic amine polymers or copolymers, or one or more thermoplastic polyolefin homopolymers or copolymers.

In accordance with aspect 7, the present disclosure is directed to the multi-layered film of aspect 6, wherein the one or more thermoplastic polyolefin homopolymers or copolymers comprise or consist essentially of one or more thermoplastic polyethylene copolymers.

In accordance with aspect 8, the present disclosure is directed to the multi-layered film of aspect 6, wherein the one or more thermoplastic polyolefin homopolymers or copolymers comprise or consist essentially of one or more thermoplastic ethylene-vinyl alcohol copolymers.

In accordance with aspect 9, the present disclosure is directed to the multi-layered film of aspect 8, wherein the one or more thermoplastic ethylene-vinyl alcohol copolymers include from about 28 mole percent to about 44 mole percent ethylene content, optionally from about 32 mole percent to about 44 mole percent ethylene content.

In accordance with aspect 10, the present disclosure is directed to the multi-layered film of any one of the preceding aspects, wherein the elastomeric material comprises or consists essentially of one or more thermoplastic elastomeric polymers, and wherein the elastomeric material comprises an elastomeric polymeric component consisting of all polymers present in the elastomeric material.

In accordance with aspect 11, the present disclosure is directed to the multi-layered film of aspect 10, wherein the one or more thermoplastic elastomeric polymers comprise or consist essentially of one or more thermoplastic elastomeric polyolefin homopolymers or copolymers, one or more thermoplastic elastomeric polyamide homopolymers or copolymers, one or more thermoplastic elastomeric polyester homopolymers or copolymers, one or more thermoplastic elastomeric polyurethane homopolymers or copolymers, one or more thermoplastic elastomeric styrenic homopolymers or copolymers, or any combination thereof.

In accordance with aspect 12, the present disclosure is directed to the multi-layered film of any one of the preceding aspects, wherein the elastomeric material comprises or consists essentially of one or more thermoplastic elastomeric polyurethane homopolymers or copolymers, optionally wherein the elastomeric material comprises or consists essentially of one or more polydiene polyol-based thermoplastic elastomeric polyurethane homopolymers or copolymers.

In accordance with aspect 13, the present disclosure is directed to the multi-layered film of aspect 12, wherein the one or more thermoplastic elastomeric polyurethane homopolymers or copolymers comprise a plurality of first segments derived from one or more polyols and a plurality of second segments derived from a diisocyanate.

In accordance with aspect 14, the present disclosure is directed to the multi-layered film of aspect 12, wherein the one or more thermoplastic elastomeric polyurethane homopolymers or copolymers is a polymerization product of a diisocyanate with one or more polyols.

In accordance with aspect 15, the present disclosure is directed to the multi-layered film of aspect 12, wherein the thermoplastic elastomeric polyurethane homopolymer or copolymer comprises or consists essentially of one or more polydiene polyol-based thermoplastic elastomeric polyurethane homopolymers or copolymers and wherein the polyol comprises or consists essentially of a polybutadiene polyol, a polyisoprene polyol, a partially or fully hydrogenated derivative of a polybutadiene polyol or of a polyisoprene polyol, or any combination thereof.

In accordance with aspect 16, the present disclosure is directed to the multi-layered film of aspect 13 or 14, wherein the one or more polyols comprise or consist essentially of a polyester polyol, a polyether polyol, a polycarbonate polyol, a polycaprolactone polyether, or any combination thereof.

In accordance with aspect 17, the present disclosure is directed to the multi-layered film of aspect 13, 14, or 16, wherein the diisocyanate comprises or consists essentially of an aliphatic diisocyanate, an aromatic diisocyanate, or any combination thereof.

In accordance with aspect 18, the present disclosure is directed to the multi-layered film of aspect 17, wherein the aliphatic diisocyanate comprises or consists essentially of hexamethylene diisocyanate (HDI), isophorone diisocyanate (IPDI), butylenediisocyanate (BDI), bisisocyanatocyclohexylmethane (HMDI), 2,2,4-trimethylhexamethylene diisocyanate (TMDI), bisisocyanatomethylcyclohexane, bisisocyanatomethyltricyclodecane, norbornane diisocyanate (NDI), cyclohexane diisocyanate (CHDI), 4,4'-dicyclohexylmethane diisocyanate (H12MDI), diisocyanatododecane, lysine diisocyanate, or any combination thereof.

In accordance with aspect 19, the present disclosure is directed to the multi-layered film of aspect 17, wherein the aromatic diisocyanate comprises or consists essentially of toluene diisocyanate (TDI), TDI adducts with trimethylolpropane (TMP), methylene diphenyl diisocyanate (MDI), xylene diisocyanate (XDI), tetramethylxylylene diisocyanate (TMXDI), hydrogenated xylene diisocyanate (HXDI), naphthalene 1,5-diisocyanate (NDI), 1,5-tetrahydronaphthalene diisocyanate, para-phenylene diisocyanate (PPDI), 3,3'-dimethyldiphenyl-4,4'-diisocyanate (DDDI), 4,4'-dibenzyl diisocyanate (DBDI), 4-chloro-1,3-phenylene diisocyanate, or any combination thereof.

In accordance with aspect 20, the present disclosure is directed to the multi-layered film of any one of the preceding aspects, wherein the gas-barrier material has a melt flow index of from about 5 to about 7 grams per 10 minutes at 190 degrees Celsius when using a weight of 2.16 kilograms.

In accordance with aspect 21, the present disclosure is directed to the multi-layered film of any one of the preceding aspects, wherein the elastomeric material has a melt flow index of from about 20 to about 30 grams per 10 minutes at 190 degrees Celsius when using a weight of 2.16 kilograms.

In accordance with aspect 22, the present disclosure is directed to the multi-layered film of aspect 20 or 21, wherein the melt flow index of the gas-barrier material is from about 80 percent to about 120 percent of the melt flow index of the elastomeric material, optionally from about 90 percent to about 110 percent of the melt flow index of the elastomeric material, from about 95 percent to about 105 percent of the melt flow index of the elastomeric material, or wherein the melt flow index of the gas-barrier material is substantially the same as the melt flow index of the elastomeric material, wherein the melt flow index is measured in cubic centimeters per 10 minutes at 190 degrees Celsius when using a weight of 2.16 kilograms.

In accordance with aspect 23, the present disclosure is directed to the multi-layered film of any one of the preceding aspects, wherein the gas-barrier material has a melting temperature of from about 165 degrees Celsius to about 183 degrees Celsius.

In accordance with aspect 24, the present disclosure is directed to the multi-layered film of any one of the preceding aspects, wherein the elastomeric material has a melting temperature of from about 155 degrees Celsius to about 165 degrees Celsius.

In accordance with aspect 25, the present disclosure is directed to the multi-layered film of aspect 23 or 24, wherein the melting temperature of the gas-barrier material is within about 10 degrees Celsius of the melting temperature of the elastomeric material, optionally within about 8 degrees Celsius of the melting temperature of the elastomeric material, or within about 5 degrees Celsius of the melting temperature of the elastomeric material.

In accordance with aspect 26, the present disclosure is directed to the multi-layered film of any one of the preceding aspects, further comprising a blended material, wherein the blended material comprises or consists essentially of a blend of one or more additional thermoplastic elastomers and a second material, optionally wherein the second material comprises or consists essentially of one or more second polymers, optionally wherein the one or more second polymers comprise or consist essentially of one or more second thermoplastics.

In accordance with aspect 27, the present disclosure is directed to the multi-layered film of aspect 26, wherein the one or more second thermoplastics comprise one or more thermoplastic polyolefin homopolymers or copolymers, one or more thermoplastic polyamide homopolymers or copolymers, one or more thermoplastic polyester homopolymers or copolymers, one or more thermoplastic polyurethane homopolymers or copolymers, one or more thermoplastic styrenic homopolymers or copolymers, or any combination thereof.

In accordance with aspect 28, the present disclosure is directed to the multi-layered film of aspect 26 or 27, wherein the one or more second thermoplastics comprise or consist essentially of thermoplastic polypropylene homopolymers or copolymers, thermoplastic polyethylene homopolymers or copolymers, thermoplastic polybutylene homopolymers or copolymers, or any combination thereof.

In accordance with aspect 29, the present disclosure is directed to the multi-layered film of any one of aspects 26-28, wherein the one or more second thermoplastics comprise or consist essentially of one or more thermoplastic polyethylene copolymers.

In accordance with aspect 30, the present disclosure is directed to the multi-layered film of any one of aspects 26-29, wherein the one or more second thermoplastics comprise or consist essentially of one or more thermoplastic ethylene-vinyl alcohol copolymers.

In accordance with aspect 31, the present disclosure is directed to the multi-layered film of any one of aspects 26-30, wherein a polymeric component of the blended material consists of one or more additional thermoplastic elastomeric polyurethane homopolymers or copolymers, and one or more second thermoplastic ethylene-vinyl alcohol copolymers.

In accordance with aspect 32, the present disclosure is directed to the multi-layered film of any one of aspects 26-31, wherein the polymeric component of the thermoplastic elastomeric material consists of one or more additional thermoplastic elastomeric polyester-polyurethane copolymers and one or more second thermoplastic ethylene-vinyl alcohol copolymers.

In accordance with aspect 33, the present disclosure is directed to the multi-layered film of any one of aspects 26-32, wherein the blended material comprises one or more recycled additional thermoplastic elastomers, or one or more recycled second thermoplastics, or both.

In accordance with aspect 34, the present disclosure is directed to the multi-layered film of any one of aspects 26-33, wherein the blended material is a phase-separated blend of the one or more additional thermoplastic elastomers and the one or more second thermoplastics.

In accordance with aspect 35, the present disclosure is directed to the multi-layered film of aspect 34, wherein the phase-separated blend includes one or more phase-separated regions including interfaces between the one or more additional thermoplastic elastomers and the one or more second thermoplastics.

In accordance with aspect 36, the present disclosure is directed to the multi-layered film of any one of aspects 26-35, wherein the blend comprises about 95 percent by weight of the one or more additional thermoplastic elastomers and about 5 percent by weight of the one or more second thermoplastics based on a total weight of the blend.

In accordance with aspect 37, the present disclosure is directed to the multi-layered film of any one of the preceding aspects, further comprising a recycled material comprising one or more recycled polymers, optionally wherein the one or more recycled polymers comprise one or more recycled thermoplastics, optionally wherein the one or more recycled thermoplastics comprise one or more recycled thermoplastic elastomers; optionally wherein the recycled material comprises a recycled material polymeric component consisting of one or more recycled thermoplastics, optionally wherein the recycled material polymeric component comprises or consists essentially of one or more recycled thermoplastic elastomers.

In accordance with aspect 38, the present disclosure is directed to the multi-layered film of aspect 37, wherein the recycled material comprises one or more recycled thermoplastic elastomers, optionally wherein the one or more recycled thermoplastic elastomers comprise one or more reground thermoplastic elastomers, optionally wherein the one or more recycled or reground thermoplastic elastomers includes a thermoplastic elastomeric material according to any one of aspects 10-19.

In accordance with aspect 39, the present disclosure is directed to the multi-layered film of aspect 36 or 37, wherein the recycled material further comprises one or more recycled second thermoplastics, optionally wherein the one or more recycled second thermoplastics comprise one or more reground second thermoplastics, optionally wherein the one or more recycled or reground second thermoplastics include a thermoplastic according to any one of aspects 26-29.

In accordance with aspect 40, the present disclosure is directed to the multi-layered film of aspect 39, wherein the recycled material comprises one or more recycled or reground thermoplastic polyurethane elastomers or one or more recycled or reground thermoplastic ethylene-vinyl alcohol copolymers or both.

In accordance with aspect 41, the present disclosure is directed to the multi-layered film of aspect 39 or 40, wherein the recycled material comprises a blend of the one or more recycled or reground thermoplastic elastomers and one or more second thermoplastics, or wherein the recycled material comprises a blend of one or more thermoplastic elastomers and one or more recycled thermoplastics or one or more recycled second thermoplastics, optionally wherein the blend is a phase-separated blend, and optionally wherein the phase-separated blend comprises one or more interfaces between the one or more recycled thermoplastic elastomers and the one or more second thermoplastics.

In accordance with aspect 42, the present disclosure is directed to the multi-layered film of any of aspects 37-41, wherein the recycled material comprises about 99 percent to about 90 percent by weight of the one or more recycled thermoplastic elastomers and about 1 percent to about 10 percent by weight of the one or more second thermoplastics based on a total weight of the recycled material, optionally wherein the recycled material comprises about 99 percent to about 93 percent by weight of the one or more recycled thermoplastic elastomers and about 1 percent to about 7 percent by weight of the one or more second thermoplastics, or about 99 percent to about 95 percent by weight of the one or more recycled thermoplastic elastomers and about 1 percent to about 5 percent by weight of the one or more second thermoplastic elastomers.

In accordance with aspect 43, the present disclosure is directed to the multi-layered film of any one of aspects 37-42, wherein the recycled material comprises about 99 percent to about 50 percent by weight of recycled or reground polymers based on a total weight of recycled material, optionally from about 99 percent to about 75 percent by weight of recycled or reground polymers.

In accordance with aspect 44, the present disclosure is directed to the multi-layered film of any of aspects 38-43, wherein the recycled material further comprises one or more virgin first thermoplastic elastomers, optionally wherein the one or more virgin first thermoplastic elastomers includes one or more virgin thermoplastic polyurethane elastomers.

In accordance with aspect 45, the present disclosure is directed to the multi-layered film of any one of the preceding aspects, further comprising one or more tie layers, each of the one or more tie layers individually comprising or consisting essentially of a tie material, wherein the one or more tie layers increase a bond strength between two adjacent layers.

In accordance with aspect 46, the present disclosure is directed to the multi-layered film of aspect 45, wherein the tie material of each of the one or more tie layers independently comprises or consists essentially of a polyurethane, a polyacrylate, an ethylene-acrylate copolymer, a maleic anhydride grafted polyolefin, or any combination thereof, optionally wherein the tie material comprises or consists essentially of a blended material according to any of aspects 26-36 or a recycled material according to any of aspects 37-44.

In accordance with aspect 47, the present disclosure is directed to the multi-layered film of aspect 45 or 46, wherein the tie material of the one or more tie layers independently comprises or consists essentially of one or more thermoplastic polyurethane elastomeric homopolymers or copolymers, optionally wherein the one or more tie layers comprise or consist essentially of a polydiene polyol-based thermoplastic polyurethane.

In accordance with aspect 48, the present disclosure is directed to the multi-layered film of any one of the preceding aspects, further comprising one or more structural layers, each of the one or more structural layers independently comprising or consisting essentially of a structural layer material, optionally wherein the structural layer material comprises or consists essentially of a blended material according to any of aspects 26-36 or a recycled material according to any of aspects 37-44.

In accordance with aspect 49, the present disclosure is directed to the multi-layered film of aspect 48, wherein the structural layer material of each of the one or more structural layers independently comprises or consists essentially of a polydiene polyol-based thermoplastic polyurethane.

In accordance with aspect 50, the present disclosure is directed to the multi-layered film of any one of the preceding aspects, wherein the elastomeric material of the one or more core regions is a first elastomeric material, wherein the multi-layered film further comprises a second elastomeric material, and wherein the formed multi-layered film further comprises:
a first structural layer secured to a first side of one of the one or more core regions, optionally wherein the first structural layer comprises the second elastomeric material and optionally has an average thickness ranging from about 900 micrometers to about 1990 micrometers; and
a second structural layer secured to a second side of the core region that is opposing to the first side of the core region, optionally wherein the second structural layer comprises the second elastomeric material and optionally has an average thickness ranging from about 900 micrometers to about 1990 micrometers.

In accordance with aspect 51, the present disclosure is directed to the multi-layered film of any one of the preceding aspects, further comprising one or more cap layers, wherein the one or more cap layers comprise or consist essentially of a cap layer material, optionally wherein the cap layer material comprises or consists essentially of a blended material according to any of aspects 26-36 or a recycled material according to any of aspects 37-44.

In accordance with aspect 52, the present disclosure is directed to the multi-layered film of aspect 51, wherein the cap layer material of the one or more cap layers comprises or consists essentially of a polyurethane, a polyacrylate, an ethylene-acrylate copolymer, a maleic anhydride grafted polyolefin, or any combination thereof.

In accordance with aspect 53, the present disclosure is directed to the multi-layered film of aspect 50 or 51, wherein the cap layer material of the one or more cap layers comprises or consists essentially of a thermoplastic polyurethane, optionally a polydiene polyol-based thermoplastic polyurethane.

In accordance with aspect 54, the present disclosure is directed to the multi-layered film of any one of aspects 51-53, wherein at least one of the one or more tie layers is positioned between one of the one or more structural layers and one of the one or more core regions.

In accordance with aspect 55, the present disclosure is directed to the multi-layered film of any one of aspects 51-54, wherein at least one of the one or more structural layers is positioned between one of the one or more tie layers and one of the one or more cap layers.

In accordance with aspect 56, the present disclosure is directed to the multi-layered film of any one of the preceding aspects, wherein the multi-layered film is a coextruded layered sheet, or a laminated layered sheet.

In accordance with aspect 57, the present disclosure is directed to the multi-layered film of any one of the preceding aspects, wherein the multi-layered film comprises a first cap layer, a first structural layer, a first tie layer, a core region, a second tie layer, a second structural layer, and a second cap layer, wherein a first cap layer inner surface contacts a first surface of the first structural layer, a second surface of the first structural layer contacts a first surface of the first tie layer, a second surface of the first tie layer contacts a first surface of the core region, a second surface of the core region contacts a first surface of the second tie layer, a second surface of the second tie layer contacts a first surface of the second structural layer, and a second surface of the second structural layer contacts an inner layer of the second cap layer.

In accordance with aspect 58, the present disclosure is directed to the multi-layered film of any one of aspects 45-57, wherein the multi-layered film has a structure of A-B-C-B-A, wherein A represents a structural layer, B represents a tie layer, and C represents a core region.

In accordance with aspect 59, the present disclosure is directed to the multi-layered film of any one of aspects 45-57, wherein the multi-layered film has a structure of D-A-B-C-B-A-D, wherein A represents a structural layer, B represents a tie layer, C represents a core region, and D represents a cap layer.

In accordance with aspect 60, the present disclosure is directed to the multi-layered film of any one of the preceding aspects, wherein the one or more core regions has a gas transmission rate of from about 0.3 to about 1.9 cubic centimeters per square meter per day for nitrogen measured at 23 degrees Celsius and 0 percent relative humidity for a structure having a thickness of from about 72 micrometers to about 320 micrometers, optionally wherein each of the one or more core regions has a gas transmission rate of from about 0.3 to about 1.9 cubic centimeters per square meter per day for nitrogen measured at 23 degrees Celsius and 0 percent relative humidity.

In accordance with aspect 61, the present disclosure is directed to the multi-layered film of any one of the preceding aspects, wherein the multi-layered film comprises one or more protective layers, each of the one or more protective layers individually comprising or consisting essentially of a protective material, wherein each of the one or more protective layers is adjacent to a core region and has a protective layer thickness, wherein a combination of the one or more protective layers and the adjacent core region has a minimum radius of curvature which is greater than a minimum radius of curvature which causes cracking of the core region, or of one or more individual layers within the core region.

In accordance with aspect 62, the present disclosure is directed to a method for manufacturing a multi-layered film, wherein the multi-layered film is a multi-layered film according to any one of aspects 1-61, the method comprising:

co-extruding the gas-barrier material and the elastomeric material to form the multi-layered film.

In accordance with aspect 63, the present disclosure is directed to the method of aspect 62, further comprising:

co-extruding at least one tie layer with the multi-layered film comprising the core region to form a multi-layered film comprising the one or more core regions and the tie layer.

In accordance with aspect 64, the present disclosure is directed to the method of aspect 62 or 63, further comprising:

applying at least one structural layer to the multi-layered film comprising the core region and the tie layer to form a multi-layered film comprising the one or more core regions, the tie layer, and the structural layer, wherein the structural layer comprises a structural layer material according to aspect 48 or 49.

In accordance with aspect 65, the present disclosure is directed to the method of aspect 62 or 63 further comprising:

co-extruding at least one structural layer with the multi-layered film comprising the core region and the tie layer to form a multi-layered film comprising the one or more core regions, the tie layer, and the structural layer.

In accordance with aspect 66, the present disclosure is directed to the method of any one of aspects 62-65, further comprising:

co-extruding at least one cap layer with the multi-layered film comprising the core region, the tie layer, and the structural layer to form a multi-layered film comprising the core region, the tie layer, the structural layer, and the cap layer.

In accordance with aspect 67, the present disclosure is directed to a multi-layered film produced by the method of any one of aspects 62-66.

In accordance with aspect 68, the present disclosure is directed to an article comprising the multi-layered film of any one of aspects 1-61 or 67, wherein the multi-layered film of the article comprises a series of three or more layers, including a first cap layer comprising or consisting essentially of a first cap layer material, the first cap layer including a first cap layer outer surface defining a first outer surface of the multi-layered film, a first cap layer inner surface opposing the first cap layer outer surface, a first cap layer thickness extending from the first cap layer inner surface to the first cap layer outer surface, wherein the first cap layer outer surface defines a first exterior surface of the article;

optionally, a second cap layer comprising or consisting essentially of a second cap layer material, the second cap layer including a second cap layer outer surface defining a second outer surface of the multi-layered film, a second cap layer inner surface opposing the second cap layer outer surface, a second cap layer thickness extending from the second cap layer inner surface to the second cap layer outer surface, optionally wherein the second cap layer outer surface defines a second exterior surface of the article; and the one or more core regions, each of the one or more core regions including a core region first surface, a core region second surface, and a core region thickness extending from the core region first surface to the core region second surface, wherein each of the one or more core regions is positioned between the first cap layer inner surface and the second cap layer inner surface.

In accordance with aspect 69, the present disclosure is directed to the article of aspect 68, wherein, in the multi-layered film, the second cap layer is present and wherein the first cap layer material and the second cap layer material are substantially the same.

In accordance with aspect 70, the present disclosure is directed to the article of aspect 68, wherein, in the multi-layered film, the second cap layer is present and wherein the first cap layer material and the second cap layer material are different.

In accordance with aspect 71, the present disclosure is directed to the article of any one of aspects 68-70, wherein, in the multi-layered film, the first cap layer inner surface is in contact with the core region first surface, or the optional second cap layer inner surface is in contact with the core region second surface, or both.

In accordance with aspect 72, the present disclosure is directed to the article of any one of aspects 68-71, wherein the multi-layered film of the article is configured as a series of four of more layers including one or more structural layers, each of the one or more structural layers comprising a structural layer material and including a structural layer first surface, a structural layer second surface opposing the structural layer first surface, and a structural layer thickness extending from the structural layer first surface to the structural layer second surface;

optionally wherein at least one of the one or more structural layers is positioned between the first cap layer and the core region, or between the second cap layer and the core region; or optionally wherein the one or more structural layers comprise two or more structural layers, and at least a first one of the two or more structural layers is positioned between an inner surface of a first cap layer and the first surface of a core region, and at least a second one of the two or more structural layers is positioned between a second surface of a core region and the inner surface of the second cap layer.

In accordance with aspect 73, the present disclosure is directed to the article of aspect 72, wherein, in the multi-layered film, a first surface of a first one of the structural layers is in contact with the inner surface of the first cap layer, and the second surface of the first one of the structural layers is in contact with a first surface of one of the one or more core regions, or wherein the first surface of a second one of the one or more structural layers is in contact with the second surface of one of the one or more core regions, and the second surface of the second one of the structural layers is in contact with an inner surface of the second cap layer, or both.

In accordance with aspect 74, the present disclosure is directed to the article of any one of aspects 68-73, wherein, in the multi-layered film, the one or more structural layers comprise or consist essentially of the blended material of any one of aspects 26-36.

In accordance with aspect 75, the present disclosure is directed to the article of any one of aspects 68-73, wherein, in the multi-layered film, the one or more structural layers comprise or consist essentially of the recycled material of any one of aspects 37-44.

In accordance with aspect 76, the present disclosure is directed to the article of any one of aspects 68-75, wherein the multi-layered film of the article is configured as a series of five or more layers including one or more tie layers, each of the one or more tie layers including a tie layer first surface, a tie layer second surface opposing the tie layer first surface, and a tie layer thickness extending from the tie layer first surface to the tie layer second surface;

optionally wherein at least one of the one or more tie layers is positioned between one of the one or more structural layers and one of the one or more core regions, or between the first cap layer and one of the one or more structural layers, or between the second cap layer and one of the one or more structural layers, or any combination thereof; or optionally wherein the one or more tie layers comprise two or more tie layers, and at least a first one of the two or more tie layers is positioned between a second surface of a first structural layer and a first layer of a core region, and at least a second one of the two or more tie layers is positioned between a second surface of a core region and a first surface of a structural layer.

In accordance with aspect 77, the present disclosure is directed to the article of aspect 76, wherein, in the multi-layered film, a first surface of a first one of the one or more tie layers is in contact with a second surface of a first one of the one or more structural layers, and the second surface of the first one of the one or more tie layers is in contact with a first surface of a core region; or wherein a first surface of a second one of the one or more tie layers is in contact with a second surface of one of the one or more core regions, and the second surface of the second one of the one or more tie layers is in contact with a first surface of a second one of the one or more structural layers, or both.

In accordance with aspect 78, the present disclosure is directed to the article of any one of aspects 76 or 77, wherein the multi-layered film of the article comprises a first cap layer, a first structural layer, a first tie layer, a core region, a second tie layer, a second structural layer, and a second cap layer, wherein the first cap layer inner surface contacts the first surface of the first structural layer, the second surface of the first structural layer contacts the first surface of the first tie layer, the second surface of the first tie layer contacts the first surface of the core region, the second surface of the core region contacts the first surface of the second tie layer, the second surface of the second tie layer contacts the first surface of the second structural layer, and the second surface of the second structural layer contacts the inner layer of the second cap layer.

In accordance with aspect 79, the present disclosure is directed to the article any one of aspects 68-78, wherein the article is a layered sheet, optionally wherein the layered sheet is a coextruded layered sheet, or is a laminated layered sheet.

In accordance with aspect 80, the present disclosure is directed to the article of any one of aspects 68-79, wherein the article comprises a cushioning element.

In accordance with aspect 81, the present disclosure is directed to the article of aspect 80, wherein the multi-layered film forms an external-facing layer of the cushioning element.

In accordance with aspect 82, the present disclosure is directed to the article of aspect 80 or 81, wherein the multi-layered film is effective at retaining a fluid in the cushioning element.

In accordance with aspect 83, the present disclosure is directed to the article of any one of aspects 80-82, wherein the cushioning element is a component of an article of footwear, apparel, or sporting equipment.

In accordance with aspect 84, the present disclosure is directed to an article comprising the multi-layered film of any one of aspects 1-61 or 67.

In accordance with aspect 85, the present disclosure is directed to the article of aspect 84, wherein the article comprises an article of footwear, a component of an article footwear, an article of apparel, a component of an article of apparel, an article of sporting equipment, a component of an article of sporting equipment, a personal protective article, a flexible flotation device, a rigid flotation device, a medical device, a prosthetic device, an orthopedic device, an accumulator, an article of furniture, or a component of an article of furniture.

In accordance with aspect 86, the present disclosure is directed to the article of aspect 84, wherein the article comprises a tire or a hose.

In accordance with aspect 87, the present disclosure is directed to a method of manufacturing a consumer product, the method comprising affixing the article of any one of aspects 84-86 to a second component.

In accordance with aspect 88, the present disclosure is directed to a consumer product produced by the method of aspect 87.

In accordance with aspect 89, the present disclosure is directed to a method for producing the multi-layered film of any one of aspects 1-61, comprising:

co-extruding gas-barrier material and elastomeric material to form a multi-layered film comprising the one or more core regions.

In accordance with aspect 90, the present disclosure is directed to the method of aspect 89, further comprising:

applying at least one tie layer to the multi-layered film comprising the one or more core regions to form a multi-layered film comprising the one or more core regions and the tie layer, wherein the tie layer comprises a tie material according to aspect 45.

In accordance with aspect 91, the present disclosure is directed to the method of aspect 89, further comprising:

co-extruding at least one tie layer with the multi-layered film comprising the core region to form a multi-layered film comprising the one or more core regions and the tie layer.

In accordance with aspect 92, the present disclosure is directed to the method of any one of aspects 89-91, further comprising:

applying at least one structural layer to the multi-layered film comprising the core region and the tie layer to form a multi-layered film comprising the one or more core regions, the tie layer, and the structural layer, wherein the structural layer comprises a structural layer material according to aspect 47.

In accordance with aspect 93, the present disclosure is directed to the method of aspect 92, further comprising:

co-extruding at least one structural layer with the multi-layered film comprising the core region and the tie layer to form a multi-layered film comprising the one or more core regions, the tie layer, and the structural layer.

In accordance with aspect 94, the present disclosure is directed to the method of any one of aspects 89-93, further comprising:

applying at least one cap layer to the multi-layered film comprising the core region, the tie layer, and the structural layer to form a multi-layered film comprising the core region, the tie layer, the structural layer, and the cap layer, wherein the cap layer comprises a cap layer material according to any one of aspects 51-53.

In accordance with aspect 95, the present disclosure is directed to the method of any one of aspects 89-93, further comprising:

co-extruding at least one cap layer with the multi-layered film comprising the core region, the tie layer, and the structural layer to form a multi-layered film comprising the core region, the tie layer, the structural layer, and the cap layer.

In accordance with aspect 96, the present disclosure is directed to the multi-layered film of any one of aspects 1-61 or 67, further comprising a decorative element.

In accordance with aspect 97, the present disclosure is directed to a method for applying a decorative element to the multi-layered film of any one of aspects 1-61 or 67, wherein the method comprises applying the decorative element by printing, painting, brushing, or spraying the decorative element onto the multi-layered film; or dipping the multi-layered film into the decorative element; or pressing the decorative element and the multi-layered film together, wherein the decorative element is in the form of a solid, a liquid, or a gas when applied to the multi-layered film, optionally wherein the decorative element comprises a pigment or a dye or both a pigment and a dye.

In accordance with aspect 98, the present disclosure is directed to the method of aspect 96 or 97, wherein the decorative element comprises pigments or dyes or both, and the step of applying the decorative element onto the multi-layered film comprises curing the decorative element on the multi-layered film, optionally wherein the curing comprises drying the decorative element, or crosslinking the decorative element, or infusing at least a portion of the decorative element into a polymeric material of an exterior surface of the multi-layered film, or bonding the decorative element to the exterior surface of the multi-layered film, or any combination thereof.

In accordance with aspect 99, the present disclosure is directed to the method of aspect 98, wherein the method comprises the step of bonding the decorative element to the exterior surface of the multi-layered film, and the bonding includes forming an adhesive bond by applying an adhesive to a first side of the decorative element or to the exterior surface of the multi-layered film, or both, and then pressing together the first side of the decorative element and the exterior surface of the multi-layered film.

In accordance with aspect 100, the present disclosure is directed to the method of aspect 98, wherein the method comprises the step of bonding the decorative element to the exterior surface of the multi-layered film, and the bonding includes forming a thermal bond between a thermoplastic material of a first side of the decorative element and a thermoplastic material defining the exterior surface of the multi-layered film, by softening or melting at least an outer portion of one or both of the thermoplastic materials, and pressing the first side of the decorative element and the exterior surface of the multi-layered film against each other while the one or both of the thermoplastic materials are softened or melted, and then re-solidifying the softened or melted outer portion.

In accordance with aspect 101, the present disclosure is directed to the method of aspect 98, wherein the decorative element is applied to an exterior surface of the multi-layered film, and, during applying or during the curing or during both the applying and the curing, the decorative element infuses into a material defining the exterior surface of the multi-layered film, optionally wherein the decorative element is applied as a solution of a dye.

In accordance with aspect 102, the present disclosure is directed to a multi-layered film comprising a decorative element applied according to the method of any one of aspects 97-101.

Bladders and Airbags

In one aspect, an airbag can include a first sheet, a second sheet, or both a first sheet and a second sheet of the multi-layered film that are bonded together (e.g., thermally bonded) to form an internal cavity in a space between the first and second sheets, where the bond extends around at least a portion of a perimeter of the internal cavity. The internal cavity can be inflated with one or more fluids (e.g., one or more gases) during or after the bonding step. In some aspects, the bond extends around the entire perimeter of the internal cavity, providing a sealed airbag. In other aspects, the bond extends around only a portion of the entire perimeter (e.g., around most of the entire perimeter) and defines a sealable aperture configured to receive fluid(s)/gases(s) to the internal cavity. Under each aspect, when inflated and sealed, the resulting airbag is capable of retaining the received fluid(s)/gases(s) in the internal cavity for extended usage due to the gas-barrier properties of the multi-layered film. In some aspects, the bladder can comprise a second multi-layered film, optionally wherein the structure of the second multi-layered film differs from the structure of the first multi-layered film in number of gas-barrier layers and elastomeric layers, or differs in thickness of gas-barrier layers and elastomeric layers, or differs in both number and thickness of gas-barrier layers and elastomeric layers.

As discussed in more detail below, the multi-layered film includes one or more core regions, where each of the one or more core regions comprises multiple layers that alternate between thin gas-barrier layers (each having at least one gas-barrier material) and elastomeric layers (each having at least one elastomeric material). In an aspect, in the core region, the gas-barrier material(s) of the gas-barrier layers and the elastomeric material(s) of the elastomeric layers have similar processing characteristics and can be co-extruded with reduced interlayer shear. This allows the alternating gas-barrier layers and elastomeric layers to be co-extended while retaining their structural integrities and desired layer thicknesses for use in the resulting multi-layered films.

In an aspect, to impart good gas-barrier properties, the gas-barrier materials of the gas-barrier layers are typically less flexible (e.g., more glass-like) than the elastomeric materials of the elastomeric layers. In particular, the elastomeric materials of the elastomeric layers may have a lower glass transition temperature than the gas-barrier materials of the gas-barrier layers, for example 20 degrees Celsius lower, optionally 50 degrees Celsius lower. As such, the gas-barrier layers of the core region(s) are more susceptible to microscopic cracking when subjected to repeated, excessive stress loads, such as those potentially generated during flexing and release of the multi-layered film.

However, in one aspect, it has been found that the use of at least about twenty, at least about thirty, or at least about forty gas-barrier layers, where each gas-barrier layer has an average layer thickness of less than about 2 micrometers, or from about 0.5 micrometers to about 2 micrometers, optionally less than about 0.5 micrometers, and a corresponding number of elastomeric layers such that each core region alternates between the gas-barrier layers and the elastomeric layers, can increase the flexibility of the core region(s), while maintaining the durability and gas-barrier properties of the multi-layered film. As such, airbags incorporating the multi-layered film can be designed to withstand repeated flexing and release (e.g., by walking, running, and jumping) with reduced or no visually observable cracking, crazing, or hazing over extended usage.

It has been found that the use of at least 20, or at least 30, or at least 40 gas-barrier layers, where each gas-barrier layer has an average layer thickness of less than about 2 micrometers, optionally of less than about 0.75 micrometers, or optionally of less than about 0.5 micrometers, or in a range of from about 0.5 micrometers to about 2 micrometers, optionally in a range of from about 0.01 to about 0.75 micrometers, or optionally in a range of from about 0.01 to about 0.5 micrometers, and a corresponding number of elastomeric layers such that in each core region, the gas-barrier layers and the elastomeric layers alternate, can increase the flexibility of the core region(s), while maintaining the durability and gas-barrier properties of the multi-layered film. As such, airbags incorporating the multi-layered film can be designed to withstand repeated flexing and release (e.g., by walking, running, and jumping) with reduced with reduced or no visually observable cracking, crazing, or hazing over extended usage.

In an aspect, the multi-layered films and airbags, bladders, and other enclosed and/or hollow articles constructed therefrom are configured to withstand repeated flexing and release without cracking, crazing, or developing haze or other significant appearance changes. In an exemplary aspect, a bladder constructed from sheets comprising the multi-layered films can be incorporated as a cushioning element into a sole structure of an article of footwear. Further in this aspect, actions such as walking, running, and jumping may cause flexing and release of the bladder; however, bladders and other articles comprising the multi-layered films have a longer useful lifetime than known cushioning elements. In one aspect, disclosed herein is an article comprising the disclosed multi-layered films. In one aspect, the article is a cushioning element. In another aspect, the multi-layered film forms an external-facing layer of the cushioning element and is effective at retaining a fluid in the cushioning element. In any of these aspects, the cushioning element is a component of a consumer good such as an article of footwear, apparel, or sporting equipment. In another aspect, the cushioning element is a cushioning element for an article of footwear, and the cushioning element for the article of footwear is an airsole.

In another aspect, each of the elastomeric layers can have an average thickness of from about 2 micrometers to about 8 micrometers, or from about 2 micrometers to about 5 micrometers, from about 5 micrometers to about 8 micrometers, or from about 4 micrometers to about 6 micrometers.

In some aspects, the core region comprises at least 50 gas-barrier layers, or from about 50 to about 100 gas-barrier layers, from about 60 to about 80 gas-barrier layers, or from about 60 to about 70 gas-barrier layers. In one aspect, the core region comprises at least 50 elastomeric layers, or from about 50 to about 100 elastomeric layers, from about 60 to about 80 elastomeric, or from about 60 to about 70 elastomeric layers.

In one aspect, the average total thickness of the core region ranges from about 125 to about 200 micrometers and the multi-layered film further includes a first structural layer secured to a first side of the core region, wherein the first structural layer has an average thickness of from about 900 micrometers to about 1990 micrometers, optionally from about 900 micrometers to about 1500 micrometers, from about 1500 micrometers to about 1990 micrometers, or from about 1000 micrometers to about 1400 micrometers; and a second structural layer secured to a second side of the core region that is opposite to the first side of the core region, wherein the second structural layer has an average thickness of from about 900 micrometers to about 1990 micrometers, optionally from about 900 micrometers to about 1500 micrometers, from about 1500 micrometers to about 1990 micrometers, or from about 1000 micrometers to about 1400 micrometers.

In another aspect, the structural layer material of each of the one or more structural layers independently comprises or consists essentially of a polydiene polyol-based thermoplastic polyurethane.

In another aspect, the disclosed bladders further include one or more cap layers comprising or consisting essentially of a cap layer material. In another aspect, the cap layer material of the one or more cap layers comprises or consists essentially of a polyurethane, a polyacrylate, an ethylene-acrylate copolymer, a maleic anhydride grafted polyolefin, or any combination thereof. In still another aspect, each cap layer has a thickness of from about 5 micrometers to about 25 micrometers, or from about 5 micrometers to about 10 micrometers, or from about 10 micrometers to about 20 micrometers.

In still another aspect, the disclosed bladders further include one or more tie layers, each of the one or more tie layers comprising or consisting essentially of a tie material, wherein the one or more tie layers increase a bond strength between two adjacent layers. In another aspect, the tie material of each of the one or more tie layers independently comprises or consists essentially of a polyurethane, a polyacrylate, an ethylene-acrylate copolymer, a maleic anhydride grafted polyolefin, or any combination thereof. In still another aspect, each of the one or more tie layers has a thickness of from about 5 micrometers to about 20 micrometers, or from about 5 micrometers to about 10 micrometers, or from about 10 micrometers to about 20 micrometers.

The multi-layered films, airbags, or bladders disclosed herein may comprise or consist of one or more gas-barrier layers. As used herein, a gas-barrier layer is understood to be a membrane comprising or consisting essentially of a gas-barrier material, where the thickness of the gas-barrier material in the gas-barrier layer is at least 0.01 microns. The gas-barrier material comprises or consists essentially of one or more gas-barrier compounds, including one or more polymeric gas-barrier compounds (i.e., gas-barrier polymers), or one or more non-polymeric gas-barrier compounds, or a combination of one or more gas-barrier polymers and one or more non-polymeric gas-barrier compounds. Polymeric and non-polymeric gas-barrier compounds have the ability to restrict the passage of gasses through the material. While no polymer offers an infinite gas-barrier, gas-barrier polymers typically exhibit higher level of crystallinity at room temperature, and higher levels of intramolecular hydrogen bonding, as compared with polymers which are poor gas-barriers. Many examples of gas-barrier polymers and non-polymeric gas-barrier compounds are known in the art. The one or more gas-barrier compounds can include one or more gas-barrier polymers, optionally one or more thermoplastic gas-barrier polymers. In the multi-layered film, one or more gas-barrier layers may be used alone, or in combination with other layers formed of other materials, including other polymeric materials such as elastomeric materials. The other layers formed of elastomeric materials are referred to as "elastomeric layers," and the elastomeric material comprises or consists essentially of one or more elastomers, optionally one or more thermoplastic elastomers. A "core region" is an internal region of the multi-layered film in which the one or more gas-barrier layers are located. In many aspects, the core region comprises a plurality of individual gas-barrier layers each alternating with a layer formed of other materials. Optionally, the core region comprises a plurality of gas-barrier layers each having an average thickness of less than or equal to about 0.75 micrometers, each of the gas-barrier layers alternating with an elastomeric layer, optionally at least 20 individual gas-barrier layers each alternating with an elastomeric layer. When used alone or in combination with other materials (optionally, elastomeric materials) in an airbag or bladder, the core region resiliently retains the gas. Depending upon the structure and use of the airbag or bladder, the core region may retain the gas at a pressure which is above, at, or below atmospheric pressure. Examples of gasses include air, oxygen gas ($O_2$), and nitrogen gas ($N_2$), as well as inert gasses. In one aspect, the gas-barrier layer is a nitrogen gas-barrier layer.

The gas transmission rate of the core region of the multi-layered film or of the entire multi-layered film, such as the oxygen gas or nitrogen gas transmission rate, can be measured using ASTM D1434. Thus, as used herein, the term "gas-barrier" material may refer to a material forming one or more layers in a core region of a multi-layered film, the core region of the multi-layered film having a total thickness less than or equal to 500 micrometers, optionally less than or equal to 300 micrometers, or less than or equal to 200 micrometers, or less than or equal to 100 micrometers, in which the core region, or the multi-layered film as a whole, has an oxygen gas or nitrogen gas transmission rate as measured using ASTM D1434 of less than or equal to about 4 cubic centimeters per square meter per day, optionally less than or equal to about 3 cubic centimeters per square meter per day.

In one aspect, the gas-barrier layer comprise a multi-layered film comprising a plurality of layers, the plurality of layers comprising one or more gas-barrier layers, the one or more gas-barrier layers comprising a gas-barrier material, the gas-barrier material comprising or consisting essentially of one or more gas-barrier compounds. The multi-layered film comprises at least 5 layers or at least 10 layers. Optionally, the multi-layered film comprises from about 5 to about 200 layers, from about 10 to about 100 layers, from about 20 to about 80 layers, from about 20 to about 50 layers, or from about 40 to about 90 layers. In particular, the multi-layered film may comprise about 20 or more gas-barrier layers, or about 30 or more gas-barrier layers, or about 40 or more gas-barrier layers, optionally fewer than 70 gas-barrier layers.

In one aspect of a multi-layered film, the plurality of layers includes a series of alternating layers, in which the alternating layers include two or more gas-barrier layers, each of the two or more gas-barrier layers individually comprising a gas-barrier material, the gas-barrier material comprising or consisting essentially of one or more gas-barrier compounds. In the series of alternating layers, adjacent layers are individually formed of materials which differ from each other at least in their chemical compositions based on the individual components present (e.g., the materials of adjacent layers may differ based on whether or not a gas-barrier compound is present, or differ based on class or type of gas-barrier compound present), the concentration of the individual components present (e.g., the materials of adjacent layers may differ based on the concentration of a specific type of gas-barrier compound present), or may differ based on both the components present and their concentrations.

The plurality of layers of the multi-layered film can include first gas-barrier layers comprising a first gas-barrier material and second gas-barrier layers comprising a second gas-barrier material, wherein the first and second gas-barrier materials differ from each other based as described above. The first gas-barrier material can be described as comprising a first gas-barrier component consisting of all the gas-barrier compounds present in the first gas-barrier material, and the second gas-barrier material can be described as comprising a second gas-barrier material component consisting of all the gas-barrier compounds present in the second gas-barrier material. The first gas-barrier component may consist only of one or more gas-barrier polymers, and the second gas-barrier component may consist only of one or more inorganic gas-barrier compounds. The first gas-barrier component may consist of a first one or more gas-barrier polymers, and the second gas-barrier component may consist of a second one or more gas-barrier polymers, wherein the first one or more gas-barrier polymers differ from the second one or more gas-barrier polymers in polymer class, type, or concentration. The first gas-barrier component and the second gas-barrier component may both include the same type of gas-barrier compound, but the concentration of the gas-barrier compound may differ, optionally the concentrations may differ by at least 5 weight percent based on the weight of the gas-barrier material. In these multi-layered films, the first gas-barrier layers and the second gas-barrier layers may alternate with each other, or may alternate with additional gas-barrier layers (e.g., third gas-barrier layers comprising a third gas-barrier material, fourth gas-barrier layers comprising a fourth gas-barrier material, etc., wherein each of the first, second, third and fourth, etc., gas-barrier materials may differ from each other as described above).

The gas-barrier material comprises or consists essentially of one or more gas-barrier compounds. The one or more gas-barrier compounds may comprise one or more gas-barrier polymers, or may comprise one or more non-polymeric gas-barrier compounds, including one or more inorganic gas-barrier compounds, or may comprise a combination of at least one gas-barrier polymer and at least one non-polymeric gas-barrier compound. The combination of at least one gas-barrier polymer and at least one non-polymeric gas-barrier compound, including at least one inorganic gas-barrier compound, may comprise a blend or mixture, or may comprise a composite in which fibers, particles, or platelets of the non-polymeric gas-barrier compound are surrounded by the gas-barrier polymer.

The gas-barrier material may comprise or consist essentially of one or more inorganic gas-barrier compounds. The one or more inorganic gas-barrier compounds may take the form of fibers, particulates, platelets, or combinations thereof. The fibers, particulates, platelets may comprise or consist essentially of nanoscale fibers, particulates, platelets, or combinations thereof. Examples of inorganic gas-barrier compounds include carbon fibers, glass fibers, glass flakes, silicas, silicates, calcium carbonate, clay, mica, talc, carbon black, particulate graphite, metallic flakes, and combinations thereof. The inorganic gas-barrier component may comprise or consist essentially of one or more clays. Examples of suitable clays include bentonite, montmorillonite, kaolinite, and mixtures thereof. The inorganic gas-barrier component may consist of clay. Optionally, the gas-barrier material may further comprise one or more additional ingredients, such as a polymer, processing aid, colorant, or any combination thereof. In aspects where the gas-barrier material comprises or consists essentially of one or more inorganic barrier compounds, the gas-barrier material may be described as comprising an inorganic gas-barrier component consisting of all inorganic gas-barrier compounds present in the gas-barrier material. When one or more inorganic gas-barrier compounds are included in the gas-barrier material, the total concentration of the inorganic gas-barrier component present in the gas-barrier material can be less than 60 weight percent, or less than 40 weight percent, or less than 20 weight percent of the total composition. Alternatively, the gas-barrier material may consist essentially of the one or more inorganic gas-barrier materials.

The gas-barrier compound may comprise or consist essentially of one or more gas-barrier polymers. The one or more gas-barrier polymers may include one or more thermoplastic polymers. The gas-barrier material may comprise or consist essentially of one or more thermoplastic polymers, meaning that the gas-barrier material comprises or consists essentially of a plurality of thermoplastic polymers, including thermoplastic polymers which are not gas-barrier polymers. In another example, the gas-barrier material may comprise or consist essentially of one or more thermoplastic gas-barrier polymers, meaning that all the polymers present in the gas-barrier material are thermoplastic gas-barrier polymers. The gas-barrier material can be described as comprising a polymeric component consisting of all polymers present in the gas-barrier material. For example, the polymeric component of the gas-barrier material may consist of a single class of gas-barrier polymer, such as, for example, one or more polyolefins, or can consist of a single type of gas-barrier polymer, such as one or more ethylene-vinyl alcohol copolymers. Optionally, the gas-barrier material may further comprise one or more non-polymeric additives, such as one or more fillers, processing aids, colorants, or any combination thereof.

Many gas-barrier polymers are known in the art. Examples of gas-barrier polymers include vinyl polymers such as vinylidene chloride polymers, acrylic polymers such as acrylonitrile polymers, polyamides, epoxy polymers, amine polymers, polyolefins such as polyethylenes and polypropylenes, copolymers thereof, such as ethylene-vinyl alcohol copolymers, and mixtures thereof. Examples of thermoplastic gas-barrier polymers include thermoplastic vinyl homopolymers and copolymers, thermoplastic acrylic homopolymers and copolymers, thermoplastic amine homopolymers and copolymers, thermoplastic polyolefin homopolymers and copolymers, and mixtures thereof. The one or more gas-barrier polymers may comprise or consist essentially of one or more thermoplastic polyethylene copolymers, such as, for example, one or more thermoplastic ethylene-vinyl alcohol copolymers. The one or more ethylene-vinyl alcohol copolymers may include from about 28 mole percent to about 44 mole percent ethylene content, or from about 32 mole percent to about 44 mole percent ethylene content. The one or more gas-barrier polymers may comprise or consist essentially of one or more polyethyleneimines, polyacrylic acids, polyethyleneoxides, polyacrylamides, polyamidoamines, or any combination thereof.

In another aspect, in addition to the one or more gas-barrier layers (e.g., including first gas-barrier layers, second gas-barrier layers, etc.), the multi-layered film further comprises one or more second layers, the one or more second layers comprising a second material. Optionally, the second material comprises one or more polymers. The one or more gas-barrier layers may include a plurality of gas-barrier layers alternating with a plurality of second layers. Each of the one or more barrier layers may be positioned between two second layers (e.g., with one second layer positioned on a first side of the barrier layer, and another second layer on a second side of the gas-barrier layer, the second side opposing the first side).

Depending upon the class of gas-barrier compounds used and the intended use of the multi-layered film, the second material may have a higher gas transmittance rate than the gas-barrier material, meaning that the second material is a poorer gas-barrier than the gas-barrier material. In some aspects, the one or more second layers act as substrates for the one or more gas-barrier layers, and may serve to increase the strength, elasticity, and/or durability of the multi-layered film. Alternatively or additionally, the one or more second layers may serve to decrease the amount of gas-barrier material(s) needed, thereby reducing the overall material cost. Even when the second material has a relatively high gas transmittance rate, the presence of the one or more second layers, optionally when the one or more second layers are positioned between one or more barrier layers, may help maintain the overall gas-barrier properties of the film by increasing the distance between cracks in the gas-barrier layers, thereby increasing the distance gas molecules must travel between cracks in the barrier layers in order to pass through the multi-layered film. While small fractures or cracks in the gas-barrier layers of a multi-layered film may not significantly impact the overall barrier properties of the film, using thinner gas-barrier layers, or using a larger number of thinner gas-barrier layers, can avoid or reduce visible cracking, crazing, or hazing of the multi-layered film. The one or more second layers may include, but are not limited to, a tie layer located between and promoting adhesion between two different layers of the multi-layered film, a structural layer providing mechanical support to the multi-layered film, a bonding layer including a bonding material such as a hot melt adhesive material to an exterior surface of the multi-layered film, a cap layer providing protection to an exterior surface of the multi-layered film, and any combination thereof.

The second material may be an elastomeric material comprising or consisting essentially of at least one elastomer. As used herein, the term elastomer may refer to a material having an elongation at break of greater than 400 percent, determined in accordance with ASTM D-412-98 at 25 degrees Celsius. Optionally, the term elastomer may refer to a material that, when formed into a plaque, has a break strength of from 10 to 35 kilogram-force, such as from about 10 to about 25 kilogram-force, from about 10 to about 20 kilogram-force, from about 15 to about 35 kilogram-force, or from about 20 to about 30 kilogram-force. Optionally, the tensile breaking strength or ultimate strength of an elastomer, if adjusted for cross-sectional area, may be greater than 70 kilogram-force per square centimeter, or greater than 80 kilogram-force per square centimeter. Optionally, an elastomer, when formed into a plaque, has a strain to break of from 450 percent to 800 percent, or from 500 to 800 percent, or from 500 to 750 percent, or from 600 to 750 percent, or from 450 to 700 percent. As another option, an elastomer plaque may have a load at 100 percent strain of from 3 to 8 kilogram-force per millimeter, or of about 3 to about 7 kilogram-force per millimeter, about 3.5 to about 6.5 kilogram-force per millimeter, or about 4 to about 5 kilogram-force per millimeter. Optionally, the elastomer plaque has a toughness of from 850 kilogram·millimeters to 2200 kilogram·millimeters, or of from about 850 kilogram·millimeters to about 2000 kilogram·millimeters, or of from about 900 kilogram·millimeters to about 1750 kilogram·millimeters, or of from about 1000 kilogram·millimeters to about 1500 kilogram·millimeters, or of from about 1500 kilogram·millimeters to about 2000 kilogram·millimeters. Optionally, the elastomer plaque has a stiffness of from about 35 to about 155, or of from about 50 to about 150, or of from about 50 to about 100, or of from about 50 to about 75, or of from about 60 to about 155, or of from about 80 to about 150. Optionally, the elastomer plaque has a tear strength of from about 35 to about 80, or of from about 35 to about 75, or of from about 40 to about 60, or of from about 45 to about 50. Many gas-barrier compounds are brittle and/or relatively inflexible, and so the one or more gas-barrier layers may be susceptible to cracking when subjected to repeated, excessive stress loads, such as those potentially generated during flexing and release of a multi-layered film. Thus, the elastomeric material may have a lower glass transition temperature than that of the gas-barrier material (when it comprises one or more polymers), for example 20 degrees Celsius lower, optionally 50 degrees Celsius lower. A multi-layered film which includes one or more gas-barrier layers alternating with second layers of an elastomeric material results in a multi-layered film that is better able to withstand repeated flexing and release while maintaining its gas-barrier properties, as compared to a film without the elastomeric second layers present.

In one aspect, the second material comprises or consists essentially of one or more polymers. As used herein, the one or more polymers present in the second material are referred to herein as one or more "second polymers" or a "second polymer," as these polymers are present in the second material. References to "second polymer(s)" are not intended to indicate that a "first polymer" is present, either in the second material, or in the multi-layered film as a whole, although, in many aspects, multiple classes or types of polymers are present. In one aspect, the second material comprises or consists essentially of one or more thermoplastic polymers. In another aspect, the second material comprises or consists essentially of one or more elastomeric polymers. In yet another aspect, the second material comprises or consists essentially of one or more thermoplastic elastomers. The second material can be described as comprising a polymeric component consisting of all polymers present in the second material. In one example, the polymeric component of the second material consists of one or more elastomers. Optionally, the second material can further comprise one or more non-polymeric additives, such as fillers, processing aids, and/or colorants.

Many polymers which are suitable for use in the second material are known in the art. Exemplary polymers which can be included in the second material (e.g., second polymers) include polyolefins, polyamides, polycarbonates, polyimines, polyesters, polyacrylates, polyesters, polyethers, polystyrenes, polyureas, and polyurethanes, including homopolymers and copolymers thereof (e.g., polyolefin homopolymers, polyolefin copolymers, etc.), and combinations thereof. In one example, the second material comprises or consists essentially of one or more polymers chosen from polyolefins, polyamides, polyesters, polystyrenes, and polyurethanes, including homopolymers and copolymers thereof, and combinations thereof. In another example, the polymeric component of the second material consists of one or more thermoplastic polymers, or one or more elastomers, or one or more thermoplastic elastomers, including thermoplastic vulcanizates. Alternatively, the one or more second polymers can include one or more thermoset or thermosettable elastomers, such as, for example, natural rubbers and synthetic rubbers, including butadiene rubber, isoprene rubber, silicone rubber, and the like.

Polyolefins are a class of polymers which include monomeric units derived from simple alkenes, such as ethylene, propylene, and butene. Examples of thermoplastic polyolefins include polyethylene homopolymers, polypropylene homopolymers, polypropylene copolymers (including polyethylene-polypropylene copolymers), polybutene, ethylene-octene copolymers, olefin block copolymers, propylene-butane copolymers, and combinations thereof, including blends of polyethylene homopolymers and polypropylene homopolymers. Examples of polyolefin elastomers include polyisobutylene elastomers, poly(alpha-olefin) elastomers, ethylene propylene elastomers, ethylene propylene diene monomer elastomers, and combinations thereof.

Polyamides are a class of polymers which include monomeric units linked by amide bonds. Naturally-occurring polyamides include proteins such as wool and silk, while synthetic amides include polymers such as nylons and aramids. The one or more second polymers can include thermoplastic polyamides such as nylon 6, nylon 6-6, and/or nylon-11, as well as thermoplastic polyamide copolymers.

Polyesters are a class of polymers which include monomeric units derived from an ester functional group, and are commonly made by condensing dibasic acids such as, for example, terephthalic acid, with one or more polyols. In one example, the second material can comprise or consist essentially of one or more thermoplastic polyester elastomers. Examples of polyester polymers include homopolymers such as polyethylene terephthalate, polybutylene terephthalate, and poly-1,4-cyclohexylene-dimethylene terephthalate, as well as copolymers such as polyester polyurethanes.

Styrenic polymers are a class of polymers which include monomeric units derived from styrene. The one or more second polymers can comprise or consist essentially of styrenic homopolymers, styrenic random copolymers, styrenic block copolymers, or combinations thereof. Examples of styrenic polymers include styrenic block copolymers, such as acrylonitrile butadiene styrene block copolymers, styrene acrylonitrile block copolymers, styrene ethylene butylene styrene block copolymers, styrene ethylene butadiene styrene block copolymers, styrene ethylene propylene styrene block copolymers, styrene butadiene styrene block copolymers, and combinations thereof.

Polyurethanes are a class of polymers which include monomeric units joined by carbamate linkages. Polyurethanes are most commonly formed by reacting a polyisocyanate (e.g., a diisocyanate or a triisocyanate) with a polyol (e.g., a diol or triol), optionally in the presence of a chain extender. The monomeric units derived from the polyisocyanate are often referred to as the hard segments of the polyurethane, while the monomeric units derived from the polyols are often referred to as the soft segments of the polyurethane. The hard segments can be derived from aliphatic polyisocyanates, or from organic isocyanates, or from a mixture of both. The soft segments can be derived from saturated polyols, or from unsaturated polyols such as polydiene polyols, or from a mixture of both. When the multi-layered film is to be bonded to natural or synthetic rubber, including soft segments derived from one or more polydiene polyols can facilitate bonding between the rubber and the film when the rubber and the film are crosslinked in contact with each other, such as in a vulcanization process.

Examples of suitable polyisocyanates from which the hard segments of the polyurethane can be derived include hexamethylene diisocyanate (HDI), isophorone diisocyanate (IPDI), butylenediisocyanate (BDI), bisisocyanatocyclohexylmethane (HMDI), 2,2,4-trimethylhexamethylene diisocyanate (TMDI), bisisocyanatomethylcyclohexane, bisisochanatomethyltricyclodecane, norbornane diisocyanate (NDI), cyclohexane diisocyanate (CHDI), 4,4'-dicyclohexylmethane diisocyanate (H12MDI), diisocyanatododecane, lysine diisocyanate, toluene diisocyanate (TDI), TDI adducts with trimethylolpropane (TMP), methylene diphenyl diisocyanate (MDI), xylylene diisocyanate (XDI), tetramethylxylylene diisocyanate (TMXDI), hydrogenated xylylene diisocyanate (HXDI), naphthalene 1,5-diisocyanate (NDI), 1,5-tetrahydronaphthalene diisocyanate, paraphenylene diisocyanate (PPDI), 3,3'-dimethyldiphenyl-4,4'- diisocyanate (DDDI), 4,4'-dibenzyl diisocyanate (DBDI), 4-chloro-1,3-phenylene diisocyanate, and any combination thereof. In one aspect, the polyurethane comprises or consists essentially of hard segments derived from toluene diisocyanate (TDI), or from methylene diphenyl diisocyanate (MDI), or from both.

The soft segments of the polyurethane can be derived from a wide variety of polyols, including polyester polyols, polyether polyols, polyester-ether polyols, polycarbonate polyols, polycaprolactone polyethers, and combinations thereof. In one aspect, the polyurethane comprises or consist essentially of monomeric units derived from $C_4$-$C_{12}$ polyols, or $C_6$-$C_{10}$ polyols, or $C_8$ or lower polyols, meaning polyols with 4 to 12 carbon molecules, or with 6 to 10 carbon molecules, or with 8 or fewer carbon molecules in their chemical structures. In another aspect, the polyurethane comprises or consists essentially of monomeric units derived from polyester polyols, polyester-ether polyols, polyether polyols, or any combination thereof. In yet another aspect, the polyurethane comprises or consists essentially of soft segments derived from polyols or diols having polyester functional units. The soft segments derived from polyols or diols having polyester functional units can comprise about 10 to about 50, or about 20 to about 40, or about 30 weight percent of the soft segments present in the polyurethane.

The multi-layered film can be produced by various means such as co-extrusion, lamination, layer-by-layer deposition, or the like. When co-extruding one or more barrier layers alone or with one or more second layers, selecting materials (e.g., a first barrier material and a second barrier material, or a single barrier material and a second material) having similar processing characteristics such as melt temperature and melt flow index, can reduce interlayer shear during the extrusion process, and can allow the alternating barrier layers and second layers to be co-extruded while retaining their structural integrities and desired layer thicknesses. In one example, the one or more barrier materials and, optionally, the second material when used, can be extruded into separate individual films, which can then be laminated together to form the multi-layered film.

The multi-layered film can be produced using a layer-by-layer deposition process. A substrate, which optionally can comprise a second material or a barrier material, can be built into a multi-layered film by depositing a plurality of layers onto the substrate. The layers can include one or more barrier layers (e.g., first barrier layers, second barrier layers, etc.). Optionally, the layers can include one or more second layers. The one or more barrier layers and/or second layers can be deposited by any means known in the art such as, for example, dipping, spraying, coating, or another method. The one or more barrier layers can be applied using charged solutions or suspensions, e.g., cationic solutions or suspensions or anionic solutions or suspensions, including a charged polymer solution or suspension. The one or more barrier layers can be applied using a series of two or more solutions having opposite charges, e.g., by applying a cationic solution, followed by an anionic solution, followed by a cationic solution, followed by an anionic solution, etc.

The barrier layers, including the multi-layered film, have an overall thickness of from about 40 micrometers to about 500 micrometers, or about 50 micrometers to about 400 micrometers, or about 60 micrometers to about 350 micrometers. In one aspect, each individual layer of the plurality of layers of the multi-layered film has a thickness of from about 0.001 micrometers to about 10 micrometers. For example, the thickness of an individual barrier layer can range from about 0.001 micrometers to about 3 micrometers thick, or from about 0.5 micrometers to about 2 micrometers thick, or from about 0.5 micrometers to about 1 micrometer thick; optionally less than or equal to 0.75 micrometers thick, or less than or equal to 0.5 micrometers thick, or in a range of from about 0.01 micrometers to about 0.75 micrometers thick, preferably in a range of from about 0.01 micrometers to about 0.5 micrometers thick. The thickness of an individual second layer can range from about 2 micrometers to about 8 micrometers thick, or from about 2 micrometers to about 4 micrometers thick.

In a further aspect, thickness of the film and/or their individual layers can be measured by any method known in the art such as, for example, ASTM E252, ASTM D6988, ASTM D8136, or using light microscopy or electron microscopy.

In some aspects, the barrier layers, including the multi-layered film, have a Shore hardness of from about 35 A to about 95 A, optionally from about 55 A to about 90 A. In these aspects, hardness can be measured using ASTM D2240 using the Shore A scale.

In one aspect, when a co-extrusion process is used to form the barrier layer from a plurality of alternating barrier layers and second layers, the barrier material has a melt flow index of from about 5 to about 7 grams per 10 minutes at 190 degrees Celsius when using a weight of 2.16 kilograms, while the second material has a melt flow index of from about 20 to about 30 grams per 10 minutes at 190 degrees Celsius when using a weight of 2.16 kilograms. In a further aspect, the melt flow index of the barrier material is from about 80 percent to about 120 percent of the melt flow index of the barrier material per 10 minutes when measured at 190 degrees Celsius when using a weight of 2.16 kilograms. In any of these aspects, melt flow index can be measured using ASTM D1238. Alternatively or additionally, the barrier material or the second material or both have a melting temperature of from about 165 degrees Celsius to about 183 degrees Celsius, or from about 155 degrees Celsius to about 165 degrees Celsius. In one such example, the barrier material has a melting temperature of from about 165 degrees Celsius to about 183 degrees Celsius, while the second material has a melting temperature of from about 155 degrees Celsius to about 165 degrees Celsius. Further in these aspects, melting temperature can be measured using ASTM D3418.

In an aspect, the multi-layered film exhibits a low gas-transmission rate such that airbags incorporating the multi-layered film can be inflated and sealed for extended use. Such airbags can provide good cushioning and support when incorporated into consumer products (e.g., as airsoles for footwear). In a further aspect, the level of cushioning or support does not significantly decrease over an extended period of time once the airbags are inflated with a gas, due to the low gas transmission rate of the multi-layered film, which substantially reduces the escape of the inflation gas.

In one aspect, the airbag internal cavity is inflated to a positive pressure, i.e., has an inflation internal pressure above about 15 pounds per square inch (about 100 kilopascals). In further aspects, airbag internal cavity has an inflation internal pressure ranging from about 17 pounds per square inch (about 117 kilopascals) to about 30 pounds per square inch (about 207 kilopascals). In further aspects, airbag internal cavity has an inflation internal pressure ranging from about 20 pounds per square inch (about 138 kilopascals) to about 22 pounds per square inch (about 152 kilopascals). In one aspect, after 2 years of use, the airbag internal cavity still has an internal pressure of at least about 60 percent of the inflation internal pressure. In further aspects, after 2 years of use, the airbag internal cavity still has an internal pressure of at least about 70 percent of the inflation internal pressure.

In some aspects, the airbag has a gas transmission rate of no more than 120 percent of an original gas transmission rate after 320,000 KIM cycles, where KIM cycles are performed using the KIM Test Protocol defined in the Property Analysis and Characterization Procedures section included herein. In one aspect, the bladder has a gas transmission rate ranging from about 0.5 to about 2 cubic centimeters per square meter per day for nitrogen measured at 23 degrees Celsius and 0 percent relative humidity for a film having a thickness ranging from 72 micrometers to 320 micrometers after from 0 KIM cycles to 320,000 KIM cycles. In one aspect, the airbag does not exhibit crazing or cracking after at least 350,000 KIM cycles, or after at least 400,000 KIM cycles.

In some embodiments, the multi-layered film may also include additional layers on one or both opposing sides of the core region(s). For instance, the multi-layered film may include one or more thicker structural layers to increase the structural integrity and durability of the multi-layered film during use in articles, such as airsoles for footwear. Additionally or alternatively, the multi-layered film may also include one or more cap layers to improve abrasion resistance, assist in airbag formation (e.g., during thermoforming or blow molding), to improve bonding to other article components, to improve surface properties for printing graphics and indicia, to improve visual aesthetics and/or tactile properties, water resistance, and the like.

Figure 2:
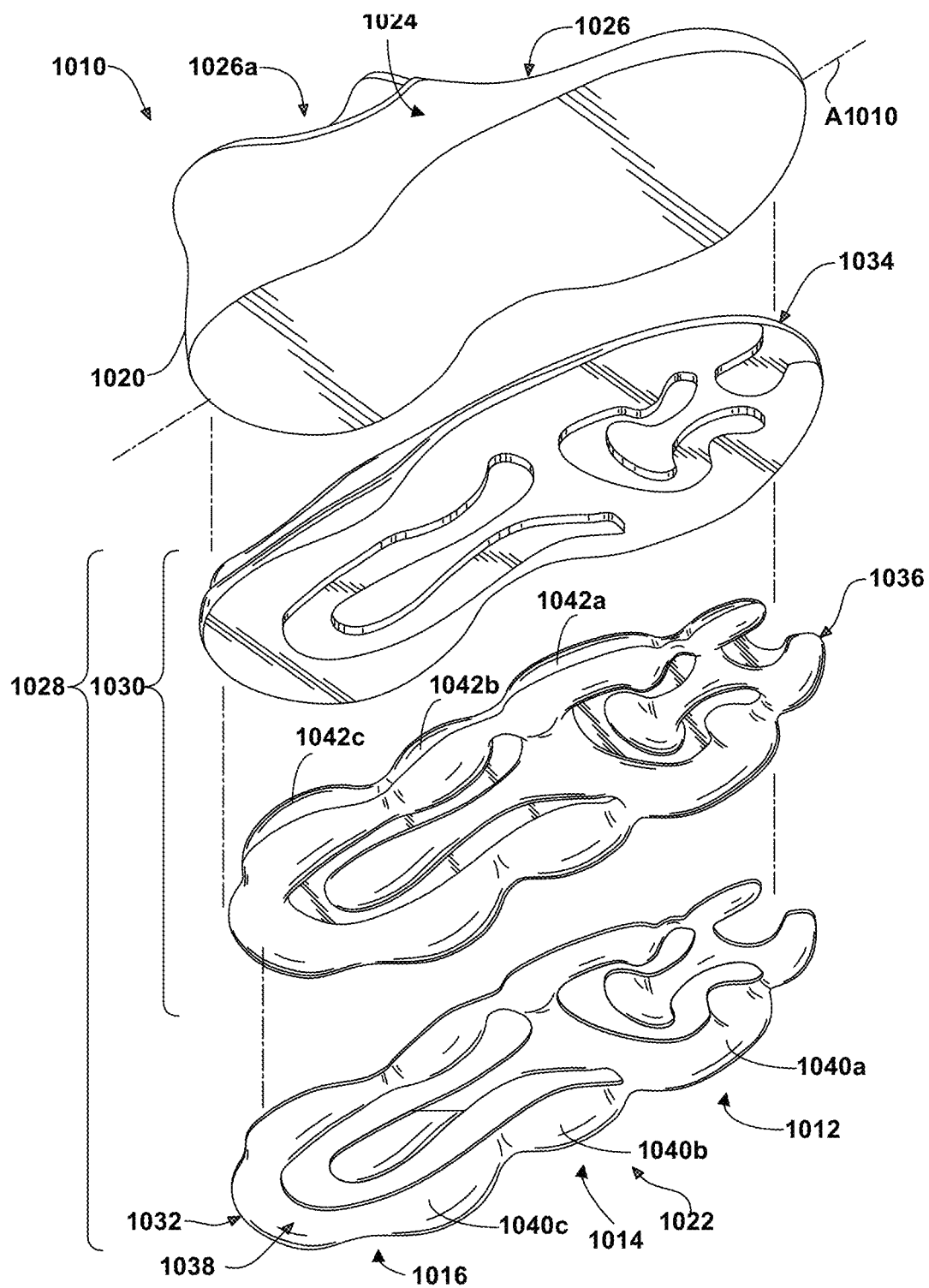
FIG. 2 is an exploded perspective view of the article of footwear shown in FIG. 1.

As shown in FIGS. 1 and 2, the footwear 1010 is an example article of footwear that incorporates the multi-layered film of the present disclosure. As shown in FIG. 1, the article of footwear 1010 can be divided lengthwise into one or more regions along a longitudinal axis A1010, such as into a forefoot region 1012, a mid-foot region 1014, and a heel region 1016. The forefoot region 1012 can be further described as including a toe portion corresponding to a portion of the footwear 1010 that surrounds the phalanges of a wearer's foot when worn, and a ball portion corresponding to a portion of the footwear 1010 that surrounds the metatarsophalangeal (MTP) joint of the wearer's foot when worn. The mid-foot region 1014 corresponds with a portion surrounding an arch area of the wearer's foot when worn, and the heel region 1016 corresponds with portions of the footwear 1010 surrounding rear portions of the wearer's foot, including the calcaneus bone, when worn.

The footwear 1010 can further include an anterior end 1018 associated with a forward-most location of the forefoot region 1012, and a posterior end 1020 corresponding to a rearward-most location of the heel region 1016. As further shown in FIG. 1, the longitudinal axis A1010 of the footwear 1010 extends along the length of the footwear 1010 from the anterior end 1018 to the posterior end 1020, and generally divides the footwear 1010 into a medial side 1022 and a lateral side 1024. Accordingly, the medial side 1022 and the lateral side 1024 respectively correspond with opposite sides of the footwear 1010 and extend through the regions 1012, 1014, and 1016.

The footwear 1010 also includes an upper 1026 and a sole structure 1028, where the upper 1026 forms a structure that is configured to cover some or all of a wearer's foot and can fit the wearer's foot to the sole structure 1028. The upper 1026 includes an interior surface (not shown) that defines an interior void configured to receive and secure a wearer's foot for support on the sole structure 1028. The interior void can be accessed at an ankle opening 1026a and can be shaped and sized to match and fit the wearer's foot. For instance, the upper 1026 can extend over the instep and toe areas of the wearer's foot (at the forefoot region 1012), along medial and lateral sides of the wearer's foot (at the mid-foot region 1014), and around the heel area of the wearer's foot (at the heel region 1016).

The upper 1026 may be formed from one or more components that can be stitched, adhesively bonded, thermally bonded, or otherwise together to form the interior void, such as mesh, textiles, foam, leather, and synthetic leather. The materials may be selected and located to impart properties of durability, air-permeability, wear-resistance, flexibility, comfort, and the like. More specific examples of suitable materials for the upper 1026 are discussed below.

The upper 1026 can also have any suitable design, shape, size, and/or colorway for footwear applications. For example, in certain aspects, e.g., if the footwear 1010 is a basketball shoe, then the upper 1026 can be a high-top profile that is shaped to provide high support to a wearer's ankle. Alternatively, in certain aspects, e.g., if footwear 1010 is a running shoe, then the upper 1026 can have a low-top profile.

In the example shown in FIGS. 1 and 2, the sole structure 1028 includes a midsole 1030 configured to provide cushioning, support, and aesthetic characteristics, and an outsole 1032 configured to provide a ground-engaging surface of the footwear 1010. In the shown embodiment, the midsole 1030 of the sole structure 1028 is further divided into multiple sub-components that can provide different forms of cushioning, support, and aesthetics, such as a chassis 1034 and an airsole 1036.

The chassis 1034 can be attached to the upper 1026 to provide an interface between the upper 1026 and the airsole 1036. In the embodiment illustrated in FIGS. 1 and 2, the chassis 1034 is a single-component chassis formed from one or more resilient materials, such as foams and/or rubbers, to impart properties of cushioning, responsiveness, and energy distribution to the wearer's foot.

In the shown embodiment, the chassis 1034 is depicted as having a single, full-length component extending from the forefoot region 1012 to the heel region 1016. Alternatively, the chassis 1034 may include multiple components, such as a first component extending from the forefoot region 1012 to the mid-foot region 1014 and a second component extending from the mid-foot region 1014 to the heel region 1016. In yet further alternative aspects, the chassis 1034 may include multiple components providing zonal regions of cushioning and/or rigid support at forefoot region 1012, midfoot region 1014, and/or heel region 1016. The component(s) of the chassis 1034 may be pre-formed from any suitable resilient materials (e.g., foams and rubbers) and/or rigid materials (e.g., plates and molded parts). In embodiments incorporating resilient materials, the component(s) of the chassis 1034 can include molded foam parts, loose foam beads retained in carrier shells, fused foam bead parts (e.g., by compression molding or steam chest molding), foam beads entrapped in a resilient polymeric resin matrix, and the like to impart properties of cushioning, responsiveness, support, and energy distribution to the wearer's foot.

Examples of suitable resilient materials for foams include thermoplastic elastomers such as, for example, thermoplastic elastomeric polyolefin homopolymers or copolymers, thermoplastic elastomeric polyamide homopolymers or copolymers, thermoplastic elastomeric polyester homopolymers or copolymers, thermoplastic elastomeric polyurethane homopolymers or copolymers, thermoplastic elastomeric styrenic homopolymers or copolymers, or any combination thereof. These materials may also include one or more additives, such blowing agents, cross-linking agents, colorants, fillers, and the like. Suitable chemical blowing agents include azo compounds such as azodicarbonamide, sodium bicarbonate, isocyanate, and combinations thereof. Alternatively, the foams of the chassis 1034 may be produced using one or more physical blowing agents that can phase transition to gases based on a change in temperature and/or pressure. Suitable cross-linking agents (for cross-linked foams) include peroxide-based crosslinking agents such as dicumyl peroxide. Suitable fillers include modified or natural clays, modified or unmodified synthetic clays, talc glass fiber, powdered glass, modified or natural silica, calcium carbonate, mica, paper, wood chips, and combinations thereof.

In some embodiments, the chassis 1034 can include one or more semi-rigid plate components, such as carbon-fiber plates, polymeric (e.g., polyamide-based) plates, and the like. In further alternative embodiments, the chassis 1034 can be omitted and the airsole 1036 can be directly secured to the upper 1026.

As shown in FIGS. 1 and 2, the outsole 1032 can have a geometry that matches the geometry of airsole 1036 and is configured to provide a ground-engaging surface of the footwear 1010. For example, the outsole 1032 can be provided as a polymeric component that is overmolded onto, adhered to, or otherwise secured to the airsole 1036 to provide increased durability, puncture resistance, and/or abrasion resistance to the airsole 1036 in the ground-facing direction. Examples of suitable materials for the outsole 1032 include those capable of bonding to the airsole 1036 directly and/or with adhesives, and that preferably exhibit abrasion resistance and/or puncture resistance, such as polyurethanes, thermoplastic polyurethanes, polyether block amines, vulcanized rubbers, and combinations thereof.

The airsole 1036 is an example airbag for use with the footwear 1010 and incorporates the multi-layered film of the present disclosure. As briefly noted above, the multi-layered film exhibits an increased balance between durability and flexibility, while also retaining good gas-barrier properties. As such, airsoles incorporating the multi-layered film can have a broader range of unique and advanced three-dimensional geometries than those achievable with current barrier films.

Figure 3:
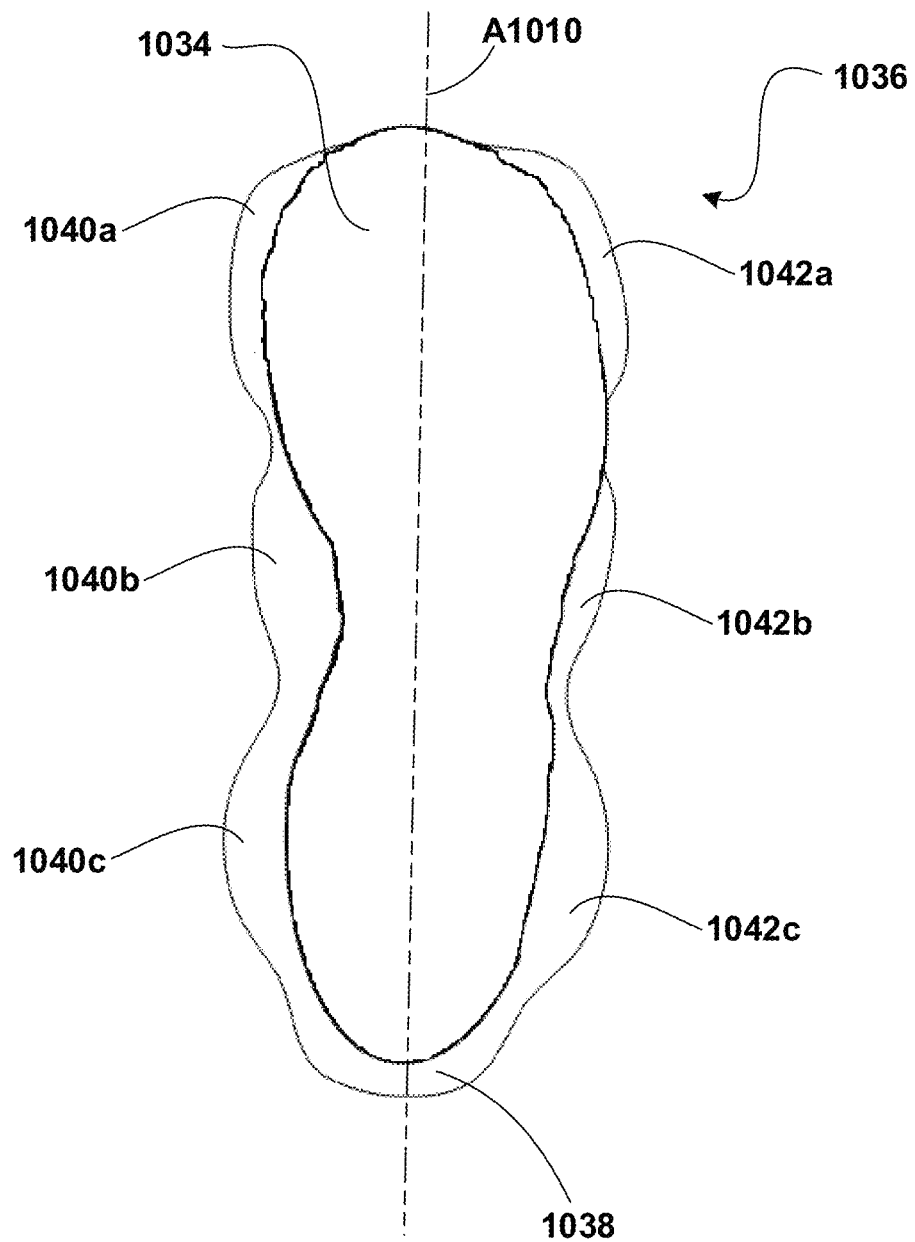
FIG. 3 is a top schematic view of the article of footwear with an upper of the footwear omitted for discussion purposes to show a footprint of a midsole chassis and airsole.

For example, the airsole 1036 can include one or more protruding and/or bulbous portions, such as a heel portion 1038 at the heel region 1016, medial portions 1040a, 1040b, and 1040c at the medial side 1022, and/or lateral portions 1042a, 1042b, and 1042c at the lateral side 1024. These protruding portions, particularly heel portion 1038, can potentially be subjected to high stress loads from flexing and release during each foot strike due to their extreme geometries, potentially resulting in significant flexing deformation of the multi-layered film and the barrier layers within. This is best illustrated in FIG. 3, which shows the portions 1038; 1040a, 1040b, and 1040c; and 1042a, 1042b, and 1042c of the airsole 1036 extending beyond a top-down, cross-sectional footprint of the chassis 1034 of the midsole 1030. As can be appreciated, during each foot strike, the downward pressure applied to the airsole 1036 by the wearer's body weight and transferred through the upper 1026 and the chassis 1034 can generate high stress loads on the protruding portions 1038; 1040a, 1040b, and 1040c; and 1042a, 1042b, and 1042c. These high stress loads resulting from flexing and release of the multi-layered film can be particularly high at the heel portion 1038 due to heel-striking during walking and running. Furthermore, these high stress loads are compounded over time through repeated flexing and release of the multi-layered film of the airsole 1036, which can occur with each foot strike.

In any of the above aspects, flexing and release stress loads applied to the multi-layered film of the airsole 1036 can exceed the performance tolerances of currently-known barrier films over repeated foot strikes in footwear applications, which can produce visible crazing or hazing effects in the barrier films. While these crazing and hazing effects do not noticeably affect the performance of the barrier films (e.g., gas retention), they can detract from the aesthetics of the airsoles, which may be an undesirable effect for many consumers. The multi-layered film of the present disclosure, however, can withstand higher repeated stress loads compared to current barrier films used in footwear applications while exhibiting reduced or no visually observable cracking, crazing, or hazing and, further, retaining good gas-barrier properties. The gas-barrier layers of the core region(s) in the disclosed multi-layered film may, in particular, have an average layer thickness of less than about 2 micrometers, optionally an average layer thickness of less than or equal to 0.75 micrometers, or less than about 0.5 micrometers, such as an average layer thickness in a range of from about 0.01 micrometers to about 0.75 micrometers, optionally in a range of from about 0.01 micrometers to about 0.5 micrometers; and have increased flexibility and/or elastic properties compared to currently-known barrier films, allowing the multi-layered film of the present disclosure to undergo repeated flexing-release cycles substantially without losing gas-barrier properties and without the appearance of crazing, hazing, or the like. Further in this aspect, these superior properties allow for the disclosed airsoles 1036 to have a longer useful lifetime without an appreciable change in gas transmission rate.

Furthermore, while particularly beneficial for use with airbags having more extreme geometries (e.g., airsole 1036 with uncompressed height 1046), the multi-layered film of the present disclosure can be used as a suitable replacement in any current gas-barrier applications that incorporate multi-layered films (e.g., microlayer films). For example, in footwear applications, the multi-layered film can be incorporated into airsoles having any suitable geometry, such as those disclosed in U.S. Pat. Nos. 10,149,513, 11,019,880, and 11,019,881 and U.S. Patent Application Publication Nos. 2019/0231027, 2020/0205514, 2021/0145119, and 2021/0195996. This allows the same multi-layered film to be interchangeably used as feedstock for multiple different airsole geometries, thereby increasing manufacturing efficiency, reducing raw material waste, and reducing manufacturing carbon impact.

Figure 4:
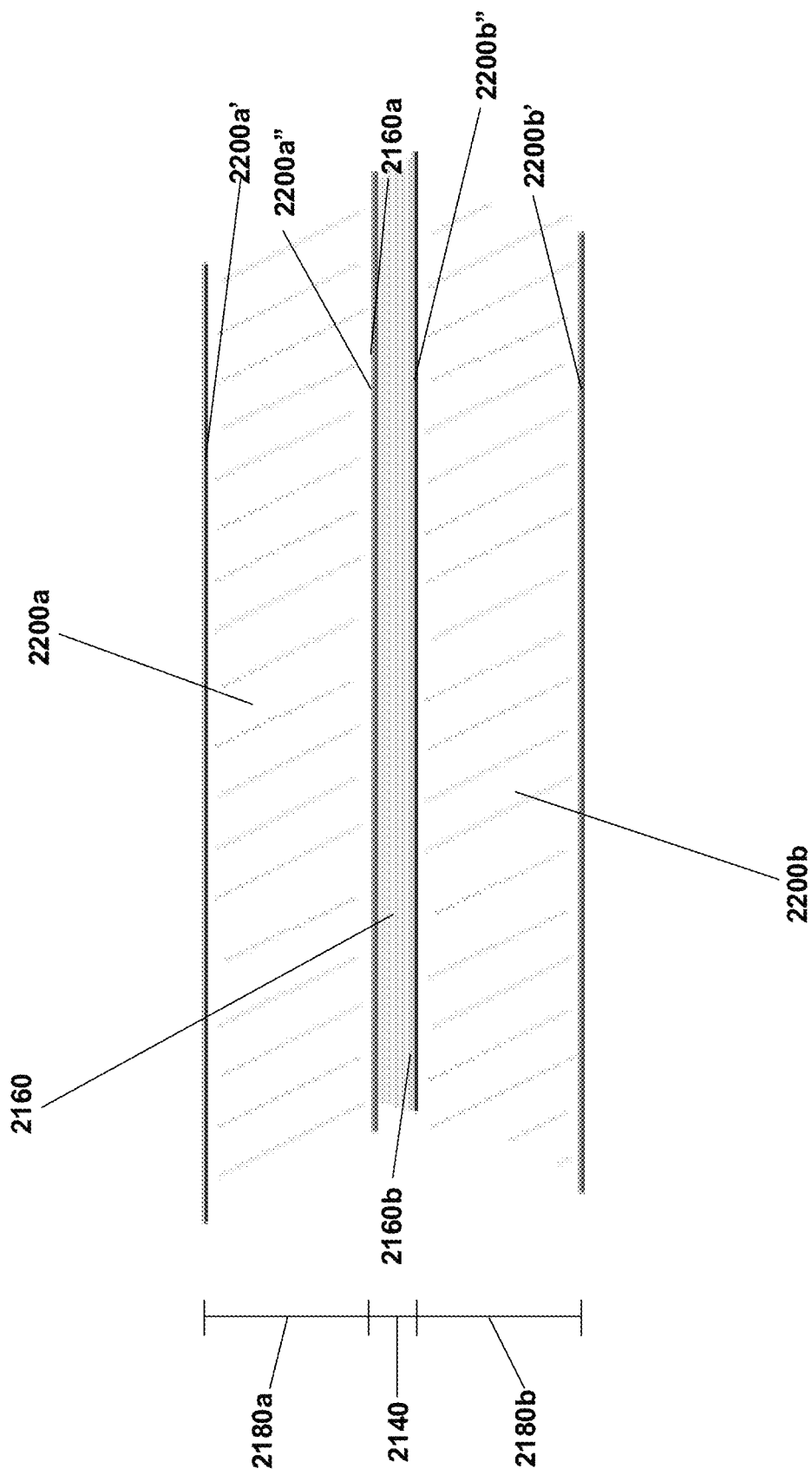
FIG. 4 is a sectional view of a multi-layered film of the present disclosure, such as for use in the article of footwear and the airsole shown in FIGS. 1-3.

As shown in FIG. 4, multi-layered film 1076 is an example multi-layered film of the present disclosure, such as for use in the airsole 1036. In some aspects, the articles disclosed herein can comprise multiple layers as illustrated, for example, in FIG. 4. In this exemplary embodiment, the article is a sheet comprising gas-barrier layers and includes two structural layers, 2200a having a thickness 2180a and 2200b having a thickness 2180b and a core region or film 2160 having a thickness 2140. In one aspect, the article can be two-sided. Further in this aspect, a two-sided article can include a symmetrical arrangement of layers on both sides of core region 2160. Suitable examples of thicknesses 2180a and 2180b range from about 900 micrometers to about 1990 micrometers, or from about 900 micrometers to about 1400 micrometers, or from about 1400 micrometers to about 1990 micrometers. Suitable examples of thickness 2140 range from about 125 micrometers to about 200 micrometers, or from about 125 micrometers to about 175 micrometers, or from about 150 micrometers to about 200 micrometers.

In one such aspect in accordance with the example of FIG. 4, structural layers 2200a and 2200b can comprise or consist essentially of a structural layer material. In such an aspect, the core region 2160 can comprise or consist essentially of a multi-layered film comprising gas-barrier layers as disclosed herein.

In any of these aspects, structural layer 2200a can have a first surface 2200a' and a second surface 2200a", while structural layer 2200b can have a first surface 2200b' and a second surface 2200b". In another aspect, the core region 2160 can have a first surface 2160a and a second surface 2160b. In some aspects, the second surface 2200a" of the structural layer 2200a and the first surface 2160a of the core region 2160 can be adjacent to one another or otherwise in contact with one another. In one aspect, the second surface 2160b of the core region 2160 and the second surface 2200b" of the structural layer 2200b can be adjacent to one another or otherwise in contact with one another. In some aspects, first surface 2200a' of structural layer 2200a and/or first surface 2200b' of structural layer 2200b can independently optionally be an outer surface of an article incorporating the multi-layered film disclosed herein. In any of these aspects, structural layer 2200a and structural layer 2200 can be made from the same material or from different materials and can have the same or different thicknesses.

In one aspect, provided herein are articles comprising the multi-layered films disclosed herein, the articles including:
- a first cap layer comprising or consisting essentially of a first cap layer material, the first cap layer including a first cap layer outer surface defining a first outer surface of the multi-layered film, a first cap inner layer surface opposing the first cap layer outer surface, a first cap layer thickness extending from the first cap layer inner surface to the first cap layer outer surface, wherein the first cap layer outer surface defines a first exterior surface of the article;
- a second cap layer comprising or consisting essentially of a second cap layer material, the second cap layer including a second cap layer outer surface defining a second outer surface of the multi-layered film, a second cap layer inner surface opposing the second cap layer outer surface, a second cap layer thickness extending from the second cap layer inner surface to the second cap layer outer surface, optionally wherein the second cap layer outer surface defines a second exterior surface of the article; and
- one or more core regions, wherein each of the one or more core regions comprises or consists essentially of the multi-layered film, each of the one or more core regions including a core region first surface, a core region second surface, and a core region thickness extending from the core region first surface to the core region second surface, wherein each of the one or more core regions is positioned between the first cap layer inner surface and the second cap layer inner surface.

In another aspect, the first cap layer material and the second cap layer material are substantially the same. In an alternative aspect, the first cap layer material and the second cap layer material are different. In some aspects, the first cap layer inner surface is in contact with the core region first surface, or the second cap layer inner surface is in contact with the core region second surface, or both.

In one aspect, the gas-barrier material comprises or consists essentially of a nitrogen barrier material. In a further aspect, the gas-barrier material comprises or consists essentially of one or more gas-barrier polymers. Further in this aspect, the gas-barrier material can comprise a gas-barrier polymeric component consisting of all polymers present in the gas-barrier material. In another aspect, the one or more gas-barrier polymers comprise or consist essentially of one or more thermoplastic vinylidene chloride polymers, one or more thermoplastic acrylonitrile polymers or copolymers, one or more thermoplastic polyamides, one or more thermoplastic epoxy resins, one or more thermoplastic amine polymers or copolymers, or one or more thermoplastic polyolefin homopolymers or copolymers. In one aspect, the one or more thermoplastic polyolefin homopolymers or copolymers comprise or consist essentially of one or more thermoplastic polyethylene copolymers, or comprise or consist essentially of one or more thermoplastic ethylene-vinyl alcohol copolymers. In one aspect, the one or more ethylene-vinyl alcohol copolymers include from about 28 mole percent to about 44 mole percent ethylene content, or from about 32 mole percent to about 44 mole percent ethylene content.

In another aspect, the elastomeric material comprises or consists essentially of one or more thermoplastic elastomeric polymers, and further comprises an elastomeric polymeric component consisting of all polymers present in the elastomeric material. In another aspect, the one or more thermoplastic elastomeric polymers comprise or consist essentially of one or more thermoplastic elastomeric polyolefin homopolymers or copolymers, one or more thermoplastic elastomeric polyamide homopolymers or copolymers, one or more thermoplastic elastomeric polyester homopolymers or copolymers, one or more thermoplastic elastomeric polyurethane homopolymers or copolymers, one or more thermoplastic elastomeric styrenic homopolymers or copolymers, or any combination thereof.

In further aspects, the one or more styrenic homopolymers or copolymers can include one or more styrenic block copolymers, such as acrylonitrile butadiene styrene block copolymers, styrene acrylonitrile block copolymers, styrene ethylene butylene styrene block copolymers, styrene ethylene butadiene styrene block copolymers, styrene ethylene propylene styrene block copolymers, styrene butadiene styrene block copolymers, and combinations thereof.

In an aspect, the elastomeric material comprises or consists essentially of one or more thermoplastic elastomeric polyurethane homopolymers or copolymers, optionally wherein the elastomeric material comprises or consists essentially of one or more polydiene polyol-based thermoplastic elastomeric polyurethane homopolymers or copolymers.

In some aspects, the one or more thermoplastic elastomeric polyurethane homopolymers or copolymers comprise a plurality of first segments derived from one or more polyols and a plurality of segments derived from a diisocyanate. In another aspect, the one or more thermoplastic elastomeric polyurethane homopolymers or copolymers is a polymerization product of a diisocyanate with one or more polyols.

In another aspect, the thermoplastic elastomeric polyurethane homopolymer or copolymer comprises or consists essentially of one or more polydiene polyol-based thermoplastic elastomeric polyurethane homopolymers or copolymers, wherein the polyol comprises or consists essentially of a polybutadiene polyol, a polyisoprene polyol, a partially or fully hydrogenated derivative of a polybutadiene polyol or of a polyisoprene polyol, or any combination thereof.

In another aspect, the one or more polyols comprise or consist essentially of a polyester polyol, a polyether polyol, a polycarbonate polyol, a polycaprolactone polyether, or any combination thereof.

In still another aspect, the diisocyanate comprises or consists essentially of an aliphatic diisocyanate, an aromatic diisocyanate, or any combination thereof. In one aspect, the aliphatic diisocyanate comprises or consists essentially of hexamethylene diisocyanate (HDI), isophorone diisocyanate (IPDI), butylenediisocyanate (BDI), bisisocyanatocyclohexylmethane (HMDI), 2,2,4-trimethylhexamethylene diisocyanate (TMDI), bisisocyanatomethylcyclhexane, bisisochanatomethyltricyclodecane, norbornane diisocyanate (NDI), cyclohexane diisocyanate (CHDI), 4,4'-dicyclohexhylmethane diisocyanate (H12MDI), diisocyanatododecane, lysine diisocyanate, or any combination thereof. In another aspect, the aromatic diisocyanate comprises or consists essentially of toluene diisocyanate (TDI), TDI adducts with trimethylolpropane (TMP), methylene diphenyl diisocyanate (MDI), xylene diisocyanate (XDI), tetramethylxylylene diisocyanate (TMXDI), hydrogenated xylene diisocyanate (HXDI), naphthalene 1,5-diisocyanate (NDI), 1,5-tetrahydronaphthalene diisocyanate, para-phenylene diisocyanate (PPDI), 3,3'-dimethyldiphenyl-4,4'-diisocyanate (DDDI), 4,4'-dibenzyl diisocyanate (DBDI), 4-chloro-1,3-phenylene diisocyanate, or any combination thereof.

In an aspect, in the multi-layered films, the gas-barrier material can have a melt flow index of from about 5 to about 7 grams per 10 minutes at 190 degrees Celsius when using a weight of 2.16 kilograms. In another aspect, the elastomeric material can have a melt flow index of from about 20 to about 30 grams per 10 minutes at 190 degrees Celsius when using a weight of 2.16 kilograms. In any of these aspects, in the multi-layered films, the melt flow index of the gas-barrier material can be from about 80 percent to about 120 percent of the melt flow index of the elastomeric material, or from about 90 percent to about 110 percent of the melt flow index of the elastomeric material, from about 95 percent to about 105 percent of the melt flow index of the elastomeric material, or can be substantially the same as the melt flow index of the elastomeric material, when the melt flow index is measured in cubic centimeters per 10 minutes at 190 degrees Celsius when using a weight of 2.16 kilograms.

In one aspect, the gas-barrier material can have a melting temperature of from about 165 degrees Celsius to about 183 degrees Celsius, while in another aspect, the elastomeric material can have a melting temperature of from about 155 degrees Celsius to about 165 degrees Celsius. In any of these aspects, the melting temperature of the gas-barrier material is within about 10 degrees Celsius of the melting temperature of the elastomeric material, optionally within about 8 degrees Celsius of the melting temperature of the elastomeric material, or within about 5 degrees Celsius of the melting temperature of the elastomeric material.

In any of these aspects, without wishing to be bound by theory, thin gas-barrier layers alternating with elastomeric layers as disclosed herein can improve the flexibility tolerances of the core region or multi-layered film without compromising durability or gas-barrier properties. Further in this aspect, the disclosed multi-layered films allow for the production of articles incorporating the multi-layered films, wherein the articles can incorporate extreme geometries without exhibiting cracking, crazing, hazing, or loss of gas-barrier properties over time.

In some aspects, the multi-layered films disclosed herein further comprise a blended material, wherein the blended material comprises or consists essentially of a blend of one or more additional thermoplastic elastomers and a second material, optionally wherein the second material comprises or consists essentially of one or more second polymers, optionally wherein the one or more second polymers comprise or consist essentially of one or more second thermoplastics.

In an aspect, the one or more second thermoplastics can comprise one or more thermoplastic polyolefin homopolymers, one or more thermoplastic polyamide homopolymers or copolymers, one or more thermoplastic polyester homopolymers or copolymers, one or more thermoplastic polyurethane homopolymers or copolymers, one or more thermoplastic styrenic homopolymers or copolymers, or any combination thereof.

In further aspects, the one or more styrenic homopolymers or copolymers can include one or more styrenic block copolymers, such as acrylonitrile butadiene styrene block copolymers, styrene acrylonitrile block copolymers, styrene ethylene butylene styrene block copolymers, styrene ethylene butadiene styrene block copolymers, styrene ethylene propylene styrene block copolymers, styrene butadiene styrene block copolymers, and combinations thereof.

In another aspect, the one or more second thermoplastics can comprise or consist essentially of thermoplastic polypropylene homopolymers or copolymers, thermoplastic polyethylene homopolymers or copolymers, thermoplastic polybutylene homopolymers or copolymers, or any combination thereof.

In some aspects, the one or more second thermoplastics comprise or consist essentially of one or more thermoplastic polyethylene copolymers. In another aspect, the one or more second thermoplastics comprise or consist essentially of one or more thermoplastic ethylene-vinyl alcohol copolymers. In one aspect, a polymeric component of the blended material consists of one or more additional thermoplastic elastomeric polyurethane homopolymers or copolymers, and one or more second thermoplastic ethylene-vinyl alcohol copolymers. In an alternative aspect, the polymeric component of the thermoplastic elastomeric material consists of one or more additional thermoplastic elastomeric polyester-polyurethane copolymers and one or more second thermoplastic ethylene-vinyl alcohol copolymers. In some aspects, the blended material comprises one or more recycled additional thermoplastic elastomers, or one or more recycled second thermoplastics, or both.

In some aspects, the blended material is a phase-separated blend of the one or more additional thermoplastic elastomers and the one or more second thermoplastics. In some aspects, the phase-separated blend includes one or more phase-separated regions including interfaces between the one or more additional thermoplastic elastomers and the one or more second thermoplastics. In some aspects, the blend comprises about 95 percent by weight of the one or more second thermoplastics and about 5 percent by weight of the one or more second thermoplastics based on a total weight of the blend.

As used herein, the term recycled material may refer to a polymeric material which has previously been extruded into a film, and may have been previously thermoformed into a bladder, before being shredded or ground and re-extruded into a film. Optionally, therefore, the thermal history of a material may provide evidence that it is a recycled material, rather than a virgin material. Optionally, a recycled material, or a recycled polymeric material, may comprise up to 10 percent of a gas-barrier polymeric material on a weight basis, as it may have been recycled by grinding or shredding a multi-layered film that included a gas-barrier material. In an aspect, the disclosed multi-layered films further comprise a recycled material comprising one or more recycled polymers, optionally wherein the one or more recycled polymers comprise one or more recycled thermoplastics, optionally wherein the one or more recycled thermoplastics comprise one or more recycled thermoplastic elastomers; optionally wherein the recycled material comprises a recycled material polymeric component consisting of one or more recycled thermoplastics, optionally wherein the recycled material polymeric component comprises or consists essentially of one or more recycled thermoplastic elastomers.

In another aspect, the recycled material can comprise one or more recycled thermoplastic elastomers, and optionally the one or more recycled thermoplastic elastomers comprise one or more reground thermoplastic elastomers, optionally wherein the one or more recycled or reground thermoplastic elastomers includes a thermoplastic elastomeric material as disclosed herein.

In some aspects, the recycled material further comprises one or more recycled second thermoplastics, and the one or more recycled second thermoplastics optionally comprise one or more reground second thermoplastics, optionally wherein the one or more recycled or reground second thermoplastics include a thermoplastic as disclosed herein.

In one aspect, the recycled material comprises one or more recycled or reground thermoplastic polyurethane elastomers or one or more recycled or reground thermoplastic ethylene-vinyl alcohol copolymers or both. In an aspect, the recycled material comprises a blend of the one or more recycled or reground thermoplastic elastomers and one or more second thermoplastics, or comprises a blend of one or more thermoplastic elastomers and one or more recycled thermoplastics or one or more recycled thermoplastics, optionally wherein the blend is a phase-separated blend, and optionally wherein the phase-separated blend comprises one or more interfaces between the one or more recycled thermoplastic elastomers and the one or more second thermoplastics.

In another aspect, in the multi-layered films, the recycled material comprises about 99 percent to about 90 percent by weight of the one or more recycled thermoplastic elastomers and about 1 percent to about 10 percent by weight of the one or more second thermoplastics based on a total weight of the recycled material, optionally wherein the recycled material comprises about 99 percent to about 93 percent by weight of the one or more recycled thermoplastic elastomers and about 1 percent to about 7 percent by weight of the one or more second thermoplastics, or about 99 percent to about 95 percent by weight of the one or more recycled thermoplastic elastomers and about 1 percent to about 5 percent by weight of the one or more second thermoplastic elastomers.

In an aspect, the recycled material comprises about 99 percent to about 50 percent by weight of recycled or reground polymers based on a total weight of recycled material, or from about 99 percent to about 75 percent by weight of recycled or reground polymers.

In some aspects, the recycled material further comprises one or more virgin first thermoplastic elastomers, optionally wherein the one or more virgin thermoplastic elastomers includes one or more virgin thermoplastic polyurethane elastomers.

In one aspect, the multi-layered film further comprises one or more tie layers, each of the one or more tie layers individually comprising or consisting essentially of a tie material, wherein the one or more tie layers increase a bond strength between two adjacent layers. In some aspects, the tie material of each of the one or more tie layers independently comprises or consists essentially of a polyurethane, a polyacrylate, an ethylene-acrylate copolymer, a maleic anhydride grafted polyolefin, or any combination thereof, and optionally the tie material comprises or consists essentially of a blended material or a recycled material as disclosed herein. In another aspect, the tie layer material of the one or more tie layers independently comprises or consists essentially of one or more thermoplastic polyurethane elastomeric homopolymers or copolymers, optionally wherein the one or more tie layers comprise or consist essentially of polydiene polyol-based thermoplastic polyurethane.

In one aspect, in the multi-layered films, the elastomeric material can be a first elastomeric material, and the multi-layered films further include a second elastomeric material, and the formed multi-layered film further comprises a first structural layer secured to a first side of one of the one or more core regions, wherein the first structural layer comprises the second elastomeric material and has an average thickness ranging from about 900 micrometers to about 1990 micrometers, optionally from about 900 to about 1500 micrometers, from about 1500 to about 1990 micrometers, from about 1200 to about 1800 micrometers, or from about 1000 to about 1400 micrometers.

In another aspect, the multi-layered films further comprise one or more structural layers, each of the one or more structural layers independently comprising or consisting essentially of a structural layer material, optionally wherein the structural layer material comprises or consists essentially of a blended material or a recycled material as described herein. In some aspects, the structural layer material of the one or more structural layers independently comprises or consists essentially of a polydiene polyol-based thermoplastic polyurethane.

In still another aspect, the multi-layered films can comprise one or more cap layers, wherein the one or more cap layers comprise or consist essentially of a cap layer material, optionally wherein the cap layer material comprises or consists essentially of a blended material or a recycled material as disclosed herein. In some aspects, the cap layer material of the one or more cap layers comprises or consists essentially of a polyurethane, a polyacrylate, an ethylene-acrylate copolymer, a maleic anhydride grafted polyolefin, or any combination thereof. In another aspect, the cap layer material of the one or more cap layers comprises or consists essentially of a thermoplastic polyurethane, optionally a polydiene polyol-based thermoplastic polyurethane.

In some aspects, at least one of the one or more tie layers is positioned between one of the one or more structural layers and one of the one or more core regions. In another aspect, at least one of the one or more structural layers is positioned between one of the one or more tie layers and one of the one or more cap layers. In another aspect, the multi-layered film can be a coextruded layered sheet or a laminated layered sheet.

In one aspect, disclosed herein is a multi-layered film comprising a first cap layer, a first structural layer, a first tie layer, a core region, a second tie layer, a second structural layer, and a second cap layer, wherein a first cap layer inner surface contacts a first surface of the first structural layer, a second surface of the first structural layer contacts a first surface of the first tie layer, a second surface of the first tie layer contacts a first surface of the core region, a second surface of the core region contacts a first surface of the second tie layer, a second surface of the second tie layer contacts a first surface of the second structural layer, and a second surface of the second structural layer contacts an inner layer of the second cap layer.

In an alternative aspect, the disclosed multi-layered films have a structure of A-B-C-B-A, wherein A represents a structural layer, B represents a tie layer, and C represents a core region. In another aspect, the disclosed multi-layered films have a structure of D-A-B-C-B-A-D, wherein A represents a structural layer, B represents a tie layer, C represents a core region, and D represents a cap layer.

In an aspect, in any of the disclosed multi-layered films, each of the one or more core regions can have a gas transmission rate of from about 0.3 to about 1.9 cubic centimeters per square meter per day for nitrogen measured at 23 degrees Celsius and 0 percent relative humidity, optionally for a structure having a thickness of from about 72 micrometers to about 320 micrometers, optionally wherein each of the one or more core regions can have a gas transmission rate of from about 0.3 to about 1.9 cubic centimeters per square meter per day for nitrogen measured at 23 degrees Celsius and 0 percent relative humidity, optionally for a structure having a thickness of from about 72 micrometers to about 320 micrometers In any of these aspects, the multi-layered film further comprises one or more protective layers, each of the one or more protective layers individually comprising or consisting essentially of a protective material, wherein each of the one or more protective layers is adjacent to a core region and has a protective layer thickness, wherein a combination of the one or more protective layers and the adjacent core region has a minimum radius of curvature which is greater than a minimum radius of curvature which causes cracking of the core region, or of one or more individual layers within the core region.

Figure 5:
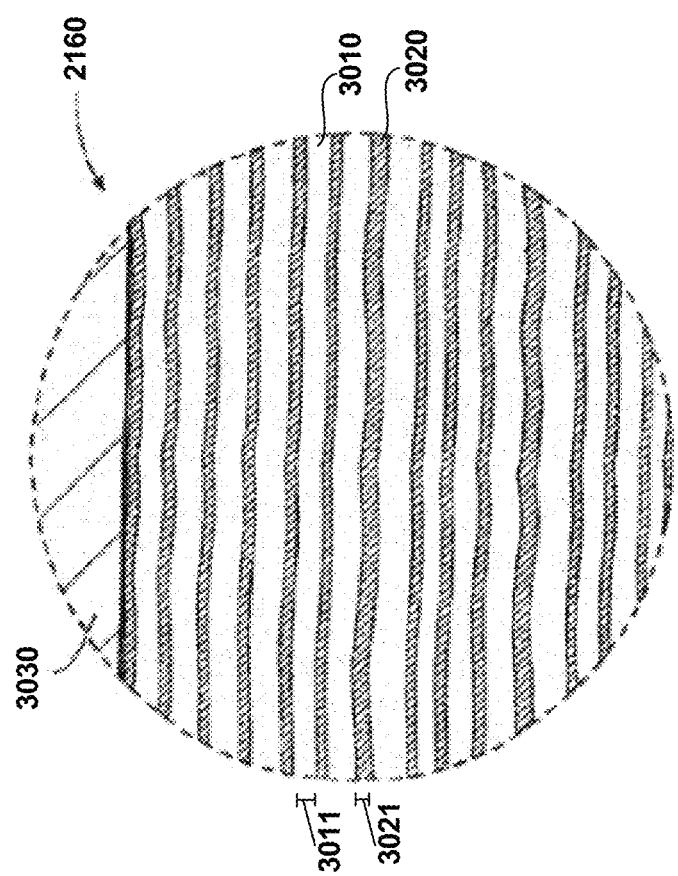
FIG. 5 is an expanded sectional view of a core region of the multi-layered film of the present disclosure.

Turning to FIG. 5, in one aspect, disclosed herein are multi-layered films, the multi-layered films comprising one or more core regions 2160, wherein each of the one or more core regions comprises a plurality of layers, the plurality of layers comprising gas-barrier layers 3020 comprising at least one gas-barrier material alternating with elastomeric layers 3010 comprising at least one elastomeric material; wherein each of the gas-barrier layers has a thickness 3021 of from about 0.5 micrometers to about 2 micrometers thick, or from about 0.5 micrometers to about 1 micrometer thick; or optionally less than or equal to 0.75 micrometers thick, or less than or equal to 0.5 micrometers thick, or in a range of from about 0.01 micrometers to about 0.75 micrometers thick, optionally in a range of from about 0.01 micrometers to about 0.5 micrometers thick; and wherein each of the elastomeric layers has a thickness 3011 of from about 2 micrometers to about 8 micrometers thick, or from about 2 micrometers to about 4 micrometers thick. In some aspects core region 2160 is adjacent to another layer 3030 such as, for example, a tie layer, a structural layer, or a cap layer.

In another aspect, each of the one or more core regions comprises at least 50 layers, or from about 50 to about 100 layers, from about 50 to about 90 layers, from about 50 to about 80 layers, from about 50 to about 70 layers, from about 60 to about 100 layers, from about 60 to about 90 layers, or from about 60 to about 80 layers. In one aspect, each of the one or more core regions has an average total thickness less than 200 micrometers, optionally from about 125 micrometers to about 200 micrometers, or from about 125 micrometers to about 175 micrometers, or from about 150 micrometers to about 200 micrometers.

Figure 6A:
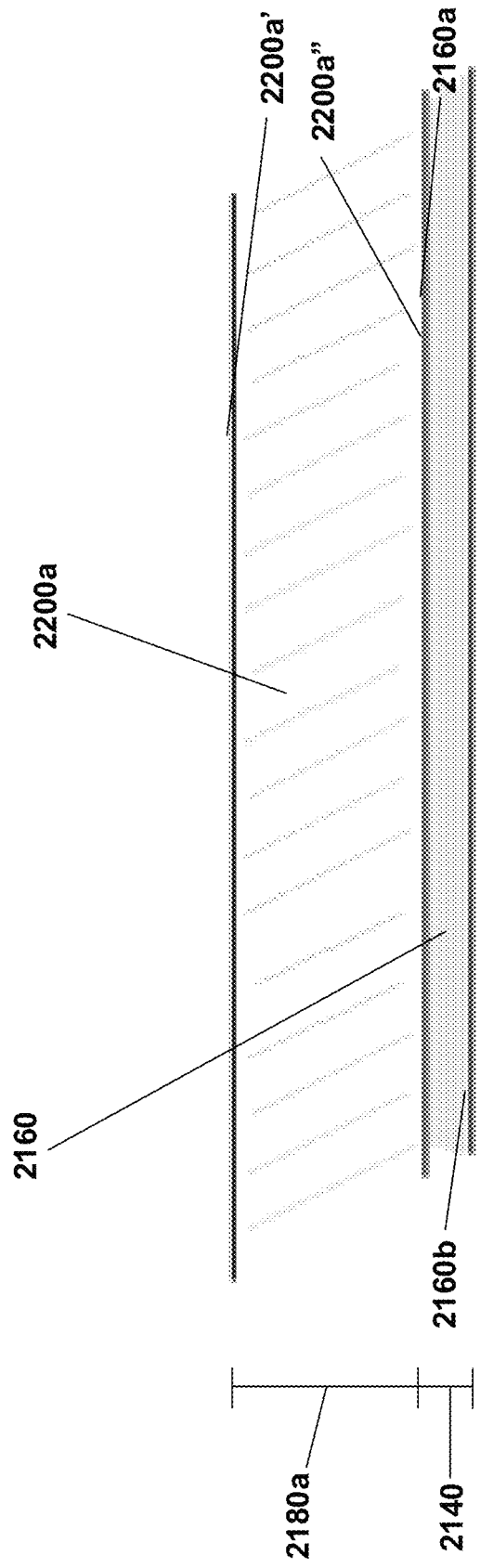

Referring now to FIG. 6A, in an alternative aspect, a sheet or multi-layered film can incorporate single structural layer 2200a comprising a structural material and core region 2160 comprising gas-barrier layers.

Figure 6B:
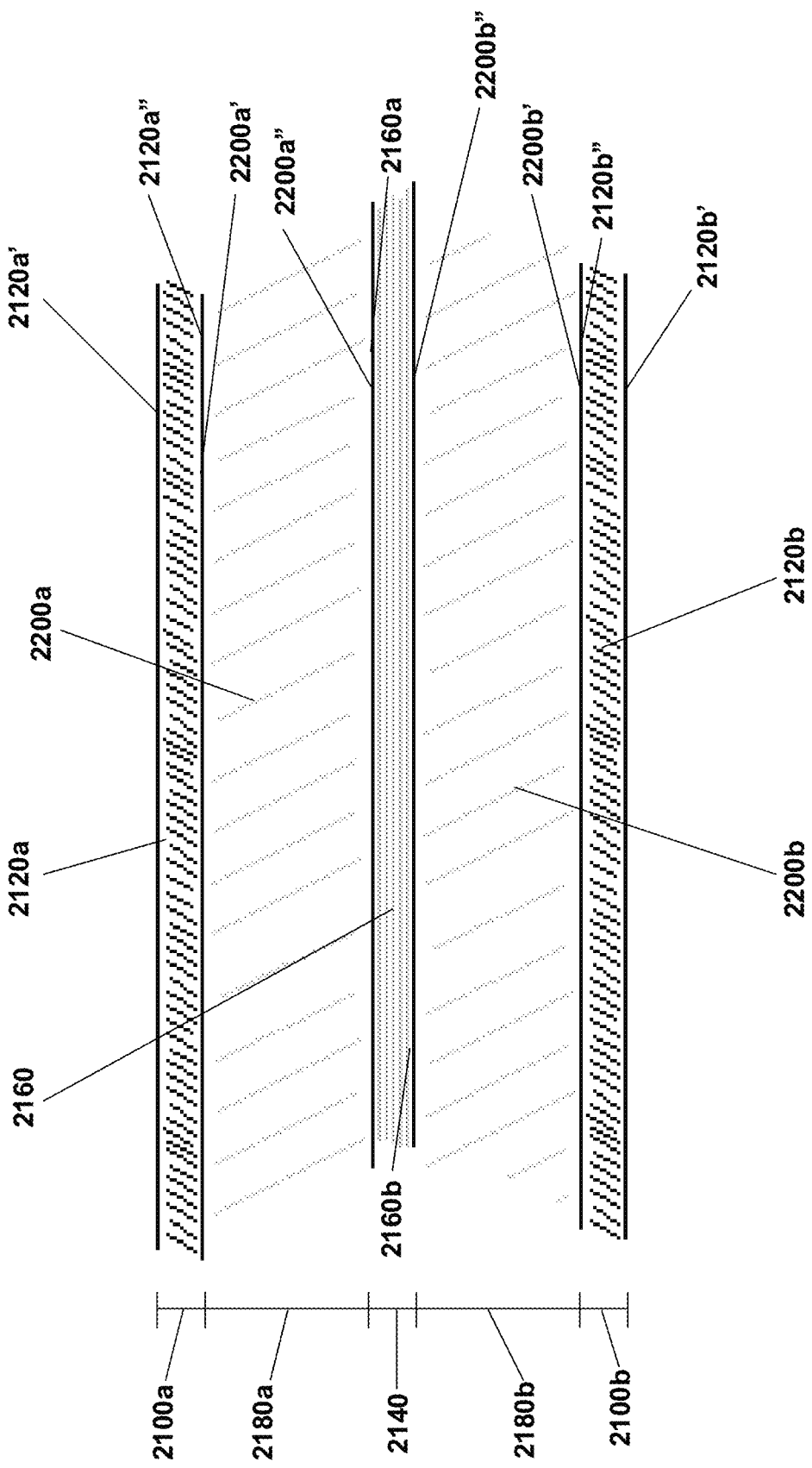

In some aspects, the articles disclosed herein can comprise multiple layers as illustrated, for example, in FIG. 6B. In this exemplary embodiment, the article is a sheet comprising gas-barrier layers and includes a two cap layers, 2120a having a thickness 2100a and 2120b having a thickness 2100b, two structural layers, 2200a having a thickness 2180a and 2200b having a thickness 2180b, and a core region 2160 having a thickness 2140. Suitable examples of thicknesses 2180a and 2180b range from about 900 micrometers to about 1990 micrometers, or from about 900 micrometers to about 1400 micrometers, or from about 1400 micrometers to about 1990 micrometers. Suitable examples of thickness 2140 range from about 125 micrometers to about 200 micrometers, or from about 125 micrometers to about 175 micrometers, or from about 150 micrometers to about 200 micrometers. Suitable examples of thicknesses 2100a and 2100b range from about 5 micrometers to about 25 micrometers. In one aspect, the article can be two-sided. Further in this aspect, a two-sided article can include a symmetrical arrangement of layers on both sides of core region 2160.

In one such aspect in accordance with the example of FIG. 6B, cap layers 2120a and 2120b can comprise or consist essentially of a cap layer material. In such an aspect, structural layers 2200a and 2200b can also comprise or consist essentially of a structural layer material, or can comprise or consist essentially of a barrier material. In such an aspect, the core region 2160 can comprise or consist essentially of a multi-layered film as disclosed herein.

In any of these aspects, the cap layer 2120a can have a first surface 2120a' and a second surface 2120a", while the cap layer 2120b can have a first surface 2120b' and a second surface 2120b". In another aspect, the structural layer 2200a can have a first surface 2200a' and a second surface 2200a", while the core region 2200b can have a first surface 2200b' and a second surface 2200b". In still another aspect, the core region 2160 can have a first surface 2160a and a second surface 2160b. In some aspects, the second surface 2120a" of the cap layer 2120a and the first surface 2200a' of the structural layer 2200a can be adjacent to one another or otherwise in contact with one another. In a further aspect, the second surface 2200a" of the structural layer 2200a and the first surface 2160a of the core region and the second surface 2200a" of the structural layer 2200a can be adjacent to one another or otherwise in contact with one another. In one aspect, the second surface 2160b of the core region 2160 and the second surface 2200b" of the structural layer 2200b can be adjacent to one another or otherwise in contact with one another. In still another aspect, the first surface 2200b' of the structural layer 2200b and the second surface 2120b" of the cap layer 2120b can be adjacent to one another or otherwise in contact with one another. In some aspects, first surface 2120a' of cap layer 2120a and/or first surface 2120b' of cap layer 2120b can independently optionally be an outer surface of an article incorporating the multi-layered film disclosed herein. In any of these aspects, structural layer 2200a and structural layer 2200b can be made from the same material or from different materials and can have the same or different thicknesses. In another aspect, cap layer 2120a and cap layer 2120b can be made from the same material or from different materials and can have the same or different thicknesses.

In another aspect, the article can be configured as a series of four or more layers including one or more structural layers, each of the one or more structural layers comprising a structural layer material and including a structural layer first surface, a structural layer second surface opposing the structural layer first surface, and a structural layer thickness extending from the structural layer first surface to the structural layer second surface;
- optionally wherein at least one of the one or more structural layers is positioned between the first cap layer and the core region, or between the second cap layer and the core region; or
- optionally wherein the one or more structural layers comprise two or more structural layers, and at least a first one of the two or more structural layers is positioned between an inner surface of a first cap layer and the first surface of a core region, and at least a second one of the two or more structural layers is positioned between a second surface of a core region and the inner surface of the second cap layer.

In another aspect, a first surface of a first one of the structural layers is in contact with the inner surface of the first cap layer, and the second surface of the first one of the structural layers is in contact with a first surface of one of the one or more core regions, or the first surface of a second one of the one or more structural layers is in contact with the second surface of one of the one or more core regions, and the second surface of the second one of the structural layers is in contact with an inner surface of the second cap layer, or both.

In one aspect, the one or more structural layers comprise or consist essentially of the blended material or the recycled material as disclosed herein.

Referring now to FIG. 6C, in an alternative aspect, a sheet or multi-layered film can incorporate single structural layer 2200a comprising a structural material, single cap layer 2120a comprising a cap layer material, and core region 2160 comprising gas-barrier layers.

Figure 6D:
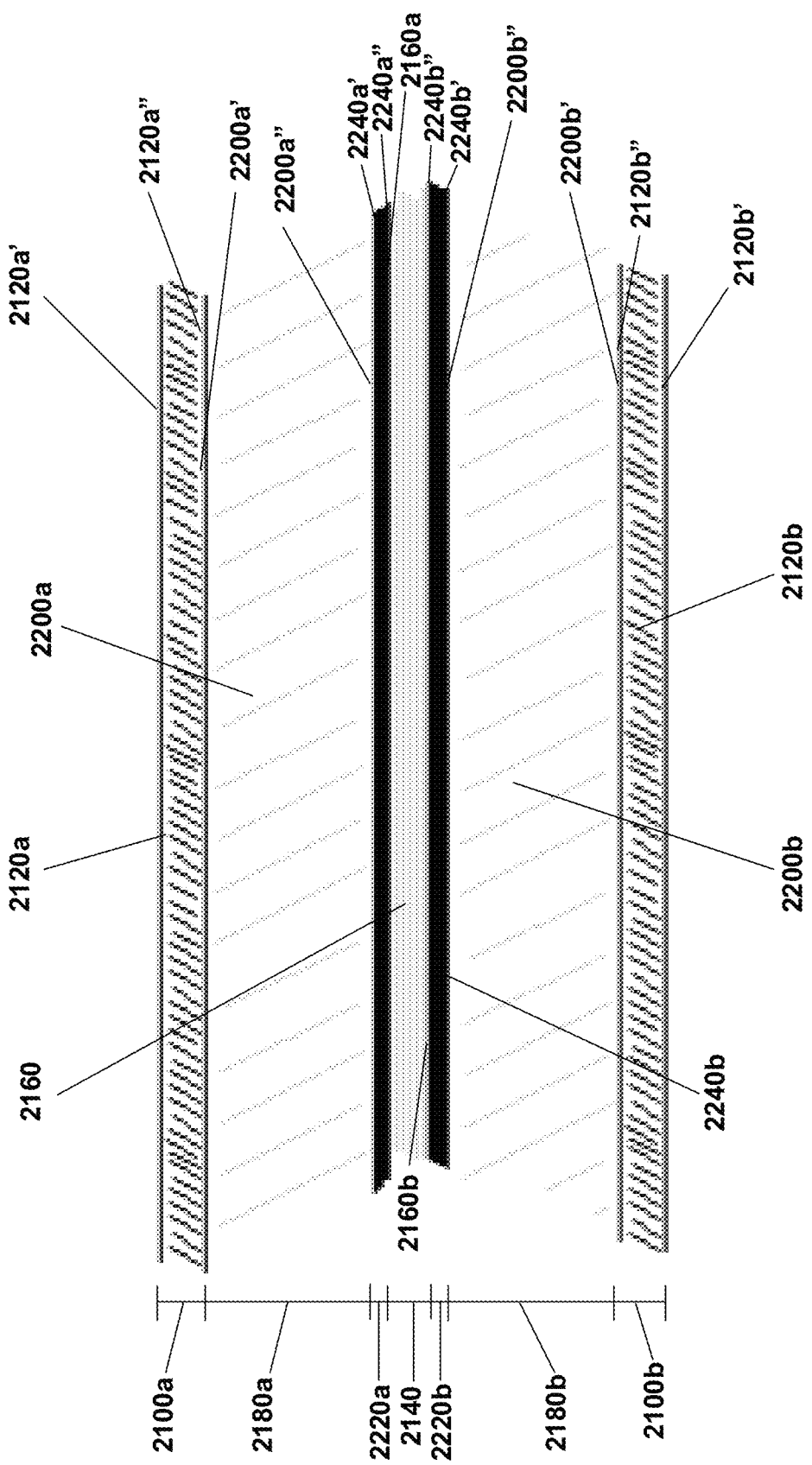

In some aspects, the articles disclosed herein can comprise multiple layers as illustrated, for example, in FIG. 6D. In this exemplary embodiment, the article is a sheet comprising gas-barrier layers and includes two cap layers, specifically cap layer 2120a (having a thickness 2100a), cap layer 2120b (having a thickness 2100b); two structural layers, specifically structural layer (2200a having a thickness 2180a), structural layer 2200b (having a thickness 2180b); two tie layers, specifically tie layer 2240a (having a thickness 2220a) and tie layer 2240b (having a thickness 2220b); and a core region or layer 2160 (having a thickness 2140). Suitable examples of thicknesses 2180a and 2180b range from about 900 micrometers to about 1990 micrometers, or from about 900 micrometers to about 1400 micrometers, or from about 1400 micrometers to about 1990 micrometers. Suitable examples of thickness 2140 range from about 125 micrometers to about 200 micrometers, or from about 125 micrometers to about 175 micrometers, or from about 150 micrometers to about 200 micrometers. Suitable examples of thicknesses 2100a and 2100b range from about 5 micrometers to about 25 micrometers. Suitable examples of thicknesses 2220a and 2220b range from about 5 micrometers to about 20 micrometers. In one aspect, the article can be two-sided. Further in this aspect, a two-sided article can include a symmetrical arrangement of layers on both sides of core region 2160.

In one such aspect in accordance with the example of FIG. 6D, cap layers 2120a and 2120b can comprise or consist essentially of a cap layer material. In such an aspect, structural layers 2200a and 2200b can also comprise or consist essentially of a structural layer material, or can comprise or consist essentially of a barrier material. In such an aspect, the tie layers 2240a and 2240b can comprise or consist essentially of a tie material, or can comprise or consist essentially of a barrier material. In such an aspect, the core region 2160 can comprise or consist essentially of a multi-layered film as disclosed herein.

In any of these aspects, the cap layer 2120a can have a first surface 2120a' and a second surface 2120a", while the cap layer 2120b can have a first surface 2120b' and a second surface 2120b". In another aspect, the structural layer 2200a can have a first surface 2200a' and a second surface 2200a", while the core region 2200b can have a first surface 2200b' and a second surface 2200b". In still another aspect, the tie layer 2240a can have a first surface 2240a' and a second surface 2240a", while the tie layer 2240b can have a first surface 2240b' and a second surface 2240b". In still another aspect, the core region 2160 can have a first surface 2160a and a second surface 2160b. In some aspects, the second surface 2120a" of the cap layer 2120a and the first surface 2200a' of the structural layer 2200a can be adjacent to one another or otherwise in contact with one another. In a further aspect, the second surface 2200a" of the structural layer 2200a and the first surface 2240a' of the tie layer 2240a can be adjacent to one another or otherwise in contact with one another. In a still further aspect, the first surface 2160a of the core region and the second surface 2240a" of the tie layer 2240a can be adjacent to one another or otherwise in contact with one another. In one aspect, the second surface 2160b of the core region 2160 and the second surface 2240b" of the tie layer 2240b can be adjacent to one another or otherwise in contact with one another. In another aspect, the first surface 2240b' of the tie layer 2240b and the second surface 2200b" of the structural layer 2200b can be adjacent to one another or otherwise in contact with one another. In still another aspect, the first surface 2200b' of the structural layer 2200b and the second surface 2120b" of the cap layer 2120b can be adjacent to one another or otherwise in contact with one another. In some aspects, first surface 2120a' of cap layer 2120a and/or first surface 2120b' of cap layer 2120b can independently optionally be an outer surface of an article incorporating the multi-layered film disclosed herein. In any of these aspects, structural layer 2200a and structural layer 2200b can be made from the same material or from different materials and can have the same or different thicknesses. In a further aspect, cap layer 2120a and cap layer 2120b can be made from the same material or from different materials and can have the same or different thicknesses. In a still further aspect, tie layer 2240a and tie layer 2240b can be made from the same material or from different materials and can have the same or different thicknesses.

Figure 6E:
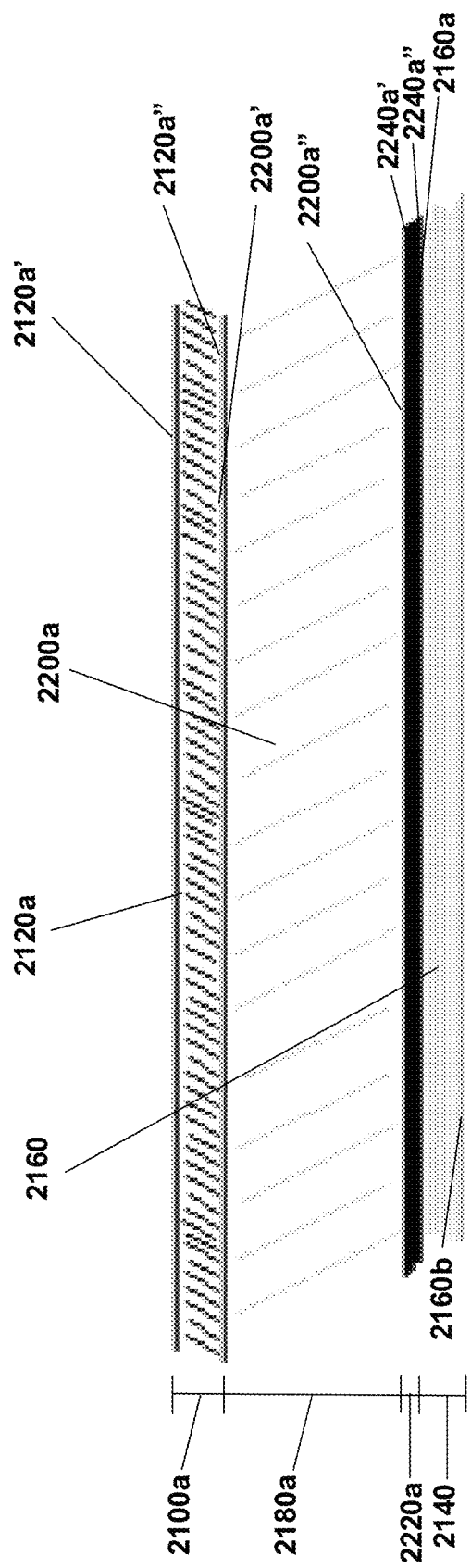

Referring now to FIG. 6E, in an alternative aspect, a sheet or multi-layered film can incorporate single structural layer 2200a comprising a structural material, single cap layer 2120a comprising a cap layer material, single tie layer 2240a comprising a tie layer material, and core region 2160 comprising gas-barrier layers.

In an aspect, the article can be configured as a series of five or more layers including one or more tie layers, each of the one or more tie layers including a tie layer first surface, a tie layer second surface opposing the tie layer first surface, and a tie layer thickness extending from the tie layer first surface to the tie layer second surface;
- optionally wherein at least one of the one or more tie layers is positioned between one of the one or more structural layers and one of the one or more core regions, or between the first cap layer and one of the one or more structural layers, or between the second cap layer and one of the one or more structural layers, or any combination thereof; or optionally wherein the one or more tie layers comprise two or more tie layers, and at least a first one of the two or more tie layers is positioned between a second surface of a first structural layer and a first layer of a core region, and at least a second one of the two or more tie layers is positioned between a second surface of a core region and a first surface of a structural layer.

In one aspect, a first surface of a first one of the one or more tie layers is in contact with a second surface of a first one of the one or more structural layers, and the second surface of the first one of the one or more tie layers is in contact with a first surface of a core region, or wherein a first surface of a second one of the one or more tie layers is in contact with a second surface of one of the one or more core regions, and the second surface of the second one of the one or more tie layers is in contact with a first surface of a second one of the one or more structural layers, or both.

In an aspect, the article comprises the first cap layer, a first structural layer, a first tie layer, a core region, a second tie layer, a second structural layer, and the second cap layer, wherein the first cap layer inner surface contacts the first surface of the first structural layer, the second surface of the first structural layer contacts the first surface of the first tie layer, the second surface of the first tie layer contacts the first surface of the core region, the second surface of the core region contacts the first surface of the second tie layer, the second surface of the second tie layer contacts the first surface of the second structural layer, and the second surface of the second structural layer contacts the inner layer of the second cap layer, and optionally the core region comprises one or more core regions, or comprises a plurality of microlayers.

One or both of the sheets comprising gas-barrier layers as shown in FIGS. 4 and 6A-6E can independently be transparent, translucent, and/or opaque. As used herein, the term "transparent" for a barrier layer and/or a bladder means that light passes through the barrier layer in substantially straight lines and a viewer can see through the barrier layer. In comparison, for an opaque barrier layer, light does not pass through the barrier layer and one cannot see clearly through the barrier layer at all. A translucent barrier layer falls between a transparent barrier layer and an opaque barrier layer, in that light passes through a translucent layer but some of the light is scattered so that a viewer cannot see clearly through the layer.

The airsole 1036 can be produced from the sheets comprising gas-barrier layers as shown in FIGS. 4 and 6A-6E using any suitable technique, such as thermoforming (e.g. vacuum thermoforming), blow molding, extrusion, injection molding, vacuum molding, rotary molding, transfer molding, pressure forming, heat sealing, casting, low-pressure casting, spin casting, reaction injection molding, radio frequency (RF) welding, and the like. In an aspect, the sheets comprising gas-barrier layers as shown in FIGS. 4 and 6A-6E can be produced by co-extrusion followed by vacuum thermoforming to form the profile of the airsole 1036 which can optionally include one or more valves (e.g., one way valves) that allows the airsole 1036 to be filled with the fluid (e.g., gas).

In any of these aspects, the multi-layered films and articles produced therefrom are suitable for use in mass-market products including, but not limited to, articles of footwear, articles of sporting equipment, articles of athletic apparel, personal protective equipment, and the like.

In an aspect, the multi-layered films and articles formed therefrom can include one or more textiles or, in the case of bladders or airbags, one or more spacer materials, wherein the spacer materials can be textiles, foamed components, 3D printed components, or other materials as described herein.

Additional processes can be performed on the multi-layered films and/or articles formed therefrom, including, but not limited to, application of decorative elements and thermoforming to impart useful structures, shapes, or textures. Also disclosed are consumer products incorporating the multi-layered films and articles comprising the same and methods of making the consumer products.

In one exemplary embodiment, provided herein is a method for producing the multi-layered films disclosed herein, the method comprising co-extruding the gas-barrier material and the elastomeric material to form a multi-layered structure comprising the one or more core regions.

In one aspect, the method further comprises applying at least one tie layer to the multi-layered film to form a multi-layered film comprising one or more core regions and the tie layer, wherein the tie layer comprises a tie material as described herein. In some aspects, the method comprises co-extruding at least one tie layer with the multi-layered film to form a multi-layered film comprising the one or more core regions and the tie layer.

In another aspect, the method comprises applying at least one structural layer to the multi-layered film comprising the core region and the tie layer to form a multi-layered film comprising the one or more core regions, the tie layer, and the structural layer, wherein the structural layer comprises a structural layer material. Further in this aspect, the method can comprise co-extruding at least one structural layer with the multi-layered film comprising the core region and the tie layer to form a multi-layered film comprising the one or more core regions, the tie layer, and the structural layer.

In yet another aspect, the method further comprises applying at least one cap layer to the multi-layered film comprising the core region, the tie layer, and the structural layer to form a multi-layered film comprising the core region, the tie layer, the structural layer, and the cap layer, wherein the cap layer comprises a cap layer material as described herein. In some aspects, the method further comprises co-extruding at least one cap layer with the multi-layered film comprising the core region, the tie layer, and the structural layer to form a multi-layered film comprising the core region, the tie layer, the structural layer, and the cap layer.

In some aspects, the article is a layered sheet, optionally a coextruded layered sheet or a laminated layered sheet.

In another aspect, disclosed herein are articles comprising the multi-layered films disclosed herein. In another aspect, the article can comprise an article of footwear, a component of an article of footwear, an article of apparel, a component of an article of apparel, an article of sporting equipment, a component of an article of sporting equipment, a personal protective article, a flexible flotation device, a rigid flotation device, a medical device, a prosthetic device, an orthopedic device, an accumulator, an article of furniture, or a component of an article of furniture. In some aspects, the article can be a tire or a hose. Also disclosed herein are methods of manufacturing a consumer product, the methods comprising affixing the disclosed articles to a second component. Furthermore, disclosed herein are consumer products produced by the disclosed methods.

In an aspect, disclosed herein is a polymeric material comprising: one or more core regions, wherein each of the one or more core regions comprises a plurality of layers, the plurality of layers comprising gas-barrier layers comprising at least one gas-barrier material alternating with elastomeric layers comprising at least one elastomeric material, wherein each of the gas-barrier layers is from about 0.5 micrometers to about 2 micrometers thick, or from about 0.5 micrometers to about 1 micrometer thick; optionally less than or equal to 0.75 micrometers thick, or less than or equal to 0.5 micrometers thick, or in a range of from about 0.01 micrometers to about 0.75 micrometers thick, optionally in a range of from about 0.01 micrometers to about 0.5 micrometers thick; and wherein each of the elastomeric layers is from about 2 micrometers to about 8 micrometers thick, or from about 2 micrometers to about 4 micrometers thick.

In another aspect, each of the one or more core regions comprises at least 50 layers, or from about 50 to about 100 layers, from about 50 to about 90 layers, from about 50 to about 80 layers, from about 50 to about 70 layers, from about 60 to about 100 layers, from about 60 to about 90 layers, or from about 60 to about 80 layers.

In another aspect, the gas-barrier material comprises or consists essentially of one or more gas-barrier polymers, wherein the gas-barrier material comprises a gas-barrier polymeric component consisting of all polymers present in the gas-barrier material. In some aspects, the gas-barrier material comprises a nitrogen barrier material.

In an aspect, the one or more gas-barrier polymers comprise or consist essentially of one or more thermoplastic vinylidene chloride polymers, one or more thermoplastic acrylonitrile polymers or copolymers, one or more thermoplastic polyamides, one or more thermoplastic epoxy resins, one or more thermoplastic amine polymers or copolymers, or one or more thermoplastic polyolefin homopolymers or copolymers. In some aspects, the one or more thermoplastic polyolefin homopolymers or copolymers comprise or consist essentially of one or more thermoplastic ethylene-vinyl alcohol copolymers. In another aspect, the one or more thermoplastic ethylene-vinyl alcohol copolymers include from about 28 mole percent to about 44 mole percent ethylene content, or from about 32 mole percent to about 44 mole percent ethylene content.

In another aspect, the elastomeric material comprises or consists essentially of one or more thermoplastic elastomeric polymers, and comprises an elastomeric polymeric component consisting of all polymers present in the elastomeric material. In one aspect, the one or more thermoplastic elastomeric polymers comprise or consist essentially of one or more thermoplastic elastomeric polyolefin homopolymers or copolymers, one or more thermoplastic elastomeric polyamide homopolymers or copolymers, one or more thermoplastic elastomeric polyester homopolymers or copolymers, one or more thermoplastic elastomeric polyurethane homopolymers or copolymers, one or more thermoplastic elastomeric styrenic homopolymers or copolymers, or any combination thereof.

In further aspects, the one or more styrenic homopolymers or copolymers can include one or more styrenic block copolymers, such as acrylonitrile butadiene styrene block copolymers, styrene acrylonitrile block copolymers, styrene ethylene butylene styrene block copolymers, styrene ethylene butadiene styrene block copolymers, styrene ethylene propylene styrene block copolymers, styrene butadiene styrene block copolymers, and combinations thereof.

In some aspects, the elastomeric material comprises or consists essentially of one or more thermoplastic elastomeric polyurethane homopolymers or copolymers, and optionally comprises or consists essentially of one or more polydiene polyol-based thermoplastic elastomeric homopolymers or copolymers.

In one aspect, the one or more thermoplastic elastomeric polyurethane homopolymers or copolymers comprise a plurality of first segments derived from one or more polyols and a plurality of second segments derived from a diisocyanate. In another aspect, the one or more thermoplastic elastomeric polyurethane homopolymers or copolymers is a polymerization product of a diisocyanate with a polyol.

In one aspect, the thermoplastic elastomeric polyurethane homopolymer or copolymer comprises or consists essentially of one or more polydiene polyol-based thermoplastic elastomeric polyurethane homopolymers or copolymers and the polyol comprises or consists essentially of a polybutadiene polyol, a polyisoprene polyol, a partially or fully-hydrogenated derivative of a polybutadiene polyol or of a polyisoprene polyol, or any combination thereof. In one aspect, the polyol comprises or consists essentially of a polyester polyol, a polyether polyol, a polycarbonate polyol, a polycaprolactone polyether, or any combination thereof.

In one aspect, the diisocyanate can comprise or consist essentially of an aliphatic diisocyanate, an aromatic diisocyanate, or any combination thereof. In one aspect, the aliphatic diisocyanate comprises or consists essentially of hexamethylene diisocyanate (HDI), isophorone diisocyanate (IPDI), butylenediisocyanate (BDI), bisisocyanatocyclohexylmethane (HMDI), 2,2,4-trimethylhexamethylene diisocyanate (TMDI), bisisocyanatomethylcyclohexane, bisisochanatomethyltricyclodecane, norbornane diisocyanate (NDI), cyclohexane diisocyanate (CHDI), 4,4'-dicyclohexhylmethane diisocyanate (H12MDI), diisocyanatododecane, lysine diisocyanate, or any combination thereof. In another aspect, the aromatic diisocyanate comprises or consists essentially of toluene diisocyanate (TDI), TDI adducts with trimethylolpropane (TMP), methylene diphenyl diisocyanate (MDI), xylene diisocyanate (XDI), tetramethylxylylene diisocyanate (TMXDI), hydrogenated xylene diisocyanate (HXDI), naphthalene 1,5-diisocyanate (NDI), 1,5-tetrahydronaphthalene diisocyanate, para-phenylene diisocyanate (PPDI), 3,3'-dimethyldiphenyl-4,4'-diisocyanate (DDDI), 4,4'-dibenzyl diisocyanate (DBDI), 4-chloro-1,3-phenylene diisocyanate, or any combination thereof.

Additional Materials

In some aspects, the multi-layered films disclosed herein further comprise a blended material, wherein the blended material comprises or consists essentially of a blend of one or more additional thermoplastic elastomers and a second material, optionally wherein the second material comprises or consists essentially of one or more second polymers, optionally wherein the one or more second polymers comprise or consist essentially of one or more second thermoplastics.

In an aspect, the one or more second thermoplastics can comprise one or more thermoplastic polyolefin homopolymers, one or more thermoplastic polyamide homopolymers or copolymers, one or more thermoplastic polyester homopolymers or copolymers, one or more thermoplastic polyurethane homopolymers or copolymers, one or more thermoplastic styrenic homopolymers or copolymers, or any combination thereof.

In further aspects, the one or more styrenic homopolymers or copolymers can include one or more styrenic block copolymers, such as acrylonitrile butadiene styrene block copolymers, styrene acrylonitrile block copolymers, styrene ethylene butylene styrene block copolymers, styrene ethylpropylene styrene block copolymers, styrene butadiene styrene block copolymers, and combinations thereof.

In another aspect, the one or more second thermoplastics can comprise or consist essentially of thermoplastic polypropylene homopolymers or copolymers, thermoplastic polyethylene homopolymers or copolymers, thermoplastic polybutylene homopolymers or copolymers, or any combination thereof.

In some aspects, the one or more second thermoplastics comprise or consist essentially of one or more thermoplastic polyethylene copolymers. In another aspect, the one or more second thermoplastics comprise or consist essentially of one or more thermoplastic ethylene-vinyl alcohol copolymers. In one aspect, a polymeric component of the blended material consists of one or more additional thermoplastic elastomeric polyurethane homopolymers or copolymers, and one or more second thermoplastic ethylene-vinyl alcohol copolymers. In an alternative aspect, the polymeric component of the thermoplastic elastomeric material consists of one or more additional thermoplastic elastomeric polyester-polyurethane copolymers and one or more second thermoplastic ethylene-vinyl alcohol copolymers. In some aspects, the blended material comprises one or more recycled additional thermoplastic elastomers, or one or more recycled second thermoplastics, or both.

In some aspects, the blended material is a phase-separated blend of the one or more additional thermoplastic elastomers and the one or more second thermoplastics. In some aspects, the phase-separated blend includes one or more phase-separated regions including interfaces between the one or more additional thermoplastic elastomers and the one or more second thermoplastics. In some aspects, the blend comprises about 95 percent by weight of the one or more second thermoplastics and about 5 percent by weight of the one or more second thermoplastics based on a total weight of the blend.

In an aspect, the disclosed multi-layered films further comprise a recycled material comprising one or more recycled polymers, optionally wherein the one or more recycled polymers comprise one or more recycled thermoplastics, optionally wherein the one or more recycled thermoplastics comprise one or more recycled thermoplastic elastomers; optionally wherein the recycled material comprises a recycled material polymeric component consisting of one or more recycled thermoplastics, optionally wherein the recycled material polymeric component comprises or consists essentially of one or more recycled thermoplastic elastomers.

In another aspect, the recycled material can comprise one or more recycled thermoplastic elastomers, and optionally the one or more recycled thermoplastic elastomers comprise one or more reground thermoplastic elastomers, optionally wherein the one or more recycled or reground thermoplastic elastomers includes a thermoplastic elastomeric material as disclosed herein.

In some aspects, the recycled material further comprises one or more recycled second thermoplastics, and the one or more recycled second thermoplastics optionally comprise one or more reground second thermoplastics, optionally wherein the one or more recycled or reground second thermoplastics include a thermoplastic as disclosed herein.

In one aspect, the recycled material comprises one or more recycled or reground thermoplastic polyurethane elastomers or one or more recycled or reground thermoplastic ethylene-vinyl alcohol copolymers or both. In an aspect, the recycled material comprises a blend of the one or more recycled or reground thermoplastic elastomers and one or more second thermoplastics, or comprises a blend of one or more thermoplastic elastomers and one or more recycled thermoplastics or one or more recycled thermoplastics, optionally wherein the blend is a phase-separated blend, and optionally wherein the phase-separated blend comprises one or more interfaces between the one or more recycled thermoplastic elastomers and the one or more second thermoplastics.

In another aspect, in the multi-layered films, the recycled material comprises about 99 percent to about 90 percent by weight of the one or more recycled thermoplastic elastomers and about 1 percent to about 10 percent by weight of the one or more second thermoplastics based on a total weight of the recycled material, optionally wherein the recycled material comprises about 99 percent to about 93 percent by weight of the one or more recycled thermoplastic elastomers and about 1 percent to about 7 percent by weight of the one or more second thermoplastics, or about 99 percent to about 95 percent by weight of the one or more recycled thermoplastic elastomers and about 1 percent to about 5 percent by weight of the one or more second thermoplastic elastomers.

In an aspect, the recycled material comprises about 99 percent to about 50 percent by weight of recycled or reground polymers based on a total weight of recycled material, or from about 99 percent to about 75 percent by weight of recycled or reground polymers.

In some aspects, the recycled material further comprises one or more virgin first thermoplastic elastomers, optionally wherein the one or more virgin thermoplastic elastomers includes one or more virgin thermoplastic polyurethane elastomers.

In one aspect, the multi-layered film further comprises one or more tie layers, each of the one or more tie layers individually comprising or consisting essentially of a tie material, wherein the one or more tie layers increase a bond strength between two adjacent layers. In some aspects, the tie material of each of the one or more tie layers independently comprises or consists essentially of a polyurethane, a polyacrylate, an ethylene-acrylate copolymer, a maleic anhydride grafted polyolefin, or any combination thereof, and optionally the tie material comprises or consists essentially of a blended material or a recycled material as disclosed herein. In another aspect, the tie layer material of the one or more tie layers independently comprises or consists essentially of one or more thermoplastic polyurethane elastomeric homopolymers or copolymers, optionally wherein the one or more tie layers comprise or consist essentially of polydiene polyol-based thermoplastic polyurethane.

In another aspect, the multi-layered films further comprise one or more structural layers, each of the one or more structural layers independently comprising or consisting essentially of a structural layer material, optionally wherein the structural layer material comprises or consists essentially of a blended material or a recycled material as described herein. In some aspects, the structural layer material of the one or more structural layers independently comprises or consists essentially of a polydiene polyol-based thermoplastic polyurethane.

In still another aspect, the multi-layered films can comprise one or more cap layers, wherein the one or more cap layers comprise or consist essentially of a cap layer material, optionally wherein the cap layer material comprises or consists essentially of a blended material or a recycled material as disclosed herein. In some aspects, the cap layer material of the one or more cap layers comprises or consists essentially of a polyurethane, a polyacrylate, an ethylene-acrylate copolymer, a maleic anhydride grafted polyolefin, or any combination thereof. In another aspect, the cap layer material of the one or more cap layers comprises or consists essentially of a thermoplastic polyurethane, optionally a polydiene polyol-based thermoplastic polyurethane.

In some aspects, at least one of the one or more tie layers is positioned between one of the one or more structural layers and one of the one or more core regions. In another aspect, at least one of the one or more structural layers is positioned between one of the one or more tie layers and one of the one or more cap layers. In another aspect, the multi-layered film can be a coextruded layered sheet or a laminated layered sheet.

In one aspect, disclosed herein is a multi-layered film comprising a first cap layer, a first structural layer, a first tie layer, a core region, a second tie layer, a second structural layer, and a second cap layer, wherein a first cap layer inner surface contacts a first surface of the first structural layer, a second surface of the first structural layer contacts a first surface of the first tie layer, a second surface of the first tie layer contacts a first surface of the core region, a second surface of the core region contacts a first surface of the second tie layer, a second surface of the second tie layer contacts a first surface of the second structural layer, and a second surface of the second structural layer contacts an inner layer of the second cap layer.

In an alternative aspect, the disclosed multi-layered films have a structure of A-B-C-B-A, wherein A represents a structural layer, B represents a tie layer, and C represents a core region. In another aspect, the disclosed multi-layered films have a structure of D-A-B-C-B-A-D, wherein A represents a structural layer, B represents a tie layer, C represents a core region, and D represents a cap layer.

In an aspect, in any of the disclosed multi-layered films, each of the one or more core regions can have a gas transmission rate of from about 0.3 to about 1.9 cubic centimeters per square meter per day for nitrogen measured at 23 degrees Celsius and 0 percent relative humidity for a structure having a thickness of from about 72 micrometers to about 320 micrometers.

In any of these aspects, the multi-layered film further comprises one or more protective layers, each of the one or more protective layers individually comprising or consisting essentially of a protective material, wherein each of the one or more protective layers is adjacent to a core region and has a protective layer thickness, wherein a combination of the one or more protective layers and the adjacent core region has a minimum radius of curvature which is greater than a minimum radius of curvature which causes cracking of the core region, or of one or more individual layers within the core region.

Methods for Producing the Multi-Layered Films

In an aspect, the sheets comprising gas-barrier layers can be produced by co-extrusion followed by vacuum thermoforming to form the profile of the airsole which can optionally include one or more valves (e.g., one way valves) that allows the airsole to be filled with the fluid (e.g., gas).

In any of these aspects, the multi-layered films and articles produced therefrom are suitable for use in mass-market products including, but not limited to, articles of footwear, articles of sporting equipment, articles of athletic apparel, personal protective equipment, and the like.

In an aspect, the multi-layered films and articles formed therefrom can include one or more textiles or, in the case of bladders or airbags, one or more spacer materials, wherein the spacer materials can be textiles, foamed components, 3D printed components, or other materials as described herein.

Additional processes can be performed on the multi-layered films and/or articles formed therefrom, including, but not limited to, application of decorative elements and thermoforming to impart useful structures, shapes, or textures. Also disclosed are consumer products incorporating the multi-layered films and articles comprising the same and methods of making the consumer products.

In one embodiment, provided herein is a method for manufacturing the multi-layered films disclosed herein, the method including at least the steps of co-extruding the gas barrier material and the elastomeric material to form a multi-layered film comprising one or more core regions, wherein each of the one or more core regions comprises a plurality of layers, the plurality of layers comprising gas-barrier layers comprising the gas-barrier material alternating with elastomeric layers comprising the elastomeric material.

In one aspect, the disclosed method further comprises applying at least one tie layer to the multi-layered film comprising the one or more core regions to form a multi-layered film comprising the one or more core regions and the tie layer, wherein the tie layer comprises a tie material as disclosed herein. In a further aspect, the disclosed method further comprises co-extruding at least one tie layer with the multi-layered film comprising the core region to form a multi-layered film comprising the one or more core regions and the tie layer.

In one aspect, the disclosed method further comprises applying at least one structural layer to the multi-layered film comprising the core region and the tie layer to form a multi-layered film comprising the one or more core regions, the tie layer, and the structural layer, wherein the structural layer comprises a structural layer material as disclosed herein. In an alternative aspect, the disclosed method further comprises co-extruding at least one structural layer with the multi-layered film comprising the core region and the tie layer to form a multi-layered film comprising the one or more core regions, the tie layer, and the structural layer.

In one aspect, the disclosed method further comprises applying at least one cap layer to the multi-layered film comprising the core region, the tie layer, and the structural layer to form a multi-layered film comprising the core region, the tie layer, the structural layer, and the cap layer, wherein the cap layer comprises a cap layer material as disclosed herein. In an alternative aspect, the disclosed method further comprises co-extruding at least one cap layer with the multi-layered film comprising the core region, the tie layer, and the structural layer to form a multi-layered film comprising the core region, the tie layer, the structural layer, and the cap layer.

In an exemplary embodiment, disclosed herein are multi-layered films produced by the disclosed methods.

Articles

In one aspect, provided herein are articles comprising the multi-layered films disclosed herein, the articles including:
a multi-layered film comprising
a first cap layer comprising or consisting essentially of a first cap layer material, the first cap layer including a first cap layer outer surface defining a first outer surface of the multi-layered film, a first cap layer inner layer surface opposing the first cap layer outer surface, a first cap layer thickness extending from the first cap layer inner surface to the first cap layer outer surface, wherein the first cap layer outer surface defines a first exterior surface of the article;

a second cap layer comprising or consisting essentially of a second cap layer material, the second cap layer including a second cap layer outer surface defining a second outer surface of the multi-layered film, a second cap layer inner surface opposing the second cap layer outer surface, a second cap layer thickness extending from the second cap layer inner surface to the second cap layer outer surface, optionally wherein the second cap layer outer surface defines a second exterior surface of the article; and one or more core regions, wherein each of the one or more core regions comprises or consists essentially of one or more gas-barrier layers, optionally one or more gas-barrier layers each having an average thickness of less than or equal to about 0.75 micrometers, optionally at least about 20 individual gas-barrier layers, each gas-barrier layer alternating with elastomeric layers, each of the one or more core regions including a core region first surface, a core region second surface, and a core region thickness extending from the core region first surface to the core region second surface, wherein each of the one or more core regions is positioned between the first cap layer inner surface and the second cap layer inner surface.

In another aspect, the first cap layer material and the second cap layer material are substantially the same. In an alternative aspect, the first cap layer material and the second cap layer material are different. In some aspects, the first cap layer inner surface is in contact with the core region first surface, or the second cap layer inner surface is in contact with the core region second surface, or both.

In another aspect, the article can be configured as a series of four or more layers including one or more structural layers, each of the one or more structural layers comprising a structural layer material and including a structural layer first surface, a structural layer second surface opposing the structural layer first surface, and a structural layer thickness extending from the structural layer first surface to the structural layer second surface;

optionally wherein at least one of the one or more structural layers is positioned between the first cap layer and the core region, or between the second cap layer and the core region; or optionally wherein the one or more structural layers comprise two or more structural layers, and at least a first one of the two or more structural layers is positioned between an inner surface of a first cap layer and the first surface of a core region, and at least a second one of the two or more structural layers is positioned between a second surface of a core region and the inner surface of the second cap layer.

In another aspect, a first surface of a first one of the structural layers is in contact with the inner surface of the first cap layer, and the second surface of the first one of the structural layers is in contact with a first surface of one of the one or more core regions, or the first surface of a second one of the one or more structural layers is in contact with the second surface of one of the one or more core regions, and the second surface of the second one of the structural layers is in contact with an inner surface of the second cap layer, or both.

In one aspect, the one or more structural layers comprise or consist essentially of the blended material or the recycled material as disclosed herein.

In an aspect, the article can be configured as a series of five or more layers including one or more tie layers, each of the one or more tie layers including a tie layer first surface, a tie layer second surface opposing the tie layer first surface, and a tie layer thickness extending from the tie layer first surface to the tie layer second surface;

optionally wherein at least one of the one or more tie layers is positioned between one of the one or more structural layers and one of the one or more core regions, or between the first cap layer and one of the one or more structural layers, or between the second cap layer and one of the one or more structural layers, or any combination thereof; or optionally wherein the one or more tie layers comprise two or more tie layers, and at least a first one of the two or more tie layers is positioned between a second surface of a first structural layer and a first layer of a core region, and at least a second one of the two or more tie layers is positioned between a second surface of a core region and a first surface of a structural layer.

In one aspect, a first surface of a first one of the one or more tie layers is in contact with a second surface of a first one of the one or more structural layers, and the second surface of the first one of the one or more tie layers is in contact with a first surface of a core region, or wherein a first surface of a second one of the one or more tie layers is in contact with a second surface of one of the one or more core regions, and the second surface of the second one of the one or more tie layers is in contact with a first surface of a second one of the one or more structural layers, or both.

In an aspect, the article comprises the first cap layer, a first structural layer, a first tie layer, a core region, a second tie layer, a second structural layer, and the second cap layer, wherein the first cap layer inner surface contacts the first surface of the first structural layer, the second surface of the first structural layer contacts the first surface of the first tie layer, the second surface of the first tie layer contacts the first surface of the core region, the second surface of the core region contacts the first surface of the second tie layer, the second surface of the second tie layer contacts the first surface of the second structural layer, and the second surface of the second structural layer contacts the inner layer of the second cap layer, and optionally the core region comprises one or more core regions, or comprises a plurality of microlayers.

In some aspects, the article is a layered sheet, optionally a coextruded layered sheet or a laminated layered sheet.

In another aspect, disclosed herein are articles comprising the multi-layered films disclosed herein. In another aspect, the article can comprise an article of footwear, a component of an article of footwear, an article of apparel, a component of an article of apparel, an article of sporting equipment, a component of an article of sporting equipment, a personal protective article, a flexible flotation device, a rigid flotation device, a medical device, a prosthetic device, an orthopedic device, an accumulator, an article of furniture, or a component of an article of furniture. In some aspects, the article can be a tire or a hose. Also disclosed herein are methods of manufacturing a consumer product, the methods comprising affixing the disclosed articles to a second component. In a further aspect, disclosed herein are consumer products produced by the disclosed methods.

Thermoforming

In any of the foregoing aspects, the multi-layered films or bladder can be subjected to a thermoforming step, optionally wherein thermoforming occurs before inflation of the bladder, or wherein the thermoforming step occurs simultaneously with the inflation of the bladder, or wherein the thermoforming step occurs after the inflation of the bladder. In one aspect, thermoforming the bladder can impart one or more structural or other properties to the bladder, such as three-dimensional shape or structure, rigidity, abrasion resistance, water resistance, or the like, to one or more portions of the bladder. In some aspects, the thermoforming process can be useful in imparting a texture to the bladder, wherein the texture can be decorative, functional, or both decorative and functional.

In an aspect, a portion of the multi-layered films or bladder can be selectively thermoformed, for example, by masking portions of the multi-layered films or bladder that are not desired to be exposed to the thermoforming process, or by using tooling that contacts or covers only a portion of the multi-layered films or bladder.

In one aspect, the multi-layered films or bladder comprise an outer surface and thermoforming comprises placing the multi-layered films or bladder in a mold, wherein the mold comprises an inner molding surface. Further in this aspect, the inner molding surface contacts the outer surface of the multi-layered films or bladder.

In some aspects, a protective sheath having an outer surface is placed between at least a portion of the outer surface of the multi-layered film or bladder and the inner molding surface, and the outer surface of the protective sheath contacts the inner molding surface. In a further aspect, the protective sheath comprises an inner surface and the inner surface of the protective sheath contacts the outer surface of the multi-layered film or bladder. In an optional aspect, the inner surface of the protective sheath comprises a raised pattern. In some aspects, the raised pattern of the inner surface of the protective sheath is imprinted into the multi-layered film or bladder during thermoforming. In one aspect, use of a protective sheath may be effective in reducing the number of air bubbles that form and become trapped in any layer of the multi-layered film or bladder during the thermoforming process.

In an aspect, thermoforming further comprises applying a compressive force between the outer surface of the multi-layered film or bladder and the inner molding surface, or optionally between the outer surface of the protective sheath and the inner molding surface. In some aspects, the compressive force provides a pressure differential between the outer surface of the multi-layered film or bladder and the inner molding surface, or optionally between the outer surface of the protective sheath and the inner molding surface. In one aspect, the pressure differential can be a positive pressure differential. In another aspect, the pressure differential can be a negative pressure differential.

In any of these aspects, following thermoforming, the bladder can be cooled. During and after cooling, in an aspect, the bladder retains shape and/or other properties imparted during or as a result of the disclosed thermoforming process.

In some aspects, thermoforming comprises increasing a temperature of the multi-layered films or bladder to a softening temperature of the first sheet, the second sheet, or both, conforming the outer surface of the multi-layered films or bladder to the shape of the inner molding surface.

Decoration

In one aspect, disclosed herein is a multi-layered film or a bladder, wherein the multi-layered film or bladder further comprises a decorative element.

Also disclosed herein is a method for applying a decorative element to a multi-layered film or bladder. In one aspect, the method comprises applying the decorative element by printing, painting, brushing, or spraying the decorative element onto the multi-layered film or bladder. In another aspect, the method comprises dipping the multi-layered film or bladder into the decorative element, or pressing the decorative element into the multi-layered film or bladder. In an aspect, the decorative element is in the form of a solid, a liquid, or a gas when applied to the multi-layered film or bladder. In an optional aspect, the decorative element comprises a pigment or a dye or both a pigment and a dye.

In one aspect, the decorative element comprises pigments or dyes or both and the step of applying the decorative element onto the multi-layered film or bladder comprises curing the decorative element on the multi-layered film or bladder, optionally wherein the curing comprises drying the decorative element, crosslinking the decorative element, or infusing at least a portion of the decorative element into a polymeric material of an exterior surface of the multi-layered film or bladder, or bonding the decorative element to the exterior surface of the multi-layered film or bladder, or any combination thereof.

In another aspect, the method includes the step of bonding the decorative element to the exterior surface of the multi-layered film or bladder, and the bonding includes forming an adhesive bond by applying an adhesive to a first side of the decorative element or to the exterior surface of the multi-layered film or bladder, or both, and then pressing together the first side of the decorative element and the exterior surface of the multi-layered film or bladder.

In an alternative aspect, the method includes the step of bonding the decorative element to the exterior surface of the multi-layered film or bladder, and the bonding includes forming a thermal bond between a thermoplastic material of a first side of the decorative element and a thermoplastic material defining the exterior surface of the multi-layered film or bladder, by softening or melting at least an outer portion of one or both of the thermoplastic materials, and pressing the first side of the decorative element and the exterior surface of the multi-layered film or bladder against each other while one or both of the thermoplastic materials are softened or melted, and then re-solidifying the softened or melted outer portion.

In an aspect, the decorative element is applied to an exterior surface of the multi-layered film or bladder, and, during applying or during curing or during both the applying and the curing, the decorative element infuses into a material defining the exterior surface of the multi-layered film or bladder, optionally wherein the decorative element is applied as a solution of a dye.

Also disclosed herein are multi-layered films and/or bladders comprising a decorative element applied according to any one of the disclosed methods.

Articles Incorporating the Multi-Layered Films

Sole Structures. In an aspect, disclosed herein is a sole structure for an article of footwear having an upper, the sole structure comprising a heel region disposed in a posterior end; a forefoot region disposed in an anterior end; a mid-foot region disposed intermediately between the heel region and the forefoot region; and a bladder as disclosed herein. In one aspect, the bladder is disposed in the heel region.

Also disclosed are articles of footwear comprising the disclosed bladders, and articles of footwear comprising the disclosed sole structures.

In one aspect, disclosed herein is an article of footwear comprising an upper and a sole structure, wherein the upper, the sole structure, or both the upper and the sole structure comprise a bladder, the bladder comprising:

a first film secured to a second film to define a sealed internal cavity; and a fluid disposed within the sealed internal cavity at a pressure of about one atmosphere (101 kilopascals) or greater;

wherein the first film, the second film or each of the first film and the second film is a multi-layered film including a core region comprising at least 50 gas-barrier layers and a plurality of elastomeric layers, wherein the gas-barrier layers alternate with the elastomeric layers, wherein each of the gas-barrier layers comprises at least one gas-barrier material, and wherein each of the elastomeric layers comprises at least one elastomeric material, and wherein the core region has a total thickness less than 200 micrometers.

In one aspect, the sole structure comprises the bladder. In another aspect, the article of footwear further comprises a chassis secured to the upper. In still another aspect, the article of footwear further comprises an outsole and, optionally, the outsole is secured to the bladder. In some aspects, in the article of footwear, the bladder can be disposed between the chassis and the outsole.

Sporting Equipment. In another aspect, disclosed herein are articles of sporting equipment comprising the multi-layered films. Further in this aspect, the articles of athletic equipment include any articles where flexibility and gas-barrier properties are useful, such as, for example, inflatable balls, rafts, watercraft, mats, balance trainers, flotation devices, and the like.

Figure 7A:
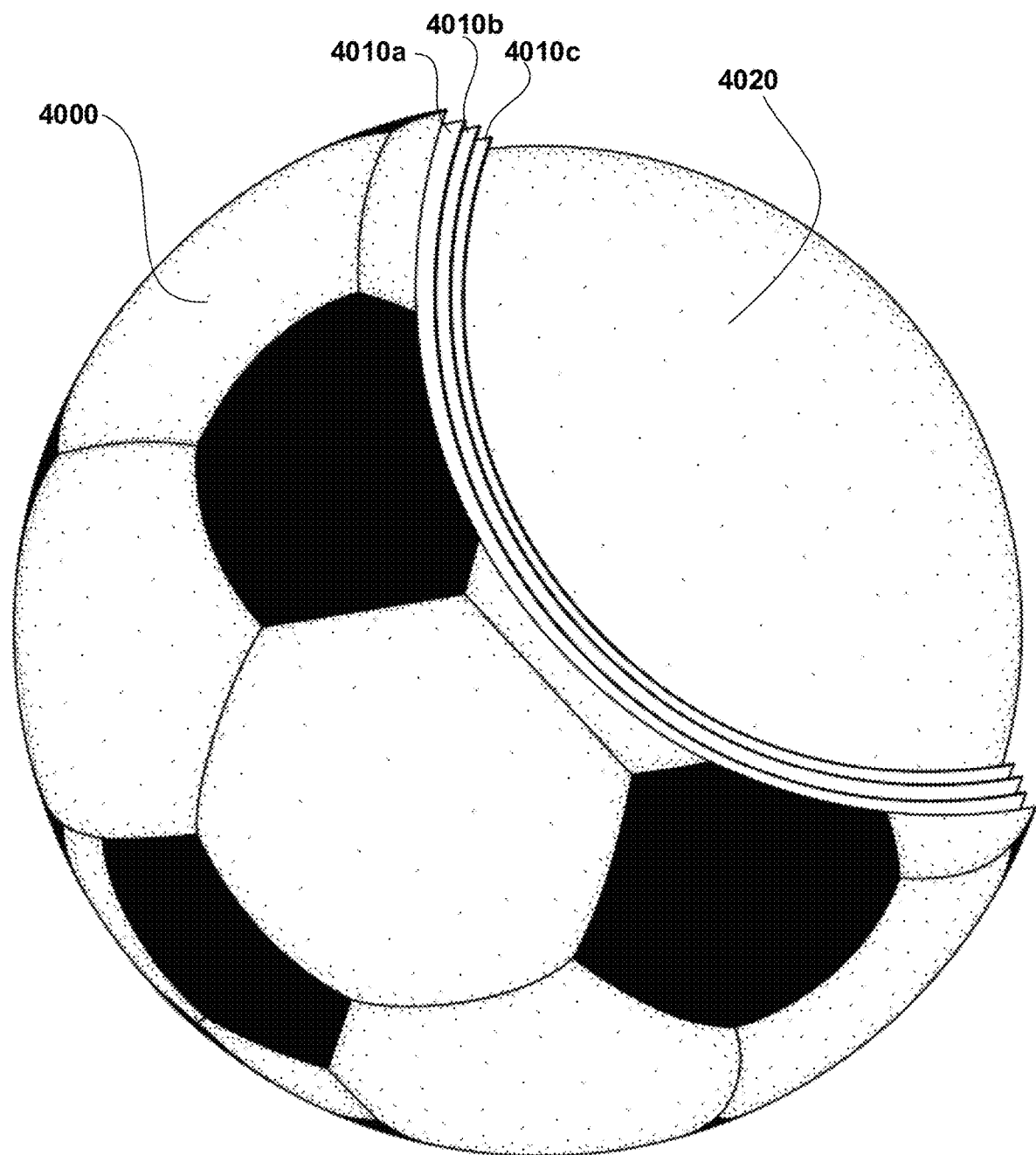
FIGS. 7A-7B show an exemplary article of athletic equipment (i.e., a soccer ball) incorporating the multi-layered film of the present disclosure.
Figure 7B:
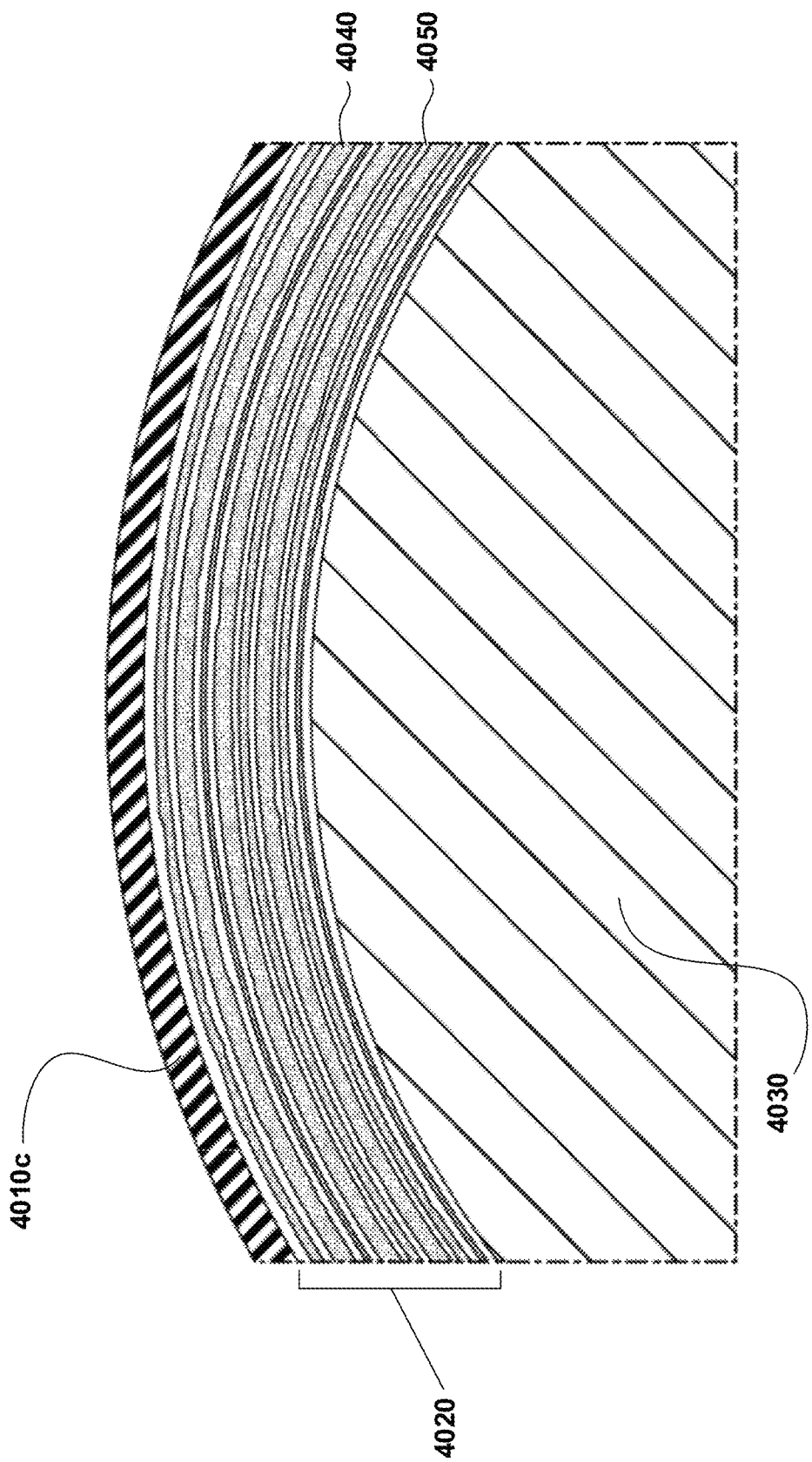

Referring now to FIG. 7A, in one non-limiting aspect, the multi-layered films can be incorporated into a soccer ball. Further in this aspect, the soccer ball can have outer covering 4000, one or more intermediate layers (shown herein as 4010a, 4010b, and 4010c, although other embodiments having more or fewer intermediate layers should also be considered disclosed), and an innermost gas-barrier layer 4020 comprising the disclosed multi-layered film, wherein gas-barrier layer 4020 allows the soccer ball to maintain an inflated state during play by reducing rates of gas (e.g., inflation air) transmission through the multi-layered film. FIG. 7B shows a cross-section of the soccer ball of FIG. 7A, wherein the positioning between an innermost intermediate layer 4010c and the multi-layered film 4020 comprising alternating gas-barrier layers 4040 and elastomeric layers 4050. Interior 4030 is hollow and, upon inflation of the ball, is filled with air or another gas. Interior 4030 is surrounded by the multi-layered film 4020, which provides for a low gas-transmission rate (e.g. less than about 0.5 to about 2 cubic centimeters per square meter per day for nitrogen measured at 23 degrees Celsius and 0 percent relative humidity for a film having a thickness ranging from 72 micrometers to 320 micrometers).

Transportation Equipment. In still another aspect, disclosed herein are articles useful in transportation comprising the multi-layered films. In one aspect, the article can be a tire for a bicycle, automobile, tractor, motorized scooter, motorcycle, or any other vehicle using inflatable tires.

Figure 8A:
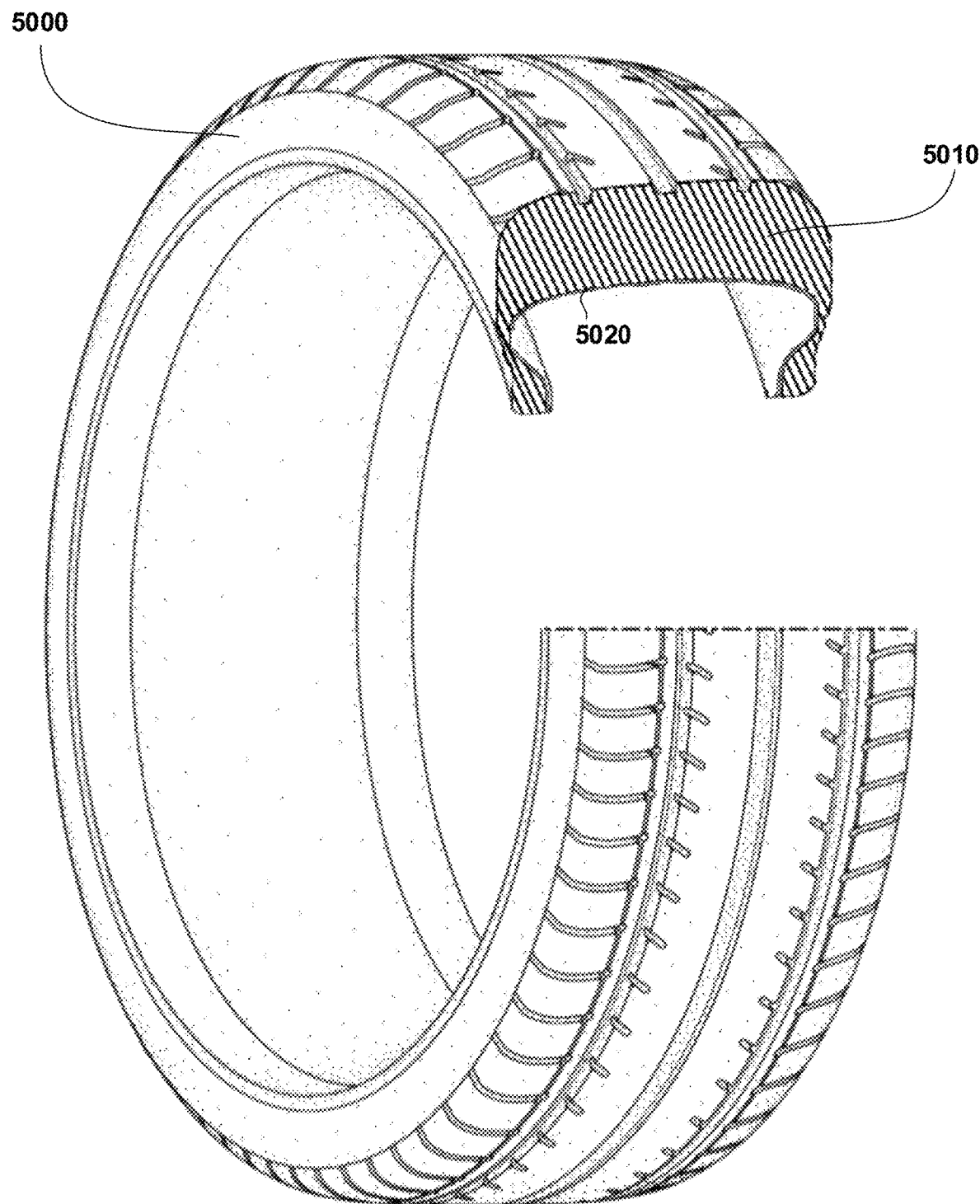
FIGS. 8A-8B show a tire incorporating the multi-layered film of the present disclosure.
Figure 8B:
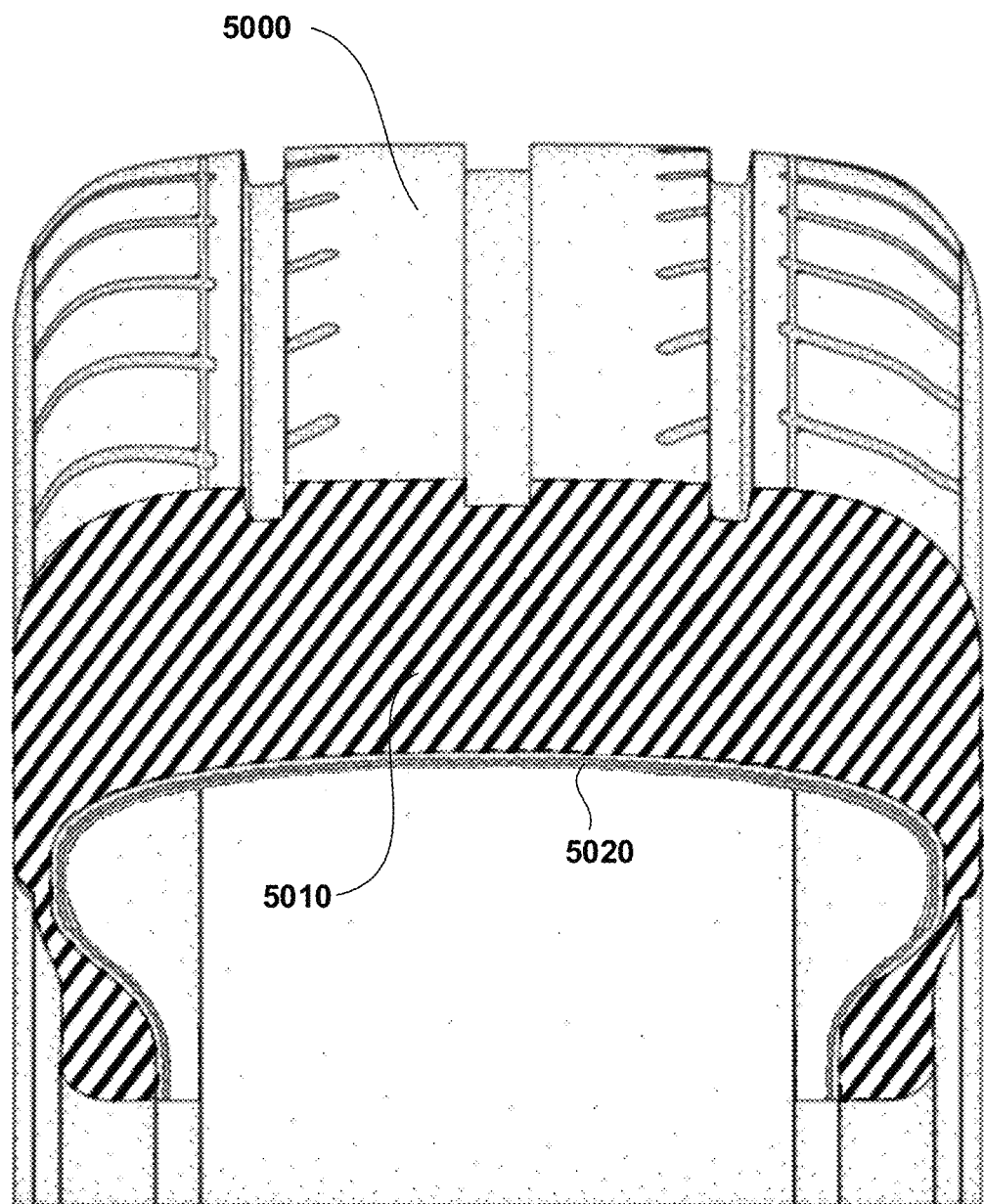

An exemplary tire is shown in FIGS. 8A and 8B. In one aspect, outer surface 5000 of the tire can display a pattern of treads for improved traction and/or other aspects of operation on a road or track. Further in this aspect, the tire can comprise rubber or another material 5010 that is, in some aspects, vulcanized to enhance strength, flexibility, and durability of the tire. In any of these aspects, inner layer of the tire 5020 comprises the multi-layered film disclosed herein, which, in some aspects, provides a surface area reducing gas transmission in order to maintain inflation of the tire during use.

In one aspect, the multi-layered film can cover the entire inner surface of the tire including the sidewalls (shown). In an alternative aspect, the multi-layered film can cover a portion of the tire. The disclosed tires can incorporate tubes or can be tubeless tires and can further include any other layers commonly associated with a particular use (e.g. belts, noise reduction devices, and the like, for automobile tires) in addition to the disclosed multi-layered films.

Property Analysis and Characterization Procedures

Specific Gravity/Density Test Protocol. The specific gravity (S.G.) or density is measured for samples taken using the Component Sampling Procedure as described herein, using a digital balance or a Densicom Tester (Qualitest, Plantation, Florida, USA). Each sample is weighed and then is submerged in a distilled water bath (at 22 degrees Celsius plus or minus 2 degrees Celsius). To avoid errors, air bubbles on the surface of the samples are removed, e.g., by wiping isopropyl alcohol on the sample before immersing the sample in water, or using a brush after the sample is immersed. The weight of the sample in the distilled water is recorded. The specific gravity is calculated using the following formula:

$$S.G. = \frac{\text{Weight of the sample in air (g)}}{\text{Weight of sample in air (g)} - \text{Weight of sample in water (g)}}$$

Melting Temperature, Glass Transition Temperature, and Enthalpy of Melting Test Protocol. The melting temperature and glass transition temperature are determined using a commercially available Differential Scanning calorimeter ("DSC") in accordance with ASTM D3418-97, using a sample prepared using the Material Sampling Procedure. Briefly, a 10-15 gram sample is placed into an aluminum DSC pan and then the lid is sealed with a crimper press. The DSC is configured to scan from −100 degrees Celsius to 225 degrees Celsius with a 20 degree Celsius per minute heating rate, hold at 225 degrees Celsius for 2 minutes, and then cool down to 25 degrees Celsius at a rate of −10 degrees Celsius per minute. The DSC curve created from this scan is then analyzed using standard techniques to determine the glass transition temperature and the melting temperature. The enthalpy of melting is calculated by integrating the area of the melting endotherm peak and normalizing by the sample mass.

Alternatively, glass transition temperature can be determined using Dynamic Mechanical Analysis (DMA). In this technique, a piece of the multi-layered film about 1 millimeter thick, about 5 millimeters to about 10 millimeters wide and about 20 millimeters long is mounted on a film tension fixture of a DMA apparatus. The sample is heated over a pre-determined temperature range at a fixed rate of, for example, about 1 degree Celsius to about 5 degrees Celsius per minute. During heating, the sample is tested at fixed frequency (e.g., about 1 Hertz) and a small oscillation amplitude (e.g. about 0.05 percent strain). The storage modulus (or complex shear) is recorded.

G' is the storage modulus, representing elastic portion of the viscoelastic material. G" is the loss modulus, representing the viscous portion. G' measures the energy stored and G" measures the energy lost/dissipated as heat. Tan delta is the ratio of G"/G' and the peak region is indicative of the glass transition temperature of the sample.

Melt Flow Index Test Protocol. The melt flow index is determined according to the test method detailed in ASTM D1238-13 Standard Test Method for Melt Flow Rates of Thermoplastics by Extrusion Plastometer, using Procedure A described therein. Briefly, the melt flow index measures the rate of extrusion of thermoplastics through an orifice at a prescribed temperature and load. In the test method, approximately 7 grams of the material is loaded into the barrel of the melt flow apparatus, which has been heated to a temperature specified for the material. A weight specified for the material is applied to a plunger and the molten material is forced through the die. A timed extrudate is collected and weighed. Melt flow rate values are calculated in grams/10 minutes.

Creep Relaxation Temperature Test Protocol. The creep relation temperature is determined according to the exemplary techniques described in U.S. Pat. No. 5,866,058. The creep relaxation temperature is calculated to be the temperature at which the stress relaxation modulus of the tested material is 10 percent relative to the stress relaxation modulus of the tested material at the solidification temperature of the material, where the stress relaxation modulus is measured according to ASTM E328-02. The solidification temperature is defined as the temperature at which there is little to no change in the stress relaxation modulus or little to no creep about 300 seconds after a stress is applied to a test material, which can be observed by plotting the stress relaxation modulus (in Pascals) as a function of temperature (in degrees Celsius).

KIM Test Protocol. For each KIM test, a multi-layered article as described herein is extruded and formed into a cushioning device component having an average wall thickness of between 400 micrometers and 1000 micrometers. Upon inflating the cushioning device to 15.0 pound-force per square inch to 25.0 pound-force per square inch (about 103 kilopascals to about 172 kilopascals) with nitrogen gas, the cushioning device is intermittently compressed by a reciprocating piston having a 4.0, 5.0, or 6.0 inch diameter platen, or by a platen having a geometry similar to a shoe last to distribute forces evenly across an entire airsole. The stroke of each piston is calibrated as follows. The multi-layered article is first subjected to a force-controlled test wherein the multi-layered article is taken to a peak load of 2250 Newtons, resulting in from about 25 percent to about 70 percent compression based on inflation pressure. The displacement at this peak load is recorded and used to set the peak displacement in the KIM test, using a gage block. A typical KIM test is run to a predetermined cycle count such as 320,000 or 400,000 cycles to mimic a mileage count for an average athlete (e.g. 175 pounds and 6 feet tall).

Sampling Procedures

Using the Test Protocols described above, various properties of the materials disclosed herein and articles formed therefrom can be characterized using samples prepared with the following sampling procedures.

Material Sampling Procedure. The Material Sampling Procedure can be used to obtain a neat sample of a polymeric material or of a polymer, or, in some instances, a sample of a material used to form a polymeric material or a polymer. The material is provided in media form, such as flakes, granules, powders, pellets, or the like. If a source of the polymeric material or polymer is not available in a neat form, the sample can be cut from a component or element containing the polymeric material or polymer, such as a composite element or a sole structure, thereby isolating a sample of the material.

Component Sampling Procedure. This procedure can be used to obtain a sample of a material from a component of an article of footwear, an article of footwear, a component of an article of apparel, an article of apparel, a component of an article of sporting equipment, or an article of sporting equipment. A sample including the material in a non-wet state (e.g., at 25 degrees Celsius and 20 percent relative humidity) is cut from the article or component using a blade. If the material is bonded to one or more additional materials, the procedure can include separating the additional materials from the material to be tested.

The sample is taken at a location along the article or component that provides a substantially constant material thickness for the material as present on the article or component (within plus or minus 10 percent of the average material thickness). For many of the test protocols described above, a sample having a surface area of 4 square centimeters is used. The sample is cut into a size and shape (e.g., a dogbone-shaped sample) to fit into the testing apparatus. In cases where the material is not present on the article or component in any segment having a 4 square centimeter surface area and/or where the material thickness is not substantially constant for a segment having a 4 square centimeter surface area, sample sizes with smaller cross-sectional surface areas can be taken and the area-specific measurements are adjusted accordingly.

Definitions

Unless defined otherwise, all technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the specification and relevant art and should not be interpreted in an idealized or overly formal sense unless expressly defined herein.

All publications, patents, and patent applications cited in this specification are cited to disclose and describe the methods and/or materials in connection with which the publications are cited. All such publications, patents, and patent applications are herein incorporated by references as if each individual publication or patent were specifically and individually indicated to be incorporated by reference. Such incorporation by reference is expressly limited to the methods and/or materials described in the cited publications, patents, and patent applications and does not extend to any lexicographical definitions from the cited publications, patents, and patent applications. Any lexicographical definition in the publications, patents, and patent applications cited that is not also expressly repeated in the instant specification should not be treated as such and should not be read as defining any terms appearing in the accompanying claims.

This disclosure is not limited to particular aspects, embodiments, or examples described, and as such can, of course, vary. The terminology used herein serves the purpose of describing particular aspects, embodiments, and examples only, and is not intended to be limiting, since the scope of the present disclosure will be limited only by the appended claims.

Where a range of values is provided, each intervening value, to the tenth of the unit of the lower limit unless the context clearly dictates otherwise, between the upper and lower limit of that range and any other stated or intervening value in that stated range, is encompassed within the disclosure. The upper and lower limits of these smaller ranges can independently be included in the smaller ranges and are also encompassed within the disclosure, subject to any specifically excluded limit in the stated range. Where the stated range includes one or both of the limits, ranges excluding either or both of those included limits are also included in the disclosure.

As will be apparent to those of skill in the art upon reading this disclosure, each of the individual aspects, embodiments and examples described and illustrated herein has discrete components and features which can be readily separated from or combined with the features of any of the other several aspects, embodiments, and examples without departing from the scope or spirit of the present disclosure. Any recited method can be carried out in the order of events recited or in any other order that is logically possible.

Although any methods and materials similar or equivalent to those described herein can also be used in the practice or testing of the present disclosure, the preferred methods and materials are now described. Functions or constructions well-known in the art cannot be described in detail for brevity and/or clarity. Aspects of the present disclosure will employ, unless otherwise indicated, techniques of nanotechnology, organic chemistry, materials science and engineering and the like, which are within the skill of the art. Such techniques are explained fully in the literature.

It should be noted that ratios, concentrations, amounts, and other numerical data can be expressed herein in a range format. Where the stated range includes one or both of the limits, ranges excluding either or both of those included limits are also included in the disclosure, e.g. the phrase "x to y" includes the range from 'x' to 'y' as well as the range greater than 'x' and less than 'y.' The range can also be expressed as an upper limit, e.g. 'about x, y, z, or less' and should be interpreted to include the specific ranges of 'about x,' 'about y,' and 'about z' as well as the ranges of 'less than x,' 'less than y,' and 'less than z.' Likewise, the phrase 'about x, y, z, or greater' should be interpreted to include the specific ranges of 'about x," about y,' and 'about z' as well as the ranges of 'greater than x,' 'greater than y,' and 'greater than z.' In addition, the phrase "about 'x' to 'y'", where 'x' and 'y' are numerical values, includes "about 'x' to about 'y'". It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a numerical range of "about 0.1 percent to 5 percent" should be interpreted to include not only the explicitly recited values of about 0.1 percent to about 5 percent, but also include individual values (e.g., 1 percent, 2 percent, 3 percent, and 4 percent) and the sub-ranges (e.g., 0.5 percent, 1.1 percent, 2.4 percent, 3.2 percent, and 4.4 percent) within the indicated range.

As used herein, the term "polymer" refers to a chemical compound formed of a plurality of repeating structural units referred to as monomers. Polymers often are formed by a polymerization reaction in which the plurality of structural units become covalently bonded together. When the monomer units forming the polymer all have the same chemical structure, the polymer is a homopolymer. When the polymer includes two or more monomer units having different chemical structures, the polymer is a copolymer. One example of a type of copolymer is a terpolymer, which includes three different types of monomer units. The co-polymer can include two or more different monomers randomly distributed in the polymer (e.g., a random co-polymer). Alternatively, one or more blocks containing a plurality of a first type of monomer can be bonded to one or more blocks containing a plurality of a second type of monomer, forming a block copolymer. A single monomer unit can include one or more different chemical functional groups.

Polymers having repeating units which include two or more types of chemical functional groups can be referred to as having two or more segments. For example, a polymer having repeating units of the same chemical structure can be referred to as having repeating segments. Segments are commonly described as being relatively harder or softer based on their chemical structures, and it is common for polymers to include relatively harder segments and relatively softer segments bonded to each other in a single monomeric unit or in different monomeric units. When the polymer includes repeating segments, physical interactions or chemical bonds can be present within the segments or between the segments or both within and between the segments. Examples of segments often referred to as "hard segments" include segments including a urethane linkage, which can be formed from reacting an isocyanate with a polyol to form a polyurethane. Examples of segments often referred to as "soft segments" include segments including an alkoxy functional group, such as segments including ether or ester functional groups, and polyester segments. Segments can be referred to based on the name of the functional group present in the segment (e.g., a polyether segment, a polyester segment), as well as based on the name of the chemical structure which was reacted in order to form the segment (e.g., a polyol-derived segment, an isocyanate-derived segment). When referring to segments of a particular functional group or of a particular chemical structure from which the segment was derived, it is understood that the polymer can contain up to 10 mole percent of segments of other functional groups or derived from other chemical structures. For example, as used herein, a polyether segment is understood to include up to 10 mole percent of non-polyether segments.

The terms "Material Sampling Procedure" and "Component Sampling Procedure" as used herein refer to the respective sampling procedures and test methodologies described in the Property Analysis and Characterization Procedure section. These sampling procedures and test methodologies characterize the properties of the recited materials, films, articles and components, and the like, and are not required to be performed as active steps in the claims.

The term "about," as used herein, can include traditional rounding according to significant figures of the numerical value. In some aspects, the term about is used herein to mean a deviation of 10 percent, 5 percent, 2.5 percent, 1 percent, 0.5 percent, 0.1 percent, 0.01 percent, or less from the specified value.

The articles "a" and "an," as used herein, mean one or more when applied to any feature in aspects of the present disclosure described in the specification and claims. The use of "a" and "an" does not limit the meaning to a single feature unless such a limit is specifically stated. The article "the" preceding singular or plural nouns or noun phrases denotes a particular specified feature or particular specified features and can have a singular or plural connotation depending upon the context in which it is used.

As used herein, the terms "about," "approximate," "at or about," and "substantially" mean that the amount or value in question can be the exact value or a value that provides equivalent results or effects as recited in the claims or taught herein. That is, it is understood that amounts, sizes, formulations, parameters, and other quantities and characteristics are not and need not be exact, but can be approximate and/or larger or smaller, as desired, reflecting tolerances, conversion factors, rounding off, measurement error and the like, and other factors known to those of skill in the art such that equivalent results or effects are obtained. In some circumstances, the value that provides equivalent results or effects cannot be reasonably determined. In such cases, it is generally understood, as used herein, that "about" and "at or about" mean the nominal value indicated ±10 percent variation unless otherwise indicated or inferred. In general, an amount, size, formulation, parameter or other quantity or characteristic is "about," "approximate," or "at or about" whether or not expressly stated to be such. It is understood that where "about," "approximate," or "at or about" is used before a quantitative value, the parameter also includes the specific quantitative value itself, unless specifically stated otherwise.

As used herein, the phrase "consists essentially of" or "consisting essentially of" refer to the feature being disclosed as having primarily the listed feature without other active components (relative to the listed feature) and/or those that do not materially affect the characteristic(s) of the listed feature. For example, the gas-barrier material can consist essentially of a gas-barrier material, which means that gas-barrier material can include fillers, colorants, etc. that do not substantially interact with or interact with the change the function or chemical characteristics of the gas-barrier material. In another example, the gas-barrier material can consist essentially of a thermoplastic ethylene-vinyl alcohol copolymer, which means that the gas-barrier material does not include a sufficient amount of another type of thermoplastic polymer or copolymer to alter the properties (e.g., melting temperature, melt flow index, creep relaxation temperature, or the like) of the gas-barrier material. Further in this aspect, when the gas-barrier material consists essentially of one polymer type (e.g., a thermoplastic ethylene-vinyl alcohol copolymer), it may contain less than 1 weight percent of another type of polymer.

As used herein, "polyurethane" refers to a copolymer (including oligomers) that contains a urethane group (—N(C=O)O—). These polyurethanes can contain additional groups such as ester, ether, urea, allophanate, biuret, carbodiimide, oxazolidinyl, isocynaurate, uretdione, carbonate, and the like, in addition to urethane groups. In an aspect, one or more of the polyurethanes can be produced by polymerizing one or more isocyanates with one or more polyols to produce copolymer chains having (—N(C=O)O—) linkages.

As used herein, the terms "at least one" and "one or more of" an element are used interchangeably, and have the same meaning that includes a single element and a plurality of the elements, and can also be represented by the suffix "(s)" at the end of the element. For example, "at least one polyurethane," "one or more polyurethanes," and "polyurethane(s)" can be used interchangeably and have the same meaning.

As used herein, a "sheet" or "film" refers to a flexible strip comprising one or more polymeric materials, the sheet or film having a thickness that is much smaller than its length and/or width. As used herein, a "core layer" may refer to an internal layer of material in a multi-layer sheet or film. Similarly, as used herein, a "core region" may refer to one or more layers which is, or which together form, an internal region of material in a multi-layer sheet or film. As used herein, a "cap layer" may refer to an externally-facing layer of material in a multi-layer sheet or film. Also as used herein, a "structural layer" may refer to a layer of material in a multi-layer sheet or film that is disposed between a cap layer and a core layer. As used herein, a "tie layer" may also refer to an internal layer in a multi-layer sheet or film; wherein, typically, a tie layer comprises a material which increases a bond strength of the adjacent layers.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms first, second, third, etc. may be used herein to describe various elements, components, regions, layers and/or sections. These elements, components, regions, layers and/or sections should not be limited by these terms. These terms may be only used to distinguish one element, component, region, layer, or section from another region, layer, or section. Terms such as "first," "second," and other numerical terms do not imply a sequence or order unless clearly indicated by the context. Thus, a first element, component, region, layer, or section discussed below could be termed a second element, component, region, layer, or section without departing from the teachings of the example configurations.

As used herein, the terms "crack," "cracking," "craze," "crazing," "break," and "breakage" may be used interchangeably, to describe a fracture in the gas-barrier material forming one or more gas-barrier layers in a core region of a multi-layered film. As described below, the degree or level of cracking can be classified as being "severe cracking," "mild cracking" or "little to no cracking," based on the extent of the fracture within the core region and the effects the cracking has on the properties (including gas transmission rate and clarity) of a multi-layered film.

Figure 9A:
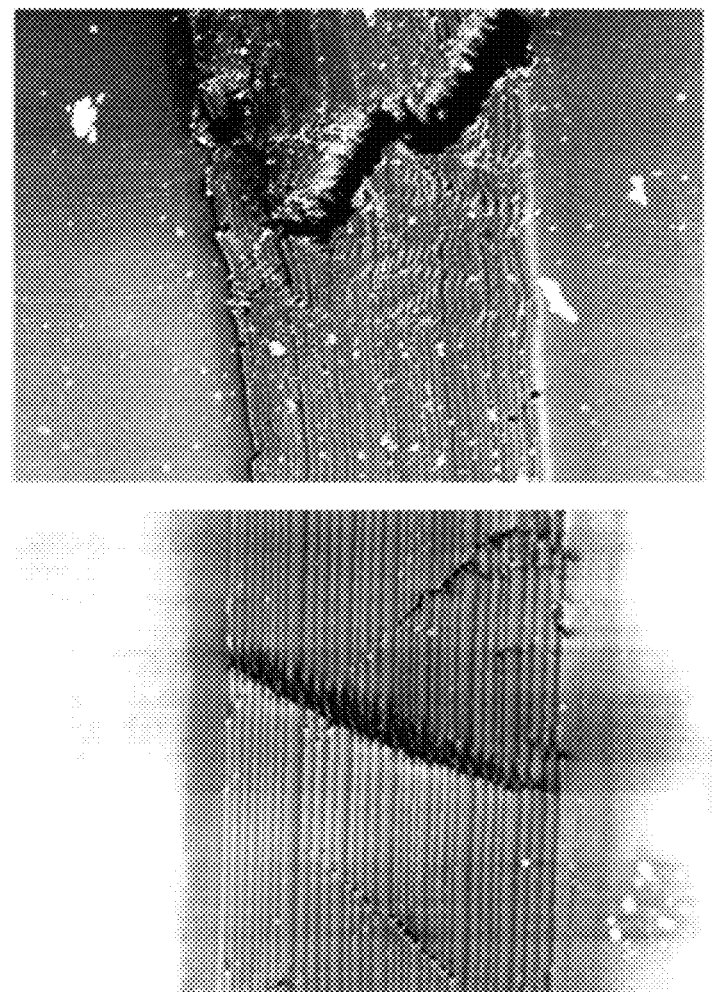
FIGS. 9A-9C show micrographs illustrating extent of cracking in bladders formed from various configurations of layers as disclosed herein after being subjected to KIM testing as described herein.
Figure 9B:
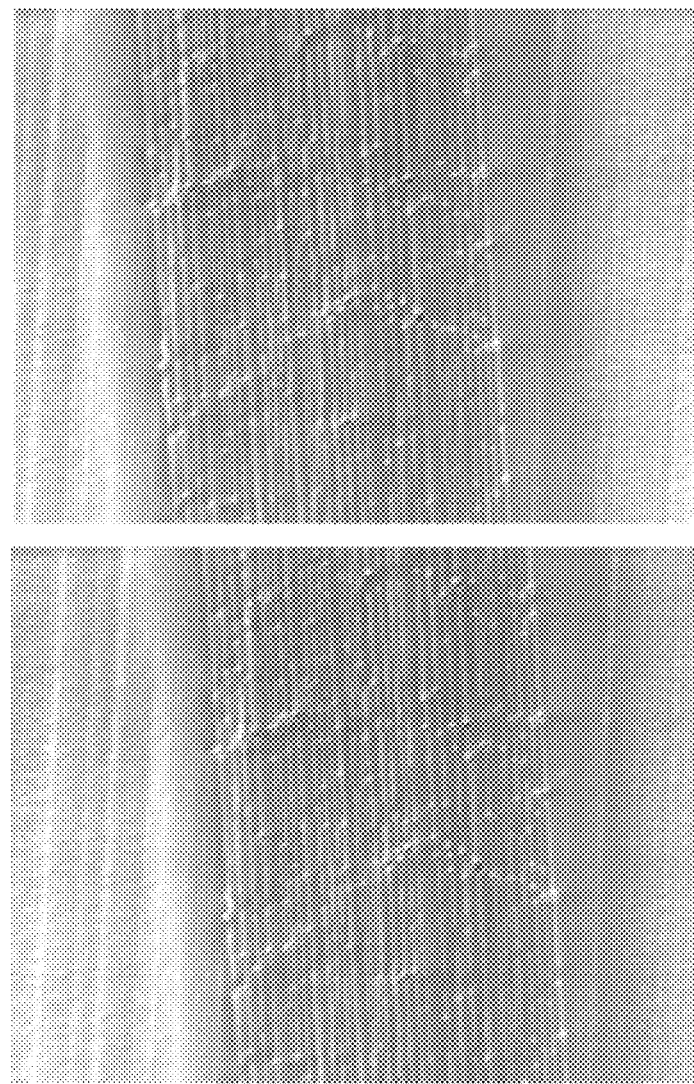
Figure 9C:
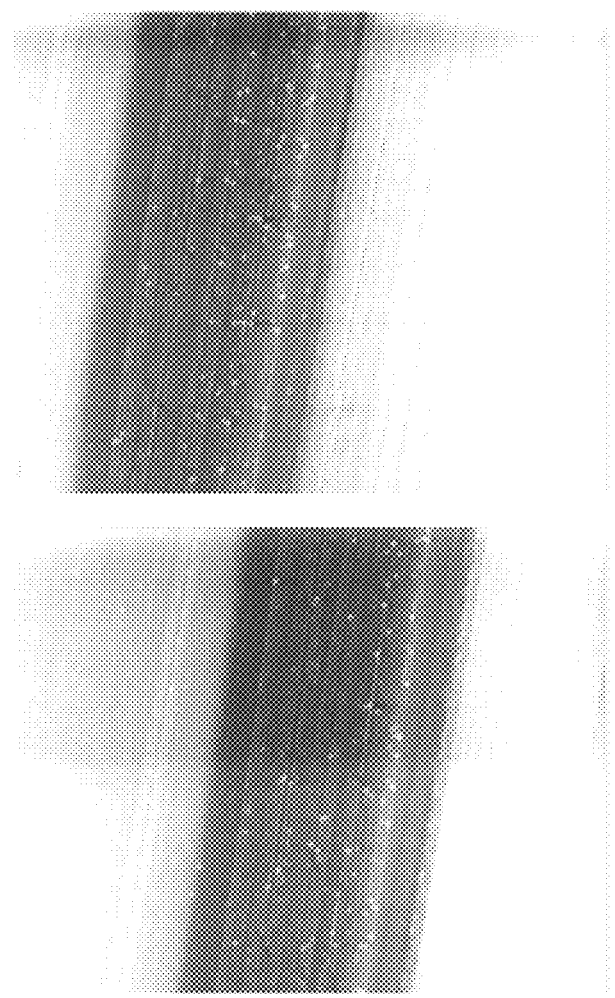

"Little to no cracking" may describe a level of cracking in which no cracking is present in the gas-barrier core, or in which a single fracture in the gas-barrier material of a gas-barrier layer of the core may extend within or across only a single gas-barrier layer, or only a few gas-barrier layers (and the elastomer layers directly adjacent to them). For example, the extent of an individual fracture can be determined by viewing a magnified cross-section of the thickness of the core region of the film. When observed in this manner, typically either no cracking in the gas-barrier layers is observed, or fractures which affect less than 20 percent of the gas-barrier layers, or fractures which affect less than 20 percent of the cross-sectional thickness of the core region, are observed. Typically, the edges of any fractures which are present do not pull away from each other and create a gap in the core region. FIG. 9C shows micrographs of two cross-sectional thicknesses of core regions of a multi-layer film, both of which exhibit little to no cracking. A multi-layer film exhibiting little to no cracking typically does not have any cracking or crazing which is visible to the naked eye, and has an acceptably low rate of gas transmission.

"Mild cracking" may describe a level of cracking in which a single fracture in the gas-barrier may extend across a few gas-barrier layers or across several gas-barrier layers (and the elastomer layers directly adjacent to them), but which does not extend across a majority of the of gas-barrier layers and elastomer layers present in the core region, or which does not extend across a majority of the total thickness of the core region. For example, the extent of an individual fracture can be determined by viewing a magnified cross-section of the thickness of the core region of the film. When observed in this manner, typically fractures which effect 3-10 gas-barrier layers, or fractures which effect less than 50 percent of the gas-barrier layers, or fractures which effect less than 50 percent of the cross-sectional thickness of the core region, are observed. While the edges of some fractures may pull away from each other and create a small gap in the core region, this does not occur in the majority of the fractures. FIG. 9B shows micrographs of two cross-sectional thicknesses of core regions of a multi-layer film, both of which exhibit mild cracking. A multi-layer film exhibiting mild cracking may exhibit a small decrease in transparency, as the presence of mild cracks may make the film appear somewhat hazy. In some examples, a few of the mild cracks may be visible to the naked eye.

"Severe cracking" may describe a level of cracking in which a single fracture in the gas-barrier layers of the core may extend across a majority of the gas-barrier layers and elastomer layers present in the core region, or across a majority of the thickness of the core region. For example, the extent of an individual fracture can be determined by viewing a magnified cross-section of the thickness of the core region of the multi-layer film. When observed in this manner, a fracture may extend across at least 50 percent of a cross-sectional thickness of the core region, or across more than 75 percent of the cross-sectional thickness of the core region, or across the entire cross-sectional thickness of the core region. Often, the edges of fractures pull away from each other and create a gap in the core region. FIG. 9A shows micrographs of two cross-sectional thicknesses of core regions of a multi-layer film, both of which exhibit severe cracking. A multi-layer film exhibiting severe cracking typically will exhibit an unacceptably high rate of gas diffusion, has a decreased level of transparency as compared to its initial level of transparency, and includes cracks and crazes which are visible to the naked eye.

EXAMPLES

The present disclosure is more particularly described in the following examples that are intended as illustrations only, since numerous modifications and variations within the scope of the present disclosure will be apparent to those skilled in the art.

Example 1. Multi-layer Control and Test Films were prepared and formed into Control and Test Bladders. These Bladders were subjected to repeated flexing and releasing cycles to simulate the conditions to which bladders are exposed to during wear when used as cushioning elements in a midsole of an article of footwear.

The Control and Test Films were all extruded films and all included a gas-barrier core region formed by extruding a gas-barrier material and an elastomeric material in alternating layers. The same gas-barrier material (including ethylene-vinyl alcohol) and the same elastomeric material (including thermoplastic polyurethane) were used in the Control and Test Films. Each Film also included a structural layer positioned on either side of the core region (2 structural layers total), and a cap layer on each film surface (2 cap layers total). The structural layers of the Control and Test Films were formed of the same materials as each other (including thermoplastic polyurethane). The cap layers of the Control and Test Films were also formed of the same materials as each other (including thermoplastic polyurethane).

The Bladders were prepared by thermoforming two films of the same type (i.e., 2 Control Films for the Control Bladder, 2 Test Films for a Test Bladder), bonding the two films to each other to form the perimeter of the bladder, and filling the bladder with nitrogen gas, to form a sealed bladder containing the nitrogen gas at a pressure of about 138 Kilopascals.

The sealed Control and Test Bladders were then each subjected to a number of KIM test cycles. Following about 350,000 (350 k) to about 400,000 (400 k) KIM test cycles, the appearance of the Films of the Bladders was assessed by the naked eye and assigned a Cracking Level (Severe, Mild, or Little-to-No cracking). Samples of the core regions of areas of the Films exhibiting cracking visible to the naked eye were taken and inspected microscopically. When Little-to-No cracking was visible to the naked eye, the regions of the Test Bladders selected for microscopy corresponded to the same areas where extensive cracking was observed in the Control Bladders.

The Control Films each included a gas-barrier core region including 32 gas-barrier layers and 32 elastomeric layers, with each gas-barrier layer directly adjacent to an elastomeric layer in an alternating pattern. In the Control Film, the thickness of the individual gas-barrier layers ranged from about 1.0 micrometers to about 1.2 micrometers. Each of the two Control Films individually had a total thickness of about 25.4-30.8 micrometers. Following about 350,000 KIM cycles, the Control Films of the Control Bladder exhibited Severe racking. FIG. 9A shows micrographs of cross-sections of core regions of areas of the Control Film exhibiting cracking visible to the naked eye, taken from the Control Bladder after about 350 k KIM cycles.

The First Test Films each included a gas-barrier core region including 32 gas-barrier layers and 32 elastomeric layers with each gas-barrier layer directly adjacent to an elastomeric layer in an alternating pattern. In the First Test Film, the thickness of the individual gas-barrier layers were about 75 percent as thick as the individual gas-barrier layers in the Control Film, and so ranged from about 0.8 micrometers to about 0.9 micrometers. Following about 400 k KIM cycles, the First Test Films of the First Test Bladder exhibited Mild cracking based on visual inspection by the naked eye and microscopy. FIG. 9B shows micrographs of cross-sections of core regions of areas of the First Test Film exhibiting mild cracking visible to the naked eye, taken from the First Test Bladder after about 400 k KIM cycles.

The Second Test Films each included a gas-barrier core region including 32 gas-barrier layers and 32 elastomeric layers in the same alternating pattern as described above. In the Second Test Film, the thickness of the individual gas-barrier layers were about 50 percent as thick as the individual gas-barrier layers in the Control Film, and so ranged from about 0.5 micrometers to about 0.6 micrometers. Following about 400 k KIM cycles, the Second Test Films of the Second Test Bladder exhibited Little-to-No cracking, based on visual inspection using the naked eye as well as microscopy. FIG. 9C shows micrographs of cross-sections of core regions of areas of the First Test Film exhibiting mild cracking visible to the naked eye, taken from the Second Test Bladder after about 400 k KIM cycles.

Example 2. Multi-layer Control and Test Films were prepared and formed into Control and Test Bladders as described in Example 1. These Bladders were subjected to repeated flexing and releasing cycles to simulate the conditions to which bladders are exposed to during wear when used as cushioning elements in a midsole of an article of footwear. The sealed Control and Test Bladders were each subjected to a total of 400,000 (400 k) KIM test cycles. Before the KIM testing and following 60,000 (60 k), 120,000 (120 k), and/or 320,000 (320 k) KIM test cycles, the gas transmission rate was measured for each of the Bladders (see FIGS. 10A, 11A, and 12 for the exact number of cycles after which the gas transmission rate of the Control and Test Bladders were measured). Gas transmission rates (GTR) were measured in cubic centimeters per square meter per day. The measured gas transmission rates were used to develop a gas transmission rate fatigue model using the following equation:

$$G = G_m - (G_m - G_0)(1 - e^{(-kx)})$$

where G is gas transmission rate, $G_0$ is the gas transmission rate prior to any KIM cycling, $G_m$ is the gas transmission rate after 320,000 KIM cycles, and k is a growth parameter depending on gas-barrier layer thickness as well as the type and number of gas-barrier layers in the films of the bladder. Following 400,000 (400 k) KIM test cycles, the appearance of the Films of the Bladders was assessed as described in Example 1.

Example 2A. The Control Films and Control Bladder, as well as the Second Test Films and Second Test Bladders used in Example 2A were the same as in Example 1. The Third Test Films each included a gas-barrier core region including 24 gas-barrier layers alternating with 24 elastomeric layers, 33 percent fewer gas-barrier layers than in the Control and Second Test Films. In the Third Test Film, the thickness of individual gas-barrier layers was about 50 percent of individual gas-barrier layers in the Control Film, and so ranged from about 0.5 micrometers to about 0.6 micrometers.

Figure 10A:
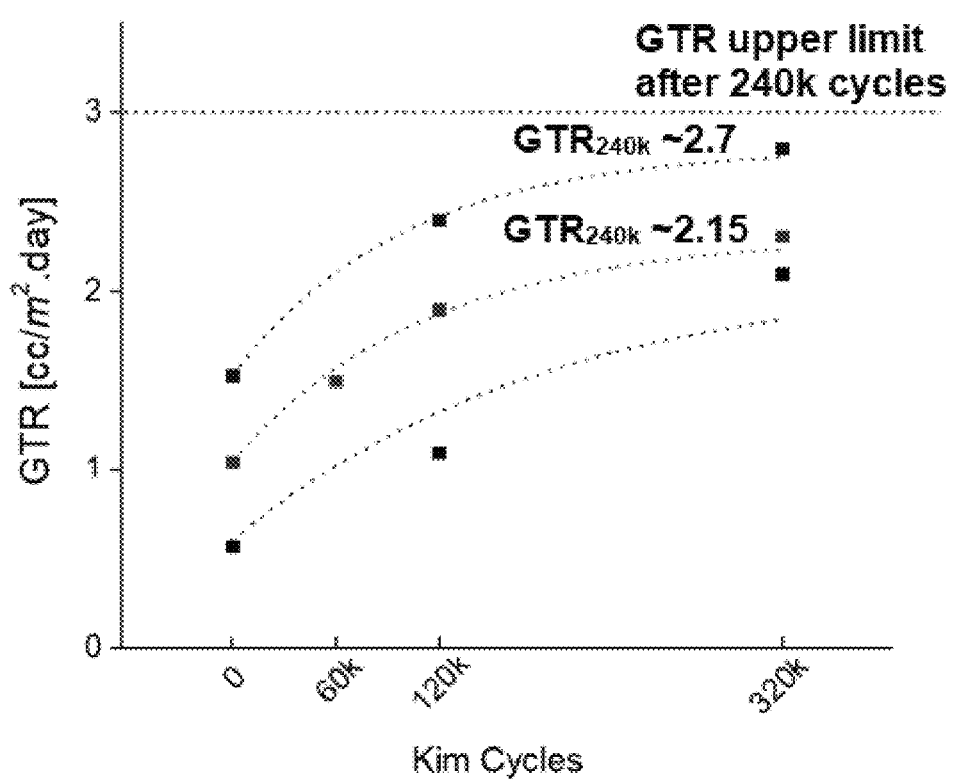
FIG. 10A shows a comparison of gas transmission rates for a control bladder including 32 EVOH layers (bottom curve) versus a bladder having 24 EVOH layers with 50 percent thickness of the control (top curve) and a bladder having 32 EVOH layers with 50 percent thickness of the control (middle curve).

FIG. 10A shows the GTRs measured for the Control Bladder (bottom curve) and for the Second Test Bladder (middle curve), and for the Third Test Bladder (top curve) after the indicated number of KIM cycles. FIG. 10A also shows the GTR calculated using the above equation for 240,000 KIM cycles ($GTR_{240\ k}$). Unexpectedly, the measured and calculated GTRs for both the Second and Third Test Bladders were all only slightly higher than for the Control Bladder and were still comfortably below the desired maximum of 3 cubic centimeters per square meter per day. This was unexpected as the gas-barrier layers of both the Second and Third Test films were 50 percent thinner than those of the Control Film, and the Third Test Film contained 33 percent fewer of these thinner gas-barrier layers than the Second and Control Test Films.

Figure 10B:
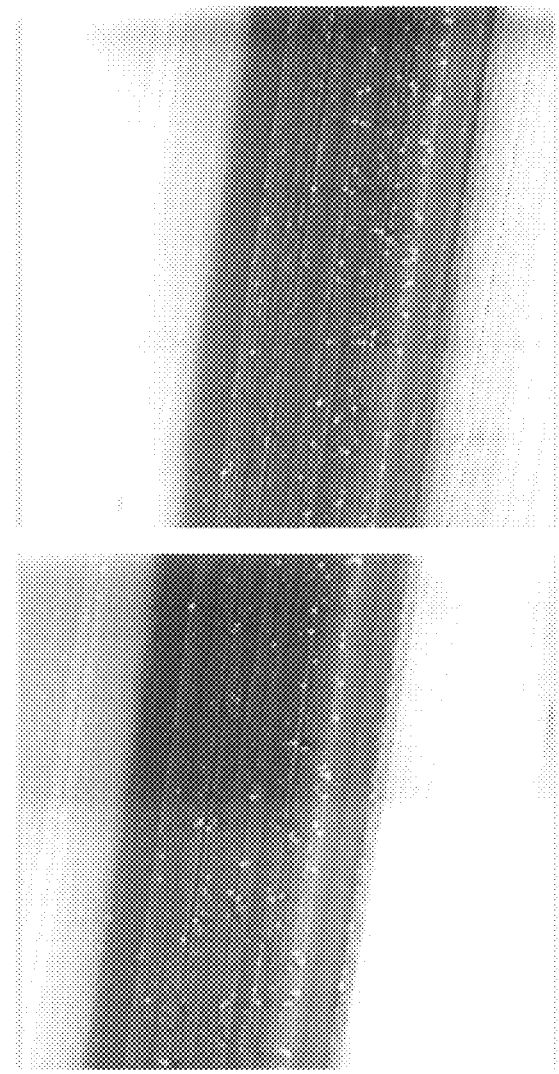
FIGS. 10B-10C are micrographs showing the lack of cracking in the 24 EVOH layer bladder and 32 EVOH layer bladder, respectively, after being subjected to KIM testing as described herein.
Figure 10C:
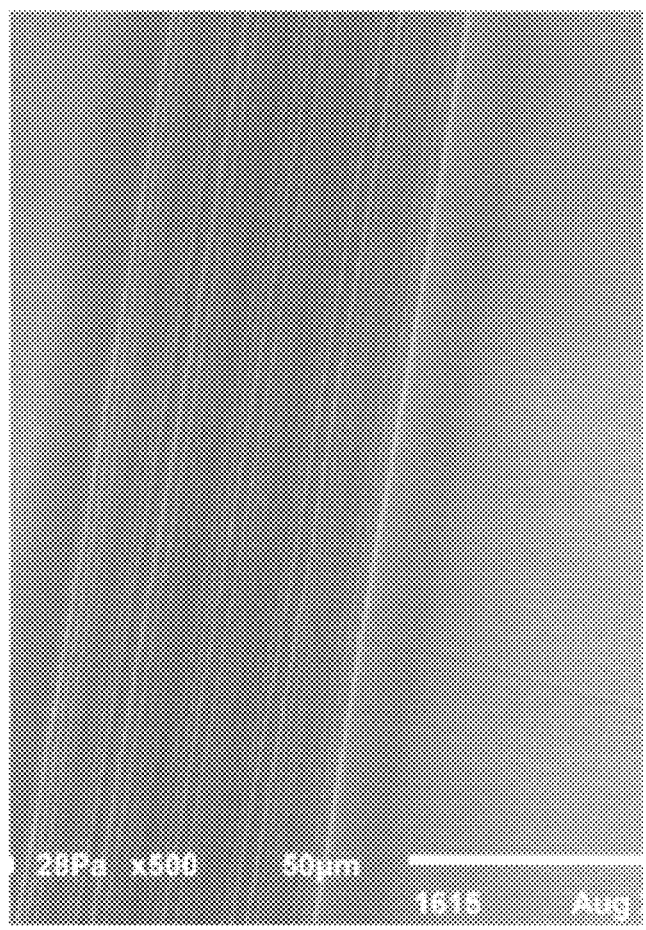

As in Example 1, following 400 k KIM cycles, areas of the Control Films of the Control Bladder exhibited Severe cracking, while areas of the Second Test Films of the Second Test Bladder exhibited Little-to-No cracking. The Third Test Films of the Third Test Bladder also exhibited Little-to-No cracking. FIG. 10B shows micrographs of cross-sections of core regions of areas of the Second Test Film. FIG. 10C shows micrographs of cross-sections of core regions of areas of the Third Test Film exhibiting Little-to-No cracking.

Example 2B. The Control Films and Control Bladder, as well as the First Test Films and First Test Bladders used in Example 2B were the same as in Example 1. The Third Test Films and the Third Test Bladder were the same as in Example 2A.

Figure 11A:
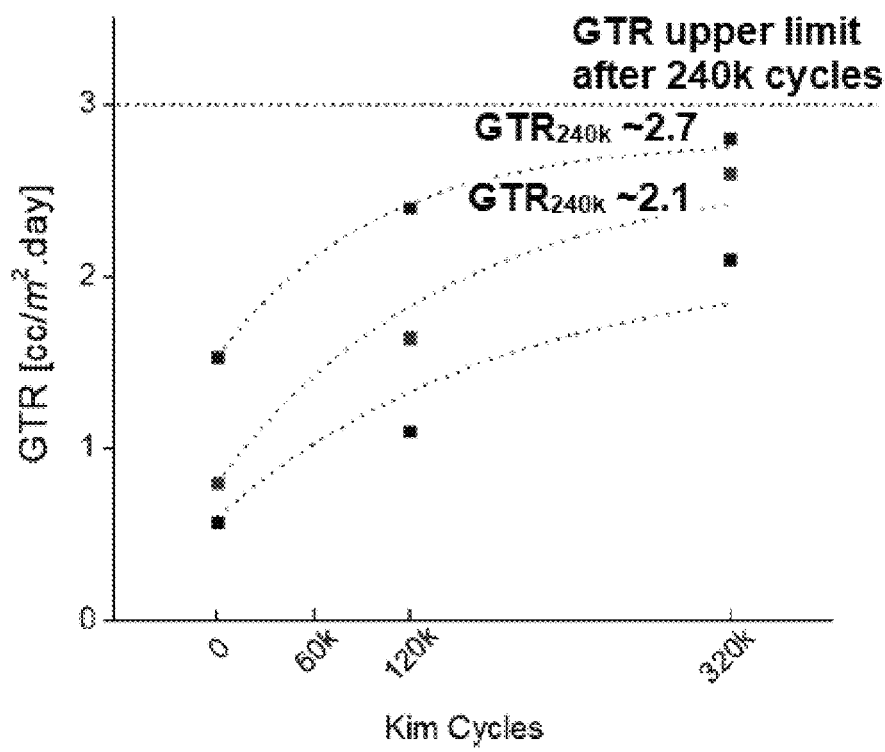
FIG. 11A shows a comparison of gas transmission rates (GTR) for a control bladder including 32 EVOH layers (bottom curve) versus a bladder having 24 EVOH layers with 50 percent thickness of the control (top curve) and a bladder having 32 EVOH layers with 75 percent thickness of the control (middle curve).

FIG. 11A shows the GTRs measured for the Control Bladder (bottom curve) and for the First Test Bladder (middle curve), and for the Third Test Bladder (top curve) after the indicated number of KIM cycles. FIG. 11A also shows the GTR calculated as in Example 2A. As in Example 2A, unexpectedly, the measured and calculated GTRs for both the First and Third Test Bladders were all only slightly higher than for the Control Bladder and were still comfortably below the desired maximum of 3 cubic centimeters per square meter per day. The calculated GTR for the First Test Bladder (2.10 $cc/m^2 \cdot day$) was only slightly lower than the GTR calculated for the Second Test Bladder (2.15 $cc/m^2 \cdot day$). This was unexpected as the gas-barrier layers of the Second Test Film were about a third thinner than the First Test Film (the thickness of the gas-barrier layers in the Second Test Film were about 50 percent of the thickness as the gas-barrier layers in the Control Film, while the thickness of the gas-barrier layers in the First Test Film were about 75 percent of the thickness of the gas-barrier layers in the Control Film).

Figure 11B:
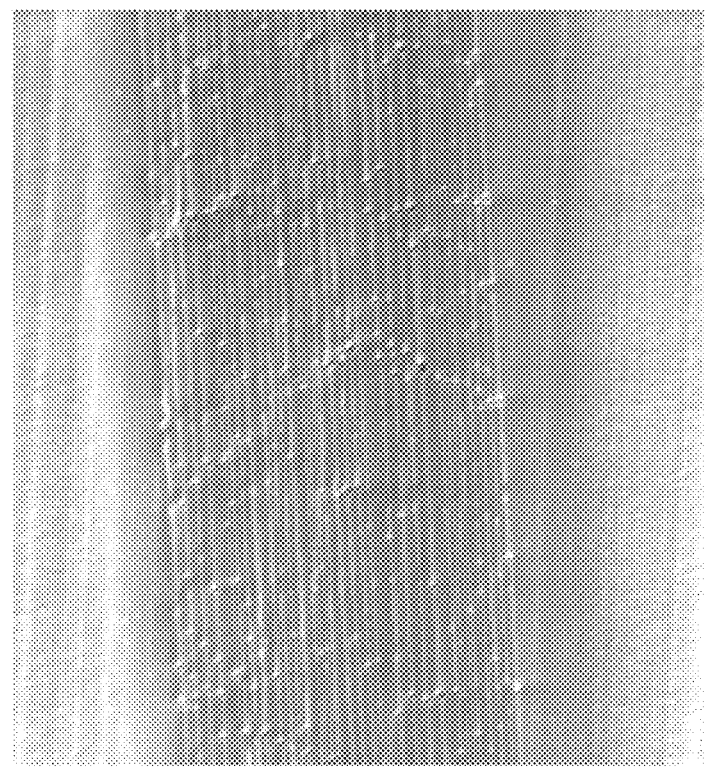
FIG. 11B is a micrograph showing mild cracking in the 32 EVOH layer bladder after being subjected to KIM testing as described herein.

As in Examples 1 and 2A, following 400 k KIM cycles, areas of the Control Films of the Control Bladder exhibited Severe cracking, while areas of the First Test Films of the First Test Bladder exhibited Mild cracking, and the Third Test Films of the Third Test Bladder exhibited Little-to-No cracking. FIG. 11B shows micrographs of cross-sections of core regions of areas of the First Test Film.

Example 2C. The Control Films and Control Bladder used in Example 2C were the same as in Example 1. The Fourth Test Films each included a gas-barrier core region including 40 gas-barrier layers alternating with 40 elastomeric layers as described above. The Fourth Test Films included 25 percent more gas-barrier layers than in the Control Films. In the Fourth Test Films, the thickness of the individual gas-barrier layers was the same as in the Control Films, and so ranged from about 1.0 micrometers to about 1.2 micrometers. The Fifth Test Films each included a gas-barrier core region including 60 gas-barrier layers alternating with 60 elastomeric layers as above. The Fifth Test Films included over 87 percent more gas-barrier layers than in the Control Films. In the Fifth Test Films, the thickness of the individual gas-barrier layers was 150 percent of their thickness in the Control Films, and so ranged from about 1.5 micrometers to about 1.8 micrometers.

Figure 12:
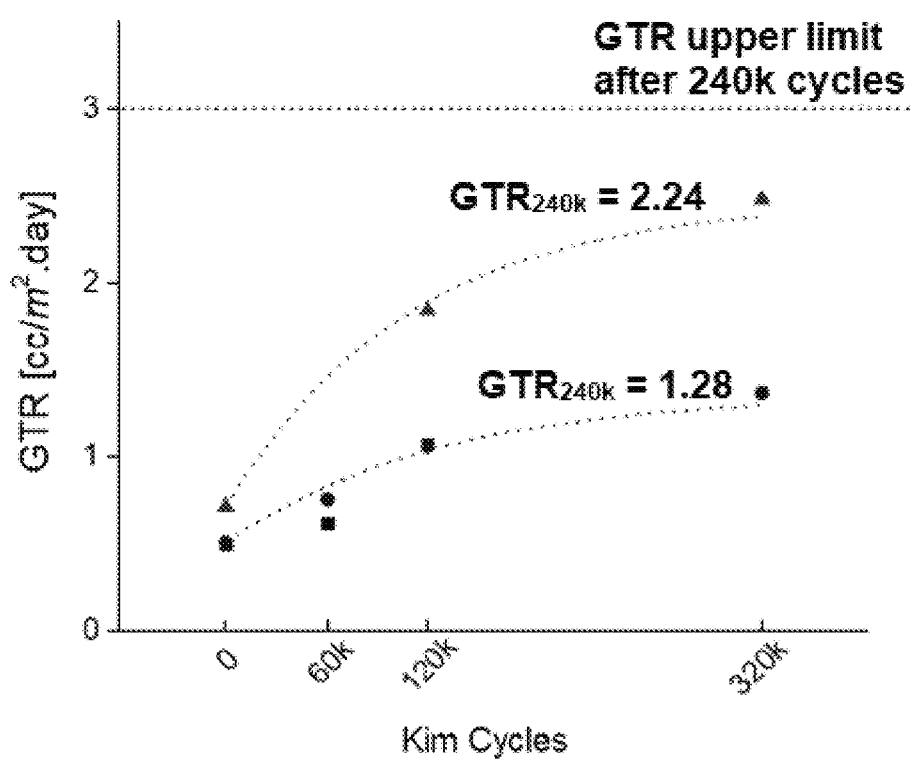
FIG. 12 shows a comparison of gas transmission rates for a control bladder including 32 EVOH layers (curve with squares) versus a bladder having 64 EVOH layers with 150 percent thickness compared to the control (curve with circles) and a bladder having 40 EVOH layers with approximately the same thickness as the control (curve with triangles).

FIG. 12 shows the GTRs measured for the Fourth Test Bladder (top curve), and for the Fifth Test Bladder (bottom curve) after the indicated number of KIM cycles. FIG. 11A also shows the GTR calculated as in Examples 2A and 2B. The measured and calculated GTRs for the Fifth Test Bladder was lower than for the Control Bladder other Test Bladders, as would be expected based on the increased thickness and number of the gas-barrier layers. The measured and calculated GTR (2.24 cubic centimeters per square meter per day) for the Fourth Test Bladder were higher than for the Fifth Test Bladder, but surprisingly were also higher than for the First and Second Test Bladders (calculated GTR of 2.10 cubic centimeters per square meter per day and 2.15 cubic centimeters per square meter per day, respectively). This was unexpected as the First and Second Test Films each had thinner gas-barrier layers and fewer gas-barrier layers than the Fourth Test Film.

As in Examples 1, 2A and 2B, following 400 k KIM cycles, areas of the Control Films of the Control Bladder exhibited Severe cracking, while areas of the Fourth Test Films of the Fourth Test Bladder and of the Fifth Test Films of the Fifth Test Bladder both exhibited Mild cracking.

The results of Examples 1 to 2C are summarized in Table 1.

As a person skilled in the art will readily appreciate, the above description is meant as an illustration of the implementation of the principles of this invention. This description is not intended to limit the scope or application of this invention in that the invention is susceptible to modification, variation, and change, without departing from the spirit of this invention as defined in the following claims.

| Example 1 | Bladder | Total Number of Gas-Barrier Layers | Thickness of Individual Gas-Barrier Layers in micrometers | Overall Cracking Level Observed for Film after ~400 k KIM cycles | |
|---|---|---|---|---|---|
| | Control Bladder | 32 | 1.0-1.2 | Severe Cracking | |
| | 1st Test Bladder | 32 | 0.8-0.9 | Mild Cracking | |
| | 2nd Test Bladder | 32 | 0.5-0.6 | Little to No Cracking | |

| Example 2A | Bladder | Total Number of Gas-Barrier Layers | Thickness of Individual Gas-Barrier Layers in micrometers | Overall Cracking Level Observed for Film after ~400 k KIM cycles | Calculated Gas Transmission Rate (GTR) for Test Bladder at 240 k KIM cycles |
|---|---|---|---|---|---|
| | Control Bladder | 32 | 1.0-1.2 | Severe Cracking | |
| | 2nd Test Bladder | 32 | 0.5-0.6 | Little to No Cracking | 2.15 |
| | 3rd Test Bladder | 24 | 0.5-0.6 | Little to No Cracking | 2.70 |

| Example 2B | Bladder | Total Number of Gas-Barrier Layers | Thickness of Individual Gas-Barrier Layers in micrometers | Overall Cracking Level Observed for Film after ~400 k KIM cycles | Calculated GTR for Test Bladder at 240 k KIM cycles |
|---|---|---|---|---|---|
| | Control Bladder | 32 | 1.0-1.2 | Severe Cracking | |
| | 1st Test Bladder | 32 | 0.8-0.9 | Mild Cracking | 2.10 |
| | 3rd Test Bladder | 24 | 0.5-0.6 | Little to No Cracking | 2.70 |

| Example 2C | Bladder | Total Number of Gas-Barrier Layers | Thickness of Individual Gas-Barrier Layers in micrometers | Overall Cracking Level Observed for Film after ~400 k KIM cycles | Calculated GTR for Test Bladder at 240 k KIM cycles |
|---|---|---|---|---|---|
| | Control Bladder | 32 | 1.0-1.2 | Severe Cracking | |
| | 4th Test Bladder | 40 | 1.0-1.2 | Mild Cracking | 2.24 |
| | 5th Test Bladder | 60 | 1.5-1.8 | Mild Cracking | 1.28 |

What is claimed is:

1. A method for producing a multi-layered film, the method comprising:
   co-extruding a gas-barrier material and elastomeric material to form a multi-layered film having a core region that comprises:
   at least 20 gas-barrier layers each comprising the gas-barrier material and each having an average thickness in a range of from about from about 0.01 micrometers to about 0.75 micrometers; and
   a plurality of elastomeric layers alternating with the at least 20 gas-barrier layers, wherein each of the plurality of elastomeric layers comprises the elastomeric material and each has an average thickness ranging from about 2 micrometers to about 8 micrometers;
   wherein the core region has a gas transmission rate of from about 0.3 to about 1.9 cubic centimeters per square meter per day for nitrogen measured at 23 degrees Celsius and 0 percent relative humidity for a structure having a thickness of from about 72 micrometers to about 320 micrometers; and
   wherein the multi-layered film does not exhibit crazing or cracking after at least 350,000 KIM cycles.

2. The method of claim 1, wherein the gas-barrier material comprises one or more gas-barrier polymers.

3. The method of claim 2, wherein the one or more gas-barrier polymers comprise one or more thermoplastic ethylene-vinyl alcohol copolymers.

4. The method of claim 3, wherein the one or more thermoplastic ethylene-vinyl alcohol copolymers include from about 28 mole percent to about 44 mole percent ethylene content.

5. The method of claim 1, wherein the elastomeric material comprises one or more thermoplastic elastomeric polymers.

6. The method of claim 5, wherein the one or more thermoplastic elastomeric polymers comprise one or more thermoplastic elastomeric polyolefin homopolymers or copolymers, one or more thermoplastic elastomeric polyamide homopolymers or copolymers, one or more thermoplastic elastomeric polyester homopolymers or copolymers, one or more thermoplastic elastomeric polyurethane homopolymers or copolymers, one or more thermoplastic elastomeric styrenic homopolymers or copolymers, or any combination thereof.

7. The method of claim 1, wherein the elastomeric material is a first elastomeric material, wherein the method further comprises co-extruding a second elastomeric material with the gas-barrier material and the first elastomeric material, and, optionally, wherein the formed multi-layer material further comprises:
   a first structural layer secured to a first side of the core region, wherein the first structural layer comprises the second elastomeric material and has an average thickness ranging from about 900 micrometers to about 1990 micrometers; and
   a second structural layer secured to a second side of the core region that is opposing to the first side of the core region, wherein the second structural layer comprises the second elastomeric material and has an average thickness ranging from about 900 micrometers to about 1990 micrometers.

8. The method of claim 7, wherein the first and second structural layers comprises a polydiene polyol-based thermoplastic polyurethane.

9. The method of claim 7, further comprising:
   applying at least one tie layer to the multi-layered film comprising the core region and the first and second structural layers to form a multi-layered film comprising the core region, the at least one tie layer, and the first and second structural layers, wherein the at least one tie layer comprises a tie material.

10. The method of claim 9, wherein the tie material of the at least one tie layer comprises a polyurethane, a polyacrylate, an ethylene-acrylate copolymer, a maleic anhydride grafted polyolefin, or any combination thereof.

11. The method of claim 9, further comprising:
   co-extruding at least one structural layer with the multi-layered film comprising the core regions and the at least one tie layer to form a multi-layered film comprising the core regions, the at least one tie layer, and the first and second structural layers.

12. The method of claim 9, further comprising:
   applying at least one cap layer to the multi-layered film comprising the core regions, the at least one tie layer, and the first and second structural layers to form a multi-layered film comprising the core regions, the at least one tie layer, the first and second structural layers, and the cap layer, wherein the cap layer comprises a cap layer material.

13. The method of claim 12, wherein the cap layer material of the at least one cap layer comprises a polyurethane, a polyacrylate, an ethylene-acrylate copolymer, a maleic anhydride grafted polyolefin, or any combination thereof.

14. The method of claim 11, further comprising:
   co-extruding at least one cap layer with the multi-layered film comprising the core regions, the at least one tie layer, and the first and second structural layers to form a multi-layered film comprising the core regions, the at least one tie layer, the first and second structural layers, and the cap layer.

15. The method of claim 1, wherein the core region comprises at least 50 layers.

16. The method of claim 1, wherein the gas-barrier material comprises a nitrogen barrier material.

17. The method of claim 1, wherein a melt flow index of the gas-barrier material is from about 80 percent to about 120 percent of the melt flow index of the elastomeric material, wherein the melt flow index is measured in cubic centimeters per 10 minutes at 190 degrees Celsius when using a weight of 2.16 kilograms.

18. The method of claim 1, wherein a melting temperature of the gas-barrier material is within about 10 degrees Celsius of a melting temperature of the elastomeric material.

19. The method of claim 1, wherein the multi-layered film does not exhibit crazing or cracking after at least 400,000 KIM cycles.

* * * * *

UNITED STATES PATENT AND TRADEMARK OFFICE
CERTIFICATE OF CORRECTION

PATENT NO. : 11,975,513 B2
APPLICATION NO. : 17/815225
DATED : May 7, 2024
INVENTOR(S) : Diya Bandyopadhyay et al.

It is certified that error appears in the above-identified patent and that said Letters Patent is hereby corrected as shown below:

In the Claims

Claim 11, Column 70, Lines 20-22:
"comprising the core regions and the at least one tie layer to form a multi-layered film comprising the core regions," should read as --comprising the core region and the at least one tie layer to form a multi-layered film comprising the core region,--

Claim 12, Column 70, Lines 26-28:
"comprising the core regions, the at least one tie layer, and the first and second structural layers to form a multi-layered film comprising the core regions," should read as --comprising the core region, the at least one tie layer, and the first and second structural layers to form a multi-layered film comprising the core region,--

Claim 14, Column 70, Lines 39-41:
"comprising the core regions, the at least one tie layer, and the first and second structural layers to form a multi-layered film comprising the core regions," should read as --comprising the core region, the at least one tie layer, and the first and second structural layers to form a multi-layered film comprising the core region,--

Signed and Sealed this
Second Day of July, 2024

Katherine Kelly Vidal
*Director of the United States Patent and Trademark Office*